United States Patent
Pieper et al.

(10) Patent No.: US 11,652,982 B2
(45) Date of Patent: May 16, 2023

(54) APPLICATIONS FOR DETECTION CAPABILITIES OF CAMERAS

(71) Applicant: NVIDIA Corporation, Santa Clara, CA (US)

(72) Inventors: Sean Midthun Pieper, San Jose, CA (US); Robin Brian Jenkin, Morgan Hill, CA (US)

(73) Assignee: NVIDIA Corporation, Santa Clara, CA (US)

( * ) Notice: Subject to any disclaimer, the term of this patent is extended or adjusted under 35 U.S.C. 154(b) by 2 days.

(21) Appl. No.: 17/315,130

(22) Filed: May 7, 2021

(65) Prior Publication Data

US 2022/0141450 A1    May 5, 2022

Related U.S. Application Data

(60) Provisional application No. 63/140,957, filed on Jan. 25, 2021, provisional application No. 63/108,211, filed on Oct. 30, 2020.

(51) Int. Cl.
*H04N 7/18*  (2006.01)
*H04N 17/00*  (2006.01)
(Continued)

(52) U.S. Cl.
CPC ......... *H04N 17/002* (2013.01); *G05D 1/0061* (2013.01); *G05D 1/0223* (2013.01);
(Continued)

(58) Field of Classification Search
CPC ...... H04N 7/18; H04N 17/002; G05D 1/0061; G05D 1/0223; G05D 2201/0213; G06T 7/0002; G06T 2207/10024
(Continued)

(56) References Cited

U.S. PATENT DOCUMENTS 5,686,960 A * 11/1997 Sussman ............. H04N 5/2628
                                                  382/284
6,137,498 A * 10/2000 Silvers ................... G06T 11/00
                                                  382/284
(Continued)

OTHER PUBLICATIONS

ICRU Report 54, Medical Imaging—The Assessment of Image Quality, Bethesda MD: International Commission on Radiation Units and Measurements, 1996, 92 pages.
(Continued)

*Primary Examiner* — Trang U Tran

(74) *Attorney, Agent, or Firm* — Lowenstein Sandler LLP

(57) ABSTRACT

In one embodiment, a system receives pixel data from a pair of regions of an image generated by an imaging device, the pair of regions includes a first region and a second region, where the first region includes a first plurality of pixels and the second region includes a second plurality of pixels. The system determines a plurality of pixel pairs, where a pixel pair includes a first pixel from the first plurality of pixels and a second pixel from the second plurality of pixels. The system calculates a plurality of contrasts based on the plurality of pixel pairs. The system determines a contrast distribution based on the plurality of contrasts. The system calculates a value representative of a capability of the imaging device to detect contrast based on the contrast distribution. The system determines a reduction in contrast detectability of the imaging device based on the value.

13 Claims, 23 Drawing Sheets

(51) Int. Cl.
    *G06T 7/00*     (2017.01)
    *G05D 1/02*     (2020.01)
    *G05D 1/00*     (2006.01)

(52) U.S. Cl.
    CPC ... *G06T 7/0002* (2013.01); *G05D 2201/0213* (2013.01); *G06T 2207/10024* (2013.01)

(58) Field of Classification Search
    USPC ............................................................ 348/148
    See application file for complete search history.

(56) References Cited

U.S. PATENT DOCUMENTS

| | | | | |
|---|---|---|---|---|
| 6,201,899 | B1* | 3/2001 | Bergen | G06V 20/693 382/284 |
| 6,320,979 | B1* | 11/2001 | Melen | H04N 5/232123 348/E5.045 |
| 8,139,137 | B2 | 3/2012 | Chiang | |
| 9,408,585 | B2* | 8/2016 | Oh | A61B 6/484 |
| 10,057,478 | B2* | 8/2018 | Kudo | H04N 5/2352 |
| 10,147,169 | B2 | 12/2018 | Omori | |
| 10,878,540 | B1 | 12/2020 | Stevens | |
| 11,368,617 | B2* | 6/2022 | Zhou | G06N 3/0454 |
| 2020/0034959 | A1* | 1/2020 | Lakshmanan | H04N 17/002 |
| 2020/0051318 | A1 | 2/2020 | Muthler et al. | |
| 2020/0279357 | A1* | 9/2020 | Wang | G06T 3/4038 |
| 2021/0390696 | A1* | 12/2021 | Iwase | G06T 5/009 |
| 2022/0141449 | A1 | 5/2022 | Pieper et al. | |

OTHER PUBLICATIONS

M.Geese, U. Seger, and A. Paolillo, "Detection probabilities: performance prediction for sensors of autonomous Vehicles," IS&T Electronic Imaging: Autonomous Vehicle and Machines 2018 Proceedings (IS&T, Springfield, VA, 2018), pp. 148-1-148-14(14).

IEEE Autonomous Imaging White Paper, The Institute of Electrical and Electronics Engineers, Inc., 3 Park Avenue, New York, NY 10016-5997, 32 pages.

* cited by examiner

APPLICATIONS FOR DETECTION CAPABILITIES OF CAMERAS

CROSS REFERENCE TO RELATED APPLICATIONS

This application claims the benefit of priority to provisional patent application No. 63/108,211, filed Oct. 30, 2020, and provisional patent application No. 63/140,957, filed Jan. 25, 2021, which are hereby incorporated by reference in their entireties.

TECHNICAL FIELD

The present disclosure is generally related to imaging systems, and is more specifically related to systems and methods to evaluate contrast detection capabilities of cameras.

BACKGROUND

Measuring the capabilities of imaging systems (e.g., cameras) to detect contrasts of the captured data for the detection of objects is useful for the design and optimization of imaging systems for various machine learning applications. Unfortunately, the measuring the detectability of contrast in an imaging system tends to be time consuming and complex. For these reasons, conducting measurements on the contrast detectability of image sensors tend to be limited to laboratory environments and conditions rather than being applied to data from the camera stream while in use. This can be disadvantageous, particularly when the capabilities of sensors change over time, and as a result should be calibrated differently (or corrected) to compensate in order to produce the most accurate images.

BRIEF DESCRIPTION OF DRAWINGS

The present disclosure is illustrated by way of example, and not by way of limitation, and may be more fully understood with reference to the following detailed description when considered in connection with the Figures in which.

DETAILED DESCRIPTION

Figure 1A:
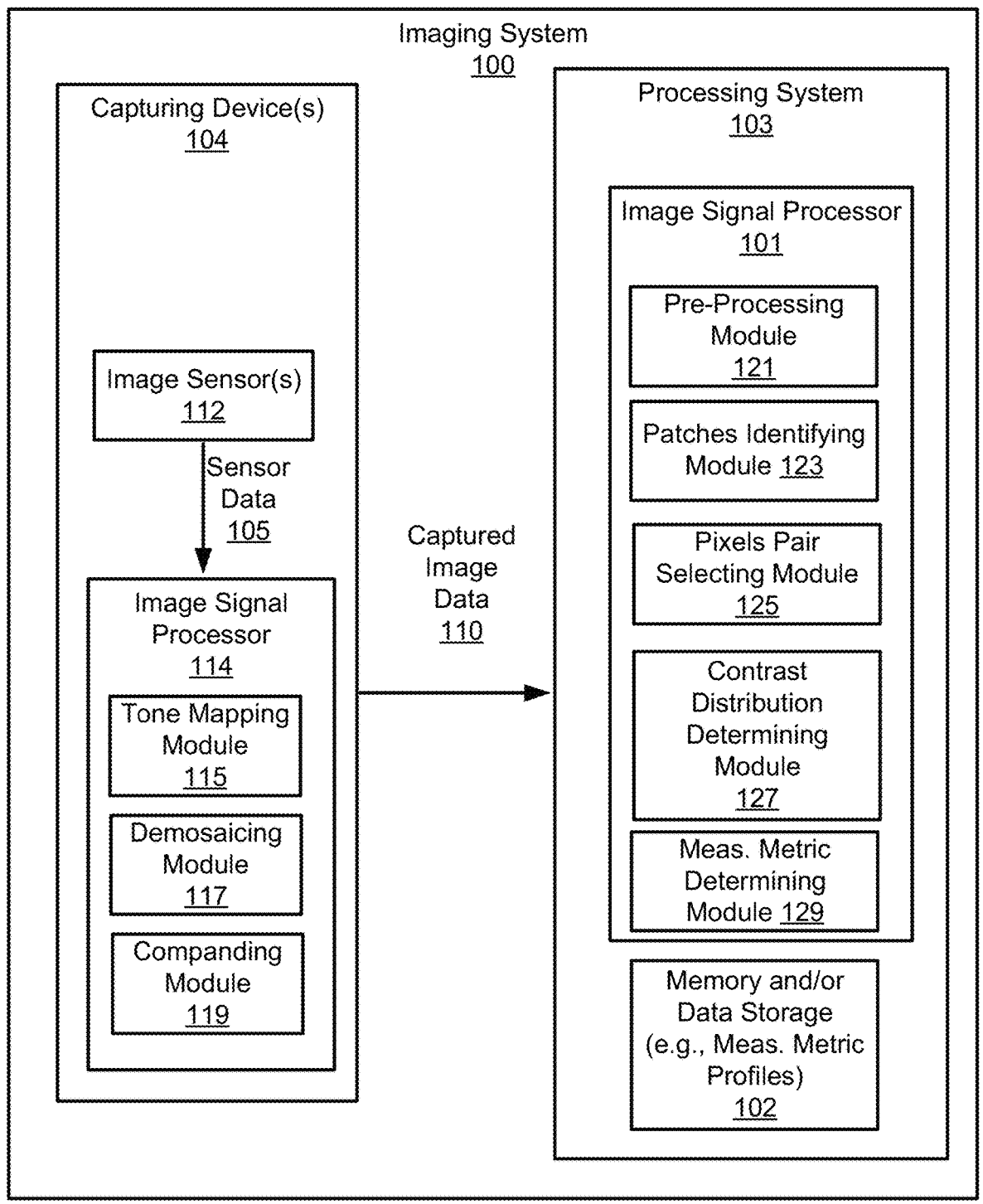
FIGS. 1A-1B illustrate block diagrams of an imaging system according to some embodiments.

Described in embodiments set forth herein are new methods of evaluating detection capabilities of cameras and systems that are configured to perform such methods. In particular, methods described herein can be performed to determine statistical separation between objects and their backgrounds in signals generated by cameras. Such information can be used to determine whether cameras provide adequate data for detection of objects for machine vision tasks, such as autonomous driving, guidance of industrial robots, and so on. The new methods of evaluating detection capabilities of cameras, referred to herein as contrast signal to noise ratio (contrast SNR or CSNR), provide significant improvements over existing methods of evaluating detection capabilities. Additionally, the new methods can be used both in a laboratory setting to assess the capabilities of cameras under controlled conditions and in the field to assess the capabilities of cameras under real life conditions, possibly during deployment or operation of the cameras in the field (e.g., while actually generating data that is being used to perform machine vision tasks). Moreover, in embodiments the CSNR metric may be computed for images in a training dataset that is used to train machine learning models to perform machine vision tasks such as classification, recognition, detection, segmentation, etc. to determine whether the training dataset is adequate for the training process. In embodiments, computed CSNR values may be used to automatically adjust parameters and/or operating modes of cameras. This may improve a functionality of the cameras under different lighting and/or environmental conditions.

Two existing metrics for evaluating detection capabilities of cameras are detectability index, also known as signal to noise ratio idealized ($SNR_I$), and contrast detection probability (CDP).

$SNR_I$ is very accurate, but calculation of $SNR_I$ is too time consuming and resource intensive for practical use. Additionally, conventionally known implementations of $SNR_I$ are restricted to controlled laboratory environments, and cannot be performed on the field. $SNR_I$ represents a signal-to-noise ratio to distinguish between objects and their backgrounds in images captured by cameras. The calculation for $SNR_I$ is performed in frequency space and requires frequency analysis of targets or objects, backgrounds, lens performance and noise power spectra. For these reasons, the calculation is time consuming.

The $SNR_I$ can be calculated as below:

$$SNRI^2 = K^2 \int \frac{|G(v)|^2 MTF(v)}{NPS(v)} dv = (d')^2$$

where K is the large area signal transfer, G(v) is the Fourier transform of the difference between the signal and background, MTF is the system modulation transfer function, and NPS is the noise power spectrum with respect to spatial frequency, v. The large area signal transfer (K) can represent a gain of the system. The MTF represents a transfer function that models various components of the camera system, such as the lens, sensors, demosaicing algorithm, crosstalk, etc.

Figure 3:
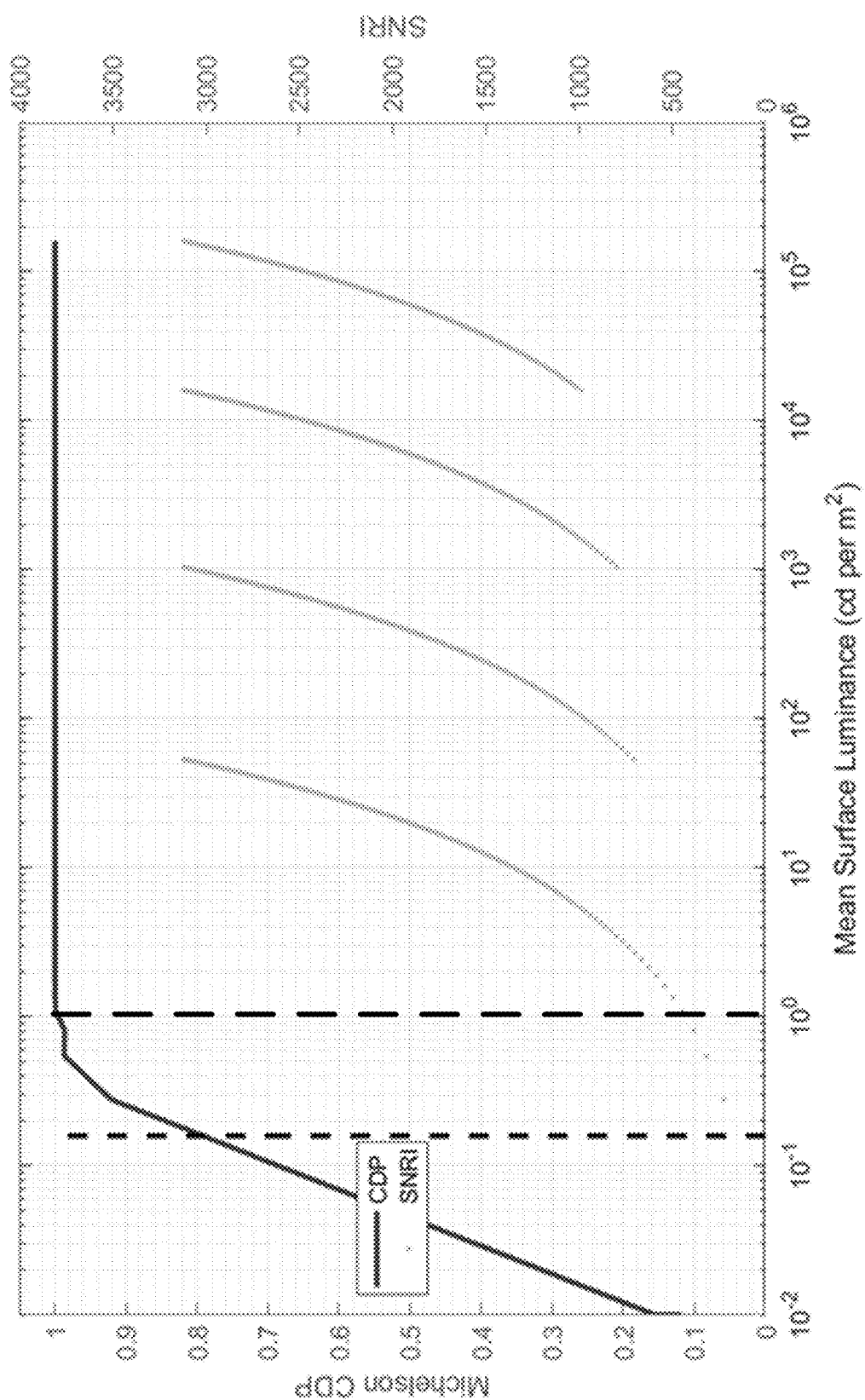
FIG. 3 illustrates a graph for contrast detection probability (CDP) and detectability index ($SNR_I$) for a multiple exposure camera system capturing the traffic sign of FIG. 2 according to one embodiment.
Figure 4:
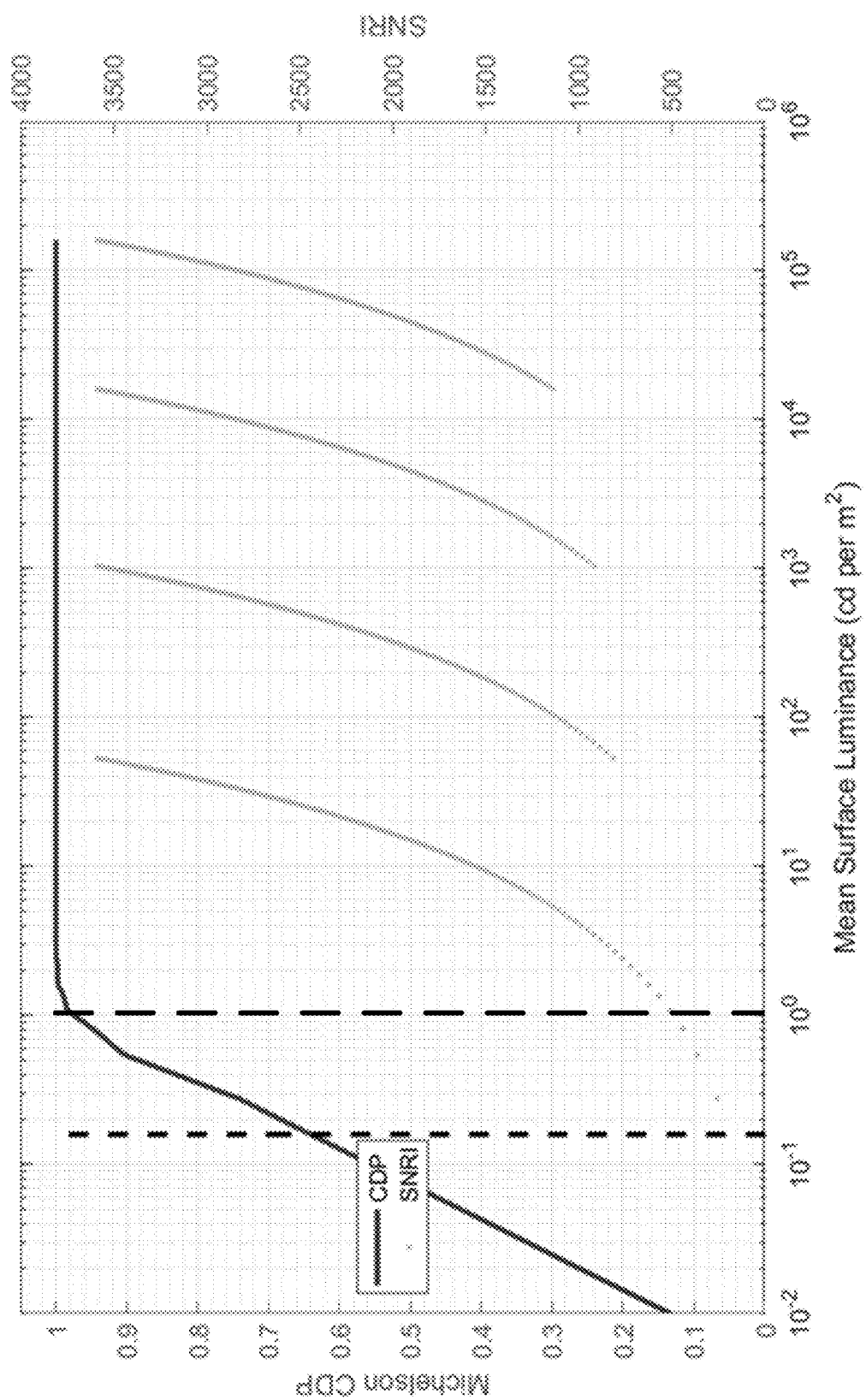
FIG. 4 illustrates a graph for contrast detection probability (CDP) and detectability index ($SNR_I$) for a 10% reflective target against a 2% reflective background according to one embodiment.
Figure 5:
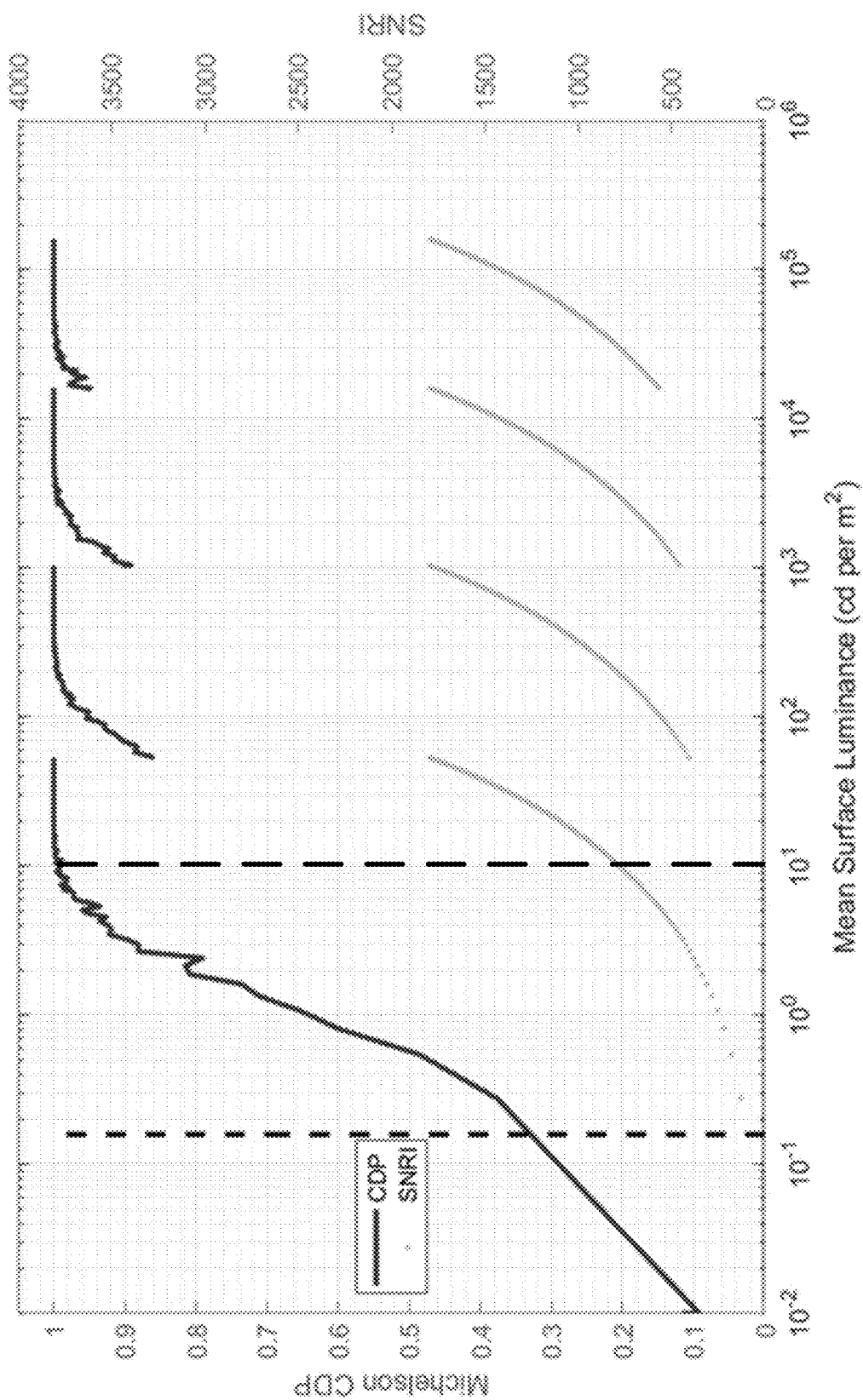
FIG. 5 illustrates a graph for contrast detection probability (CDP) and detectability index ($SNR_I$) for a 10% reflective target against a 5% reflective background according to one embodiment.

Contrast Detection Probability (CDP) is another metric that aims to simplify the evaluation of cameras. CDP can be performed much more quickly and with fewer resources than $SNR_I$, but CDP may not measure the variations exhibited in the performance of some high performance camera systems. For example, CDP saturates at relatively low light levels compared to the operational range of some cameras, as depicted in FIGS. 3-5. CDP can be calculated using a distribution of contrasts from a 'bright' and 'dark' patch in an image captured by the camera to be evaluated. A bound for the contrast distribution is specified by an operator to examine how much of the contrast distribution falls between the specified bound which yields a probability that two pixels chosen at random for the patches will yield a contrast measurement within the bounds. CDP measurements tend to saturate (produce values of one) at relatively low light levels compared to the operational range of high performance cameras. For this reason, they do not represent the sensitivity of contrast detection for some camera systems, such as cameras with a high dynamic range.

Both $SNR_I$ and CDP have advantages and disadvantages for use in assessing the capabilities of cameras. $SNR_I$ is very accurate and provides useful information about the ability of cameras to determine the statistical separation between objects and their background in signals generated by cameras. However, $SNR_I$ cannot generally be measured outside of a controlled laboratory setting and requires too much processor resources and too much time to be practical for use. The CDP measure has a range from 0 to 1 and effectively saturates at 1 for a large range of light levels. When CDP saturates at 1, this indicates that detection is okay, but it provides no further information. CSNR and $SNR_I$ on the other hand continue to provide comparative information in these regions. CDP can be calculated quickly and requires minimal processor resources, but is only accurate within a narrow band of light levels. The cameras that are used for many machine vision tasks (e.g., such as autonomous driving and automated control of robotics) have cameras that operate outside of the narrow band of light levels for which CDP is accurate, rendering CDP largely ineffective for use in measuring the detection ability of cameras used for such machine vision tasks. For example, CDP measurements saturate (produce values of 1) at relatively low light levels compared to the operational range of typical automotive cameras. Also, CDP is not proportional to $SNR_I$, which prevents easy conversion between the two metrics and can present issues with cross compatibility between systems that operate on different metrics.

Embodiments disclosed herein describe the CSNR metric, and methods and systems for determining and using the CSNR metric, which is a metric that produces results that are proportional to $SNR_I$ and that measure the full range of cameras (e.g., do not saturate), and that are simple and fast to calculate with use of few processor resources. Accordingly, the CSNR metric described in embodiments have the advantages of $SNR_I$ and CDP without the disadvantages of either $SNR_I$ or CDP. Embodiments also describe automatic computation or estimation of an $SNR_I$ value. In some embodiments, processing logic computes an $SNR_I$ value based on computation of a CSNR value and a conversion of the CSNR value to an $SNR_I$ value. In embodiments, computed $SNR_I$ values may be used to automatically adjust parameters and/or operating modes of cameras. This may improve a functionality of the cameras under different lighting and/or environmental conditions.

Figure 2:
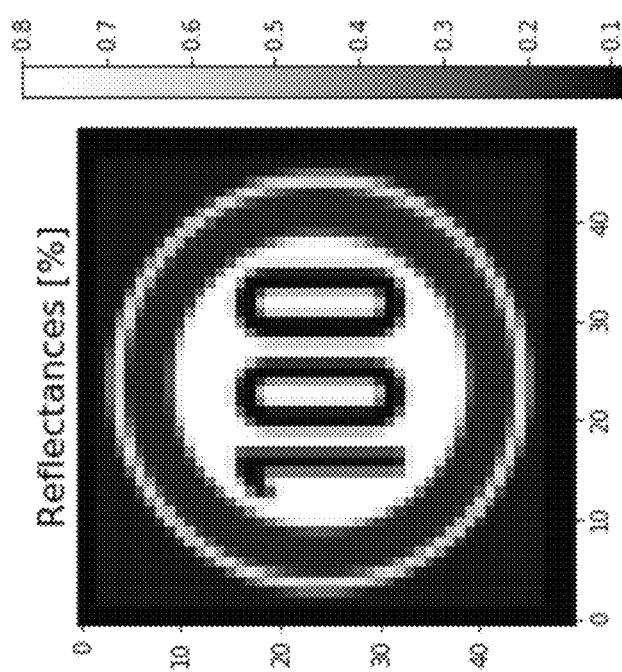
FIG. 2 illustrates a traffic sign with an 80% reflective target (traffic sign) against a 10% reflective background according to one embodiment.

A comparison of the $SNR_I$ and CDP measurement metrics are shown by the examples in FIGS. 2-5. FIG. 2 illustrates a traffic sign with an approximately 80% reflective target (traffic sign) against an approximately 10% reflective background according to one embodiment. The target is a 100 km/h speed limit sign simulated with an isotropic reflectance surface. A property of a surface is its reflectance. A reflectance is a measure of illumination or other radiations striking the surface and that is reflected off the surface. Variations in the surface reflectances of objects to be detected against their background can cause variations in the detectability of the objects.

FIG. 3 illustrates a graph for the traffic sign of FIG. 2 captured by a camera system with multiple (four) exposures. The camera system has an image sensor with 8 megapixels of 2.1 μm pixel size, a lens with a ratio of focal length to aperture of 1.6. The four exposures may be part of a burst set with exposure times of 32 milliseconds, 2 milliseconds, 0.125 milliseconds, and 7.8125 μseconds, respectively. The subsequent exposures are superimposed on the original captured image so that an image with a wider dynamic range can be obtained for display/processing. Here, a multiple exposure is the superimposition of two or more exposures to create a single image.

The captured image data in FIG. 3 reflects an appearance of a traffic sign at dusk (<50 luminance). The contrast formulation used to calculate the CDP is Michelson contrast with +/−10 percent nominal contrast bounds. As depicted in FIG. 3, the reflectance in the captured target (traffic sign) causes the CDP metric to saturate at approximately 1 candela per square meters ($cd/m^2$), whereas the $SNR_I$ metric shows no indication of saturation over the range of mean surface luminance of 0.01 cd/m^2 to 10^5 cd/m^2. Michelson contrast is calculated by e_max−e_min/e_max+e_min, where e_max represents the highest and e_min represents the lowest image channel information (e.g., highest luminance and lowest luminance).

FIG. 4 illustrates a graph for contrast detection probability (CDP) and detectability index ($SNR_I$) for a 10% reflective target against a 2% reflective background according to one embodiment. FIG. 5 illustrates a graph for contrast detection probability (CDP) and detectability index ($SNR_I$) for a 10% reflective target against a 5% reflective background according to one embodiment. Similar to FIG. 3, the contrast formulation used to calculate the CDP in FIGS. 4-5 is Michelson contrast with +/−10 percent nominal contrast bounds. The target with reflectance of approximately 10% can represent a target pedestrian and the background with approximately 2% reflectance can represent a night sky. In FIG. 4, for the scene with the approximately 2% reflective background, the CDP metric saturates at approximately 1 cd/m^2. In FIG. 5, for the scene with a 5% reflective background (a brightness between dusk and night sky), the CDP metric saturates at approximately 10 cd/m^2. Although the CDP measurement metric is easier to calculate than the $SNR_I$, however, the CDP measurement metric saturates for high dynamic range images as shown.

As discussed above, embodiments of this disclosure present a measurement process and a measurement metric, called contrast signal to noise ratio (CSNR), that is proportional to $SNR_I$ and that do not saturate as per CDP, yet are as simple to calculate as CDP. The CSNR measurement metric also provides better discrimination between camera types than CDP. The measurement process may also be applied to captured data allowing for real-time analysis of data of images and video of cameras after deployment of the system containing those cameras.

Figure 6:
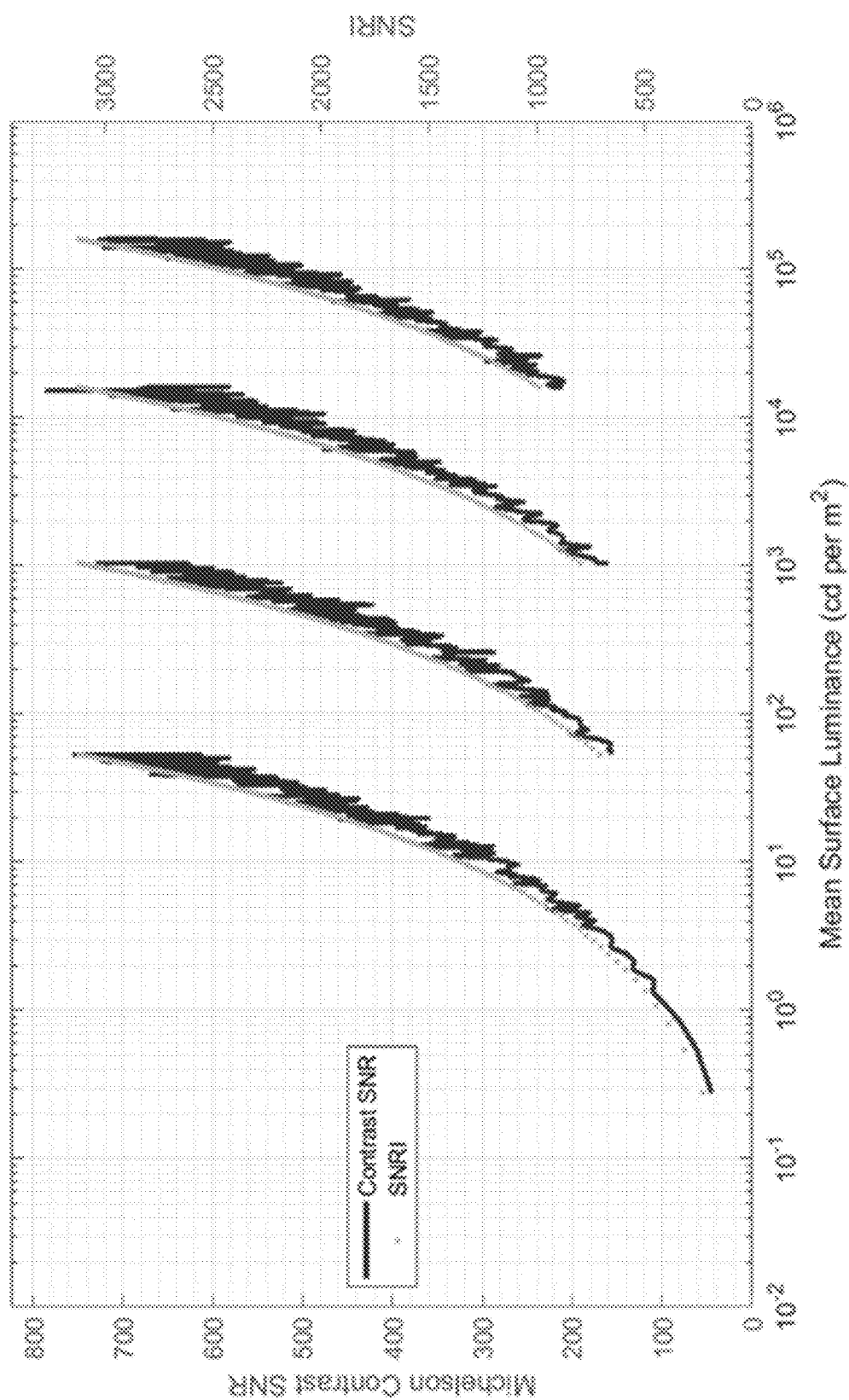
FIG. 6 illustrates a graph for contrast signal to noise ratio (CSNR) and detectability index ($SNR_I$) for a multiple exposure camera system capturing the traffic sign of FIG. 2 according to one embodiment.
Figure 7:
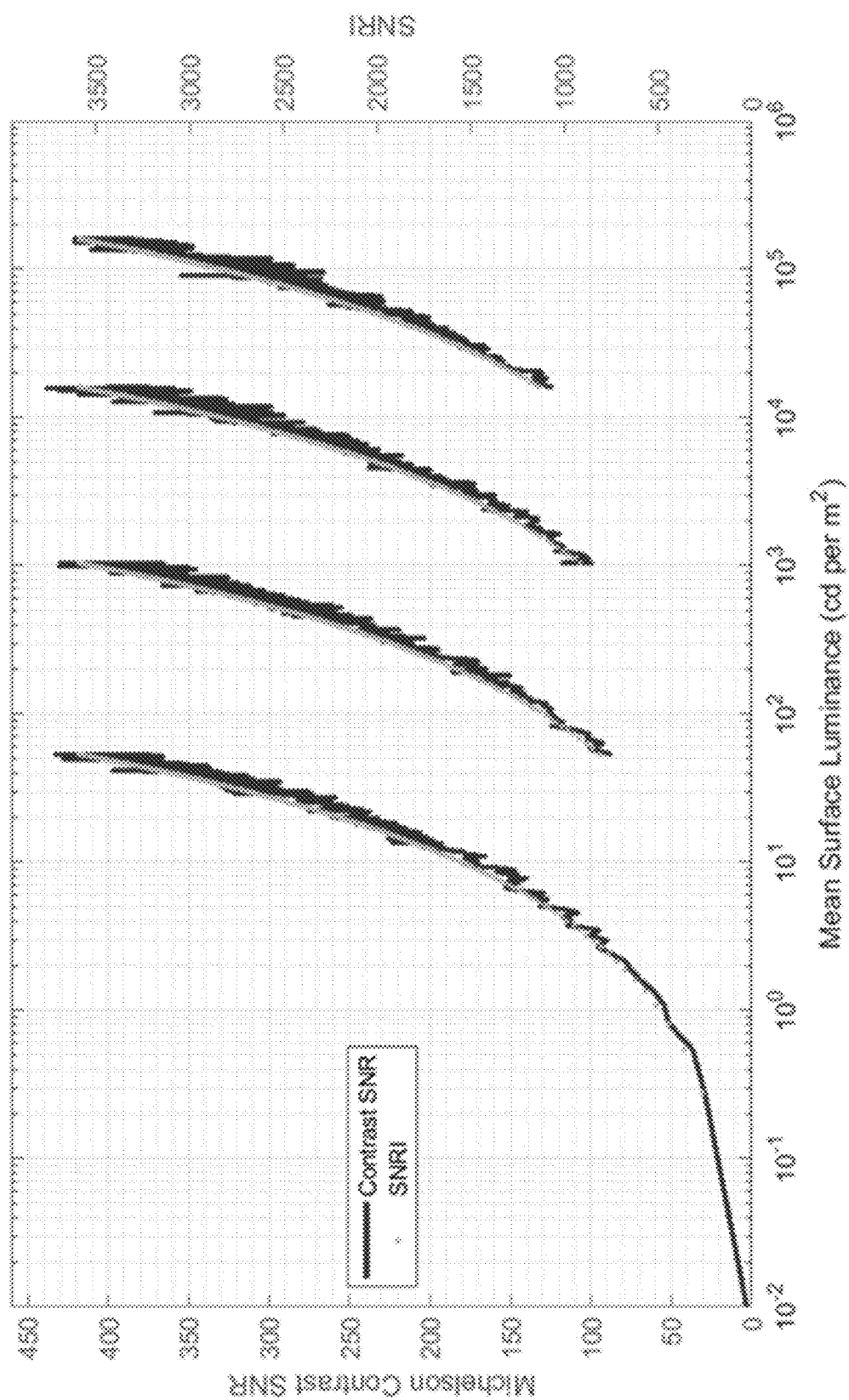
FIG. 7 illustrates a graph for contrast signal to noise ratio (CSNR) and detectability index ($SNR_I$) for a 10% reflective target against a 2% reflective background according to one embodiment.

According to a first aspect, the measurement process captures two patches of an image generated by a camera system. The luminance for the patches can be calculated as an average luminance of the pixels in the patches. A pair of pixels, one chosen from each patch of the image, can be used to calculate a contrast between the patches. The contrast calculation can be repeated for different pixel combinations between the two patches to create a distribution of contrast values. A mean value and a standard deviation value of the contrast is calculated from the contrast distribution. The measurement metric (CSNR) is then calculated by dividing the mean value by the standard deviation value. The measurement process may be repeated for any number of patches with different brightness combinations, from any number of images, to yield a curve for the measurement metric (CSNR profile) over a predetermined range of luminance values. Different from the existing $SNR_I$ and CDP metrics, the CSNR metric can be generated from captured images in real-time or with live streamed data. As illustrated in FIGS. 6-7, the measurement metric (CSNR profile) is proportional to $SNR_I$ and does not saturate as per CDP (as shown in FIGS. 3-5).

According to a second aspect, a system receives pixel data from a pair of regions of an image generated by an imaging device, the pair of regions includes a first region and a second region of the image, where the first region comprises a first plurality of pixels of the image and the second region comprises a second plurality of pixels of the image. The system determines a plurality of pixel pairs of the image, where a pixel pair of the plurality of pixel pairs includes a first pixel from the first plurality of pixels and a second pixel from the second plurality of pixels. The system calculates a plurality of contrasts based on the plurality of pixel pairs, where a contrast for the pixel pair is calculated between pixel data for the first pixel and pixel data for the second pixel from the pixel pair. The system determines a contrast distribution based on the plurality of contrasts. The system calculates a value representative of a capability of the imaging device to detect contrast based on a mean value and a standard deviation value based on the contrast distribution. The system determines a reduction in contrast detectability of the imaging device based on the value.

Figure 1B:
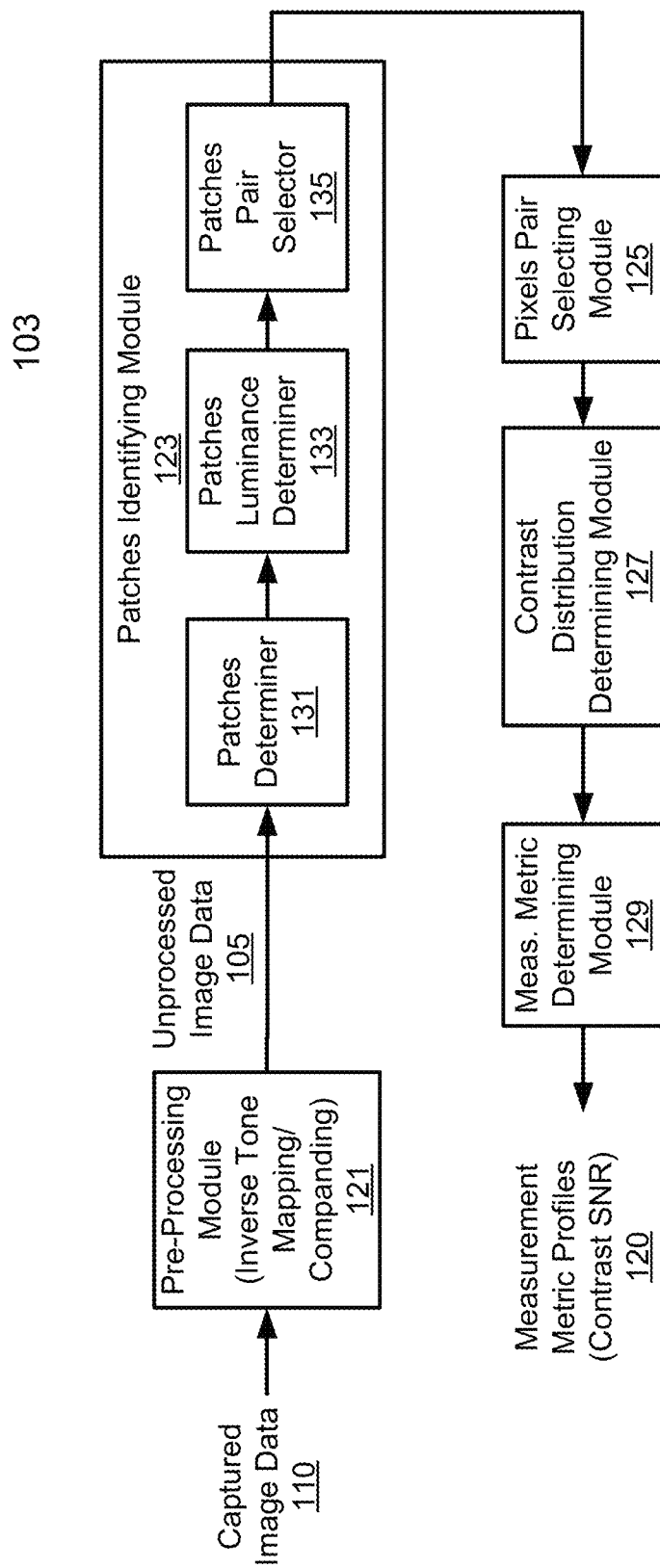

FIGS. 1A-1B illustrate block diagrams of an imaging system 100 to calculate a measurement metric (CSNR) according to one embodiment. Imaging system 100 can represent a processing system having camera sensor(s) used to capture a still image or a video stream. System 100 can be a camera device, a laptop, a handheld device, a portable electronic device, an imaging system for a vehicle (e.g., an autonomous vehicle), an imaging system for a robot, or any system/device that can capture an image. In one embodiment, system 100 includes capturing device(s) 104 and processing system 103.

Capturing device(s) 104 and/or processing system 103 may be components of an image signal processing (ISP) pipeline or a digital signal processing (DSP) pipeline, in accordance with at least one embodiment. In at least one embodiment, an image is a two-dimensional (2D) image. In at least one embodiment, an image is a three-dimensional (3D) image.

Capturing device(s) 104 may include image sensors 112 and optionally an image signal processor 114. Image sensors 112 can be, for example, complementary metal oxide semiconductor (CMOS) sensors, light detection and ranging (LiDAR) sensors and/or charge coupled device (CCD) sensors. In some embodiments, image sensors 112 have a high dynamic range, which is a ratio of maximum light intensity measurable (at pixel saturation) to minimum light intensity that is measurable. Dynamic range may be measured as a ratio or as a base-10 (decibel) or base-2 (stops) logarithmic value of the difference between the smallest and largest signal values. In photography, dynamic range is generally measured in base-2 logarithmic exposure value differences, known as stops, where each stop represents a doubling of the amount of light. Generally speaking, revealing detail in darker regions of images (e.g., in shadows) is achieved with high exposures, while preserving detail in bright regions of images is achieved with low exposures. In general, exposure values can be controlled by changing the size of a camera's aperture and/or by changing the exposure time. For typical camera systems the dynamic range of operation of a camera may extend well above 1:1000000 or 20 bits. Cameras with a dynamic range of up to 24 bits can also be found. CDP saturates for approximately 60-80% of the dynamic range of cameras depending on configuration. CSNR and $SNR_I$ provide non-saturated measurements 100% of the time regardless of configuration. Image signal processor 114 may be a processing device used for image processing. In at least one embodiment, the image signal processor 114 is or includes one or more digital signal processors (DSPs). Image signal processor 114 may include one or more modules (e.g., tone mapping module 115, demosaicing module 117, companding module 119), each of which may perform one or more image processing operations. As discussed herein, modules may be implemented in hardware, software, firmware, or combinations thereof.

Image sensors 112 can be triggered to capture sensor data 105, such as an image or an image frame from a video stream. The sensor data 105 (e.g., image or video frame), may include two-dimensional (2D) data and/or three-dimensional (3D) data. In at least one embodiment, sensor data 105 is a color image. In at least one embodiment, sensor data 105 is a monochrome image. Image signal processor 114 can perform signal processing on the sensor data 105 to obtain captured image data 110, which may be processed image data. For example, the image signal processor 114 can include tone mapping module 115, demosaicing module 117, and/or companding module 119. Tone mapping module 115 can map the sensor data 105 from an initial set of colors to a new set of colors to change a dynamic range, or contrast ratio, of an image while retaining localized contrast. Tone mapping module 115 may, for example, increase the dynamic range of an image for a given display medium that has a limited dynamic range, or may reduce the dynamic range of an image.

Demosaicing module 117 can use a demosaicing algorithm to estimate the color values of a pixel that is not measured/sensed to achieve a higher resolution than what is captured. Typically, colors in the image data 105 are sensed by a portion of the image sensor(s) 112 with a color filter. Using the color filters for a portion of the sensor pixels causes the resolution of the image to decrease because these sensor pixels are used to detect specific colors. A demosaicing algorithm can use neighboring pixels information to estimate the pixel values for these sensor pixels to generate an image with a higher resolution.

Companding module 119 can compress (via a lossy function) image data, in which a high dynamic range (HDR) image may be converted to a low dynamic range (LDR) image, or vice versa. Compressing the image can reduce a size of the image data for better data bandwidth.

Processing system 103 (also referred to as a processing device) may be a computer or other computing device. In embodiments, processing system 101 may be an embedded system and/or a system on a chip (SoC). Processing system 103 may include a processor 101 as well as a memory and/or data storage 102. Processor 101 may be or include one or more general-purpose processors such as a microprocessor, central processing unit, or the like. More particularly, the processor 101 may be or include a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 101 may additionally or alternatively include one or more graphical processing units (GPUs). Processor may also be or include one or more special-purpose processing devices such as an application specific integrated circuit (ASIC), a field programmable gate array (FPGA), a digital signal processor (DSP), network processor, or the like. Processor 101 is configured to execute the processing logic for performing the operations and steps discussed in embodiments herein.

In the illustrated example, processing system 103 is separate and distinct from capturing device(s) 104. For example, capturing devices 104 may include image signal processor 114, which may have less processing resources than processor 101, and thus imaging system may include both image signal processor 114 and processor 101. In one embodiment, processing system 103 is integrated into capturing devices 104. In such embodiments, image signal process 114 or processor 101 may be omitted, and the operations described with reference to the omitted one of the image signal processor 114 or processor 101 may be performed by the remaining one of the image signal processor 114 or processor 101. In one embodiment, image signal processor 114 is omitted, and image sensors 114 send sensor data 105 to processing system 103. In such an embodiment, processor 101 may include tone mapping module 115, demosaicing module 117 and/or companding module 119.

Processing system 103 can receive captured image data 110 from capturing device(s) 104 (also referred to as image capture devices) for processing. Captured image data 110 may represent a tone mapped and/or companded image. Processor 101 can pre-process captured image data 110 and calculate measurement metric profiles (CSNR) 120 from captured image data 110. The measurement metric profiles (CSNR) can be stored in memory and/or data storage 102, and used by the imaging system 100 to evaluate contrast detectability of the capturing device(s) 104. As set forth above, in one embodiment, processing system 103 is integrated with capturing device(s) 104 as a single unit. In one embodiment, image signal processor 114 and processor 101 can represent a same processing unit. In another embodiment, processing system 103 may be a standalone system communicatively coupled to capturing device(s) 104 directly or over a network.

As shown in FIG. 1A, image signal processor 101 can include pre-processing module 121, patches identifying module 123, pixels pair selecting module 125, contrast distribution determining module 127, and/or measurement metric determining module 129. Pre-processing module 121 can pre-process captured image data 110 to obtain image data without any image enhancement effects. In at least one embodiment, a measurement metric is calculated based on unprocessed outputs from image sensors of the capturing device(s) 104. For example, if captured image data 110 is tone mapped or companded, pre-processing module 121 can apply an inverse of the tone mapping transformation to the image data 110 to obtain the unprocessed image data 105. Pre-processing module 121 can also apply a color transformation to an image. For example, if the image data may represent an image in the red-green-blue (RGB) color space, and pre-processing module 121 can apply a color transformation to the image to convert the image into the (luminance and chrominances) YCrCb color space, where luminance represents a brightness channel and chrominance represents the Cr and Cb color channels.

Patches identifying module 123 can identify a number of patches in an image that is uniform in size, e.g., 10 pixels by 10 pixels. In one embodiment, patches identifying module 123 includes patches determiner 131, patches luminance determiner 133, and patch pair selector 135 as shown in FIG. 1B. For a given channel (e.g., luminance), patches determiner 131 can use an edge detection algorithm to outline the boundaries in an image for the channel. Based on the boundaries, patches determiner 131 can identify areas of pixels outlined by the boundaries. The areas can be divided into regions/patches of the same size, e.g., 10 pixels by 10 pixels. Alternatively, regions/patches may have different sizes.

In one embodiment, patches luminance determiner 133 can determine an average luminance of a patch (or a pair of patches) by averaging the luminance of the pixels in the patch (or the pair of patches). Patch pair selector 135 can then select a number of pairs of patches among the available patches for measurement metric calculations.

Pixels pair selecting module 125 can receive a pair of patches and select a number of pixel pairs from the pair of patches. For example, pixels pair selecting module 125 can iterate through each pixel in the first patch and each pixel in the second patch of the pair of patches, and pair the pixels from the first patch to the second patch. For example, if each patch has a 100 pixels (e.g., 10 pixels by 10 pixels), there can be 10000 combinations of pixel pairs. In one embodiment, each pixel pair is used to calculate a contrast between the pixels in the pixel pair. The contrast calculation can be a Weber contrast, a Michelson contrast, or a difference contrast, for example. The different contrast calculations can be as follows:

Weber=$e\_max/e\_min-1$,

Michelson=$e\_max-e\_min/e\_max+e\_min$,

Difference=$e\_max-e\_min$, where $e\_max$ represents the luminance of a first pixel in the pixel pair, and $e\_min$ represents the luminance of a second pixel in the pixel pair.

In one embodiment, the contrast calculation can be performed for a luminance channel, a color channel, or a radiance channel in the image. A color image for instance has a red, green, and a blue channel. A luminance channel can be derived from the red, green, and blue channels, via a color space transformation. A radiance channel can be captured by an infra-red camera, or can be similarly computed based on information from multiple channels.

A contrast calculation performed on a color channel(s) or luminance channel is useful to distinguish if the camera can measure the miniscule differences between pixels corresponding to the color channel(s) or luminance channel. The radiance channel is useful to determine the sensitivity of an infra-red camera to distinguish a change in the infra-red/heat signatures in an image.

In one embodiment, absolute luminance and/or radiance information is computed for each pixel in an image either by pre-processing module 121 or by another module. Luminance may be measured using candela per square meter ($cd/m^2$). The module may be a module of image signal processor 114 or of processor 101. One or more additional channel(s) may be added to the image, where the additional channel(s) includes absolute luminance values or absolute radiance values. An absolute measurement of light (luminance) and/or radiance at each pixel value enables better discrimination and can improve the accuracy of the ultimately computed CSNR metric.

In at least one embodiment, pre-processing module 121 and/or one or more other modules may perform a sequence of operations at an ISP pipeline in order to process an image and generate absolute luminance values and/or radiance values for an image received from image sensor(s) 112, such that each pixel of an image may have a corresponding luminance value. In at least one embodiment, operations performed at an ISP pipeline may include a linearization operation for an image to transform it into a linear space that is proportional to an amount of light recorded at each channel of image. Subsequent to linearizing an image, processing logic may apply a lens shading correction operation to the image to correct darker areas around edges of the image. Operations performed may further include applying a demosaicing process (e.g., by demosaicing module 117) to estimate pixels that were not measured by a camera sensor. Following the demosaicing process, processing logic may apply a color correction matrix (CCM) to minimize color errors at the image while transforming the image to a corrected color format such as a standard RGB (sRGB) format. In at least one embodiment, processing logic may produce a new set of channels as an output of a CCM process representing corrected colors in sRGB. In at least one embodiment, a produced set of channels may include absolute color information about an image. In at least one embodiment, processing logic may then perform an operation to generate a luma channel and/or a radiance channel as an additional channel of an image that represents calculated luminance values (or radiance values) of an image. In at least one embodiment, a luma channel includes values that represent a calculated relative luminance. In at least one embodiment, a relative luminance value can be calculated for each pixel of an image as a weighted sum of color channels outputted from said CCM operation. In at least one embodiment, a radiance channel includes values that represent a calculated relative radiance.

In at least one embodiment, processing logic may also perform an operation to calibrate relative luminance values of a luma channel and/or relative radiance values of a radiance channel for a specific exposure time, lens aperture, and/or effective ISO speed of a corresponding capturing device 104 using a calibration constant that is determined based on capturing calibration images with known luminance values. ISO speed may indicate a sensitivity of a camera sensor such as a complementary metal oxide semiconductor (CMOS) sensor toward light. In at least one embodiment, relative luminance values may be multiplied by a calibration constant to yield calibrated luminance values at a luma channel. Processing logic may further calculate a calibrated exposure value at an equivalent ISP 100 speed for calibration images. In at least one embodiment, a calibrated exposure value may be calculated using a calibrated ISP speed, exposure time, and lens aperture of a camera. Calibrated exposure value may be used to correct luminance values and/or radiance values for images captured at different values of exposure time, lens aperture, and/or ISO speed than equivalent calibrated values. In at least one embodiment, a calibrated lens aperture of a camera, a calibrated exposure time of a camera, and a calibrated iso_speed of a camera may be physical properties of a camera, metadata, and/or configuration parameters of said camera that may be stored at memory of a camera, such as on a system on a chip (Soc) of a respective camera. Finally, processing logic may calculate an absolute luminance value and/or a radiance value corresponding to each pixel of an image based on a calibrated exposure value and an actual exposure value of a camera frame at a time of capturing an image. In this case, an actual exposure value (EV100_Frame) may be calculated based on an actual lens aperture, an actual exposure time, and an actual ISO speed of a camera at a time of capturing the image. In at least one embodiment, absolute luminance values and/or absolute radiance values of pixels of image can be calculated based on calibrated exposure value, actual exposure value and relative luminance value of luma channel and/or relative radiance value of radiance channel.

Subsequent to generating absolute luminance values and/or absolute radiance values for an image, processing logic may generate an updated version of an image using generated luminance values, generated radiance values and/or generated channels of corrected colors. In at least one embodiment, processing logic may generate an updated image that includes a set of channels in a corrected color space in addition to a generated luma channel containing luminance values of an image and/or a generated radiance channel containing radiance values of an image. Patches identifying module 123 and/or pixels pair selecting module 125 may operate on images that have been processed and updated to include absolute luminance information and/or absolute radiance information in embodiments.

In one embodiment, contrast distribution determining module 127 can determine a contrast distribution using the contrasts calculated from the different combinations of pixel pairs. For example, for two patches having 10 by 10 pixels, the combination of pixels pairs are used to calculate 10000 corresponding contrast values and the 10000 contrast values are used to generate the contrast distribution. The contrast distribution can represent a probability density function of the contrast values. In another embodiment, the contrast distribution is calculated from a predetermined subset of randomly selected combinations of pixel pairs.

Next, measurement metric determining module 129 can apply a mean function and a standard deviation function to the contrast distribution (probability density function) to obtain a mean value and a standard deviation value of the contrast distribution. The measurement metric (CSNR) is then calculated from the mean value divided by the standard deviation value. Here, the measurement metric (CSNR) represents a sensitivity to contrast for the imaging system for a particular channel of the image, such as luminance.

Measurement metric determining module 129 can repeat the calculations for other patch pairs identified within the image (or subsequent images captured by the imaging system) to determine additional measurement metrics (CSNR) to generate a measurement metric profile (CSNR profile). A measurement metric profile provides measurement metrics for a range of luminance values.

FIG. 6 illustrates a graph for contrast signal to noise ratio (CSNR) and detectability index ($SNR_I$) for a multiple exposure camera system capturing the traffic sign of FIG. 2 according to one embodiment. FIG. 7 illustrate a graph for contrast signal to noise ratio (CSNR) and detectability index ($SNR_I$) with a 10% reflective target against a 2% reflective background according to one embodiment. As shown in FIGS. 6-7, the measurement metric (CSNR) is proportional to the $SNR_I$ over the range of mean surface luminance values of $10^{-2}$ to $10^5$ cd/m^2. Unlike CDR, the CSNR values show no signs of saturation in the given range of mean surface luminance values. Although FIGS. 6-7 show CSNR computed for an image taken of a target and background with known reflectance, CSNR can also be calculated for scenes with unknown targets/backgrounds, or the targets to be detected has an unknown reflectance and/or unknown color. Such measurements may be performed, for example, if absolute luminance values and/or absolute radiance values are first computed for pixels of the image. The CSNR may then be computed based on the absolute luminance values and/or absolute radiance values of the image.

In one embodiment, based on the above proportionality, $SNR_I$ can be estimated by calculating the CSNR and multiplying the CSNR by a proportionality constant. Derivation of the proportionality of CSNR to $SNR_I$ is illustrated as follows.

Derivation of the Proportionality Constant

CSNR can be demonstrated to be proportional to $SNR_I$ (e.g., $SNR_I$=CSNR*proportionality constant) for a target with a target area (A) in an image. In at least one embodiment, the target area can represent a count for the number of pixels covering an outline of the target area (an object of interest) in the image, via edge detection. In at least one embodiment, the target area can be an area for a bounding box (total count of pixels represented by the bounding box) for a detected object in the image, where the bounding box bounds the object and is generated from detecting the object using a machine learning (neural network) model. Using a proportionality constant (derivation as shown further below) and a CSNR, the detectability index ($SNR_I$) of an object can be estimated from the target area (A) and a mean contrast of the image (C).

In at least one embodiment, if the object moves away from (or closer to) the imaging sensor (e.g., target area (A) decreases), an imaging system can estimate, using the proportionality constant, that the detectability of the object ($SNR_I$) is to decrease (or increase) proportionally. In other words, the imaging system can estimate detectability of the object proactively for a given distance from the imaging sensor to the detected object.

In at least one embodiment, processing logic calculates CSNR and uses CSNR to calculate $SNR_I$. Such calculations can be performed on-the-fly, in real time or in near-real time during use of a camera system. Direct computations of $SNR_I$ are made using special calibration targets, and cannot be made while a camera system is in use in the field. However, in embodiments $SNR_I$ can be calculated in the field while a camera system is in use. This enables $SNR_I$ to be calculated, for example, for a camera system of an autonomous vehicle while the autonomous vehicle is driving. The computed $SNR_I$ can then be used to determine detectability of a given scene, and the autonomous vehicle can take actions accordingly, such as slowing down or stopping under certain conditions.

Single Exposure Low Dynamic Range Image

For a single exposure image, the CSNR to $SNR_I$ proportionality constant can be calculated according to the following:

CSNR may be written as $$CSNR = \frac{C}{\sigma_C} \quad (1)$$

where C is the mean contrast and $\sigma_C$ is the standard deviation of the contrast.

If considering shot noise, the variation in contrast, $V_C$, for Weber Contrast, can be estimated as:

$$V_c = \frac{e\_max}{e\_min^2} + \frac{e\_max^2}{e\_min^3} \quad (2)$$

where e_max is the maximum patch brightness and e_min the minimum patch brightness in quanta, where $V_c = \sigma_C^2$.

The mean of the contrast, C, is estimated to be:

$$C = \frac{e\_max}{e\_min} - 1 \quad (3)$$

Mean luminance, L, of the signal (photons) is:

$$L = \frac{e\_max + e\_min}{2} \quad (4)$$

Rewriting e_max and e_min in terms of L and C. From (4)

$$2L = e\_max + e\_min \quad (5), and$$

$$2L - e\_min = e\_max \quad (6)$$

From (3), (c+1)=e_max/e_min, and therefore:

$$e\_max = (c+1) \times e\_min \quad (7)$$

Setting (6) equal to (7), $2L - e\_min = (c+1) \times e\_min,$ $2L - e\_min = c \times e\_min + e\_min,$ $2L = c \times e\_min + 2 \times e\_min,$ $$e\_min = 2L/(c+2) \quad (8)$$

From (5), $e\_min = 2L - e\_max,$ from (3), $e\_max = (c+1) \times e\_min,$

Therefore, $e\_max = (c+1) \times (2L - e\_max)$ and $2LC - C \times e\_max + 2L - e\_max = e\_max$ And, $2LC + 2L = 2 \times e\_max + c \times e\_max,$ and $2LC + 2L = (c+2) \times e\_max$ $$\text{Therefore, } e\_max = (2LC + 2L)/(C+2) \quad (9)$$

The $SNR_I$ may be written as, $$SNRI = \sqrt{\frac{(t_2 - t_1)^2}{1/2(\delta_1^2 + \delta_2^2)}} \quad (10)$$

where $t_1$ is mean signal of background and $t_2$ is mean signal of target and $\sigma_1$ and $\sigma_2$ the standard deviation of the background and the target, respectively.

Using an area, A, and considering Poisson shot noise $t_2 = e\_max \times A$ and $t_1 = e\_min \times A,$ $\sigma_2 = \text{sqrt}(e\_max)/\text{sqrt}(A),$ and $\sigma_1 = \text{sqrt}(e\_min)/\text{sqrt}(A).$ Therefore, $SNR_I$ for a target A would be:

$$SNRI = \sqrt{\frac{(A \times e\_max - A \times e\_min)^2}{\left(\frac{e\_max}{2A} + \frac{e\_min}{2A}\right)}} \quad (11)$$

Substituting (8) and (9) into (11) and simplifying we can rewrite $SNR_I$ in terms of L and C as:

$$SNRI = \sqrt{\frac{4C^2 L A^3}{(C+2)^2}} \quad (12)$$

Rearranging (12) to give L we have:

$$L = \frac{SNRI^2 (C+2)^2}{4C^2 A^3} \quad (13)$$

In a similar manner, using equations (1), (2) and (2.2), the Contrast SNR, CSNR, may be written $$CSNR = \frac{C}{\sqrt{V_c}} = \frac{\frac{e\_max}{e\_min} - 1}{\sqrt{\frac{e\_max}{e\_min^2} + \frac{e\_max^2}{e\_min^3}}} \quad (14)$$

Equation (14) can represent a fast CSNR estimation technique according to one or more embodiments.

Substituting (8) and (9) into (14) and simplifying we may also rewrite CSNR in terms of L and C as:

$$CSNR = \frac{\sqrt{2} C}{\sqrt{\frac{(C+1)(C+2)^2}{L}}} \quad (15)$$

Rearranging (15) to give L we have:

$$L = \frac{CSNR^2 (C+1)(C+2)^2}{2C^2} \quad (16)$$

Equations (13) and (16) obtains L in terms of $SNR_I$, CSNR, and C. The above shows $SNR_I$ is proportional to CSNR via the contrast (which is a constant) for any given luminance. Setting Equation (13) equal to Equation (16) and simplifying we can discover the proportionality of $SNR_I$ to CSNR to be:

$$\frac{CSNR^2(C+1)(C+2)^2}{2C^2} = \frac{SNRI^2(C+2)^2}{4C^2 A^3} \quad (17)$$

Multiplying Equation (17) by $4C^2$, and dividing by $(C+2)^2$, yields:

$$2CSNR^2(C+1) = \frac{SNRI^2}{A^3} \quad (18)$$

Dividing (18) by $CSNR^2$ and multiplying by $A^3$ obtains:

$$2(C+1)A^3 = \frac{SNRI^2}{CSNR^2} \quad (19)$$

Taking square roots of (19) and multiplying by CSNR provides:

$$SNRI = \sqrt{2(C+1)A^3} \cdot CSNR \quad (20)$$

Therefore, for a LDR image with a target of area A and a mean contrast C, $SNR_I$ (detectability index) is proportional to CSNR via Equation (20) for all luminance levels.

Multiple Exposure High Dynamic Range Image

Several methods can be used to extend the dynamic range of an image. A HDR sensor can use a sequential exposure scheme to generate HDR images. Three or more exposures, typically named T1, T2, T3, etc. are captured in quick succession, where these exposures get subsequently shorter in time (e.g., 0.5 sec, 0.1 sec, 0.02 sec) by a factor known as the exposure ratio.

In a conventional time-based HDR generation method, when the longest exposure (T1) saturates, T2 is used to extend the exposure range. When T2 saturates, T3 is used to extend the exposure range, and so forth. The exposure ratio between T1 and T2 is T1/T2. The exposure ratio between T1 and T3 is T1/T3. For an image with a target of interest, the exposure ratio for the target (call it r_max) can be determined as the exposure ratio where the image pixels for the target pixels saturate (e.g., no longer distinguishable), or the image signal in the target area starts to clip. The exposure ratio for a background (r_min) can be determined as the exposure ratio where the image pixels for the background saturate, or the image signal in the background starts to clip.

Although the exposure ratio is illustrated using exposure time in the above example, in at least one embodiment, the exposure ratio can also be calculated from a ratio of photosensitivity, exposure area, or conversion gain using separate imaging sensors.

For a multi-exposure high dynamic range (HDR) image, the CSNR to $SNR_I$ proportionality constant can be calculated according to the following:

From Equation (8), $$e\_min \times r\_min = 2L/(c+2) \quad (21)$$

where r_min is the exposure ratio for the background.

From Equation (9), $$e\_max \times r\_max = (2LC+2L)/(C+2) \quad (22)$$

where r_max is the exposure ratio for a target of interest.

From Equation (14), CSNR can be written as:

$$CSNR = \frac{C}{\sqrt{V_c}} = \frac{\frac{e\_max \times r\_max}{e\_min \times r\_min} - 1}{\sqrt{\frac{e\_max \times r\_max}{e\_min^2 \times r\_min^2} + \frac{e\_max^2 \times r\_max^2}{e\_min^3 \times r\_min^3}}} \quad (23)$$

Equation (21-22) and (23) gives:

$$CSNR = \frac{\sqrt{2} \times C}{\sqrt{\frac{(C+1)(C+2)(r\_min + r\_max + C \times r\_min)}{L}}} \quad (24)$$

$$CSNR^2 = \frac{2C^2 L}{(r\_min + r\_max + C \times r\_min)(C^2 + 3C + 2)} \quad (25)$$

From Equation (11), $SNR_I$ can be written as:

$$SNRI = \sqrt{\frac{(2A \times (e\_min \times r\_min - e\_max \times r\_max)^2}{(e\_min \times r\_min^2 + e\_max \times r\_max^2)}} \quad (26)$$

Equation (21-22) and (11) gives:

$$SNRI = 2\sqrt{\frac{C^2 LA}{(r\_min + r\_max \times (C+1))(C+2))}} \quad (27)$$

$$SNRI^2 = \frac{4C^2 LA}{(C+2)(r\_min + r\_max + C \times r\_max)} \quad (28)$$

From Equations (25) and (28), $$SNRI^2 = CSNR^2 \frac{2A(C+1)(r\_min + r\_max + C \times r\_min)}{(r\_min + r\_max + C \times r\_max)} \quad (28)$$

$$SNRI = CSNR\sqrt{2A + \frac{2CA \times r\_min(C+2)}{r\_min + r\_max + (C+1)}} \quad (29)$$

Therefore, for a HDR image with a target area A and a mean contrast C, $SNR_I$ (detectability index) is proportional to CSNR via Equation (29) for all luminance levels.

Figure 8:
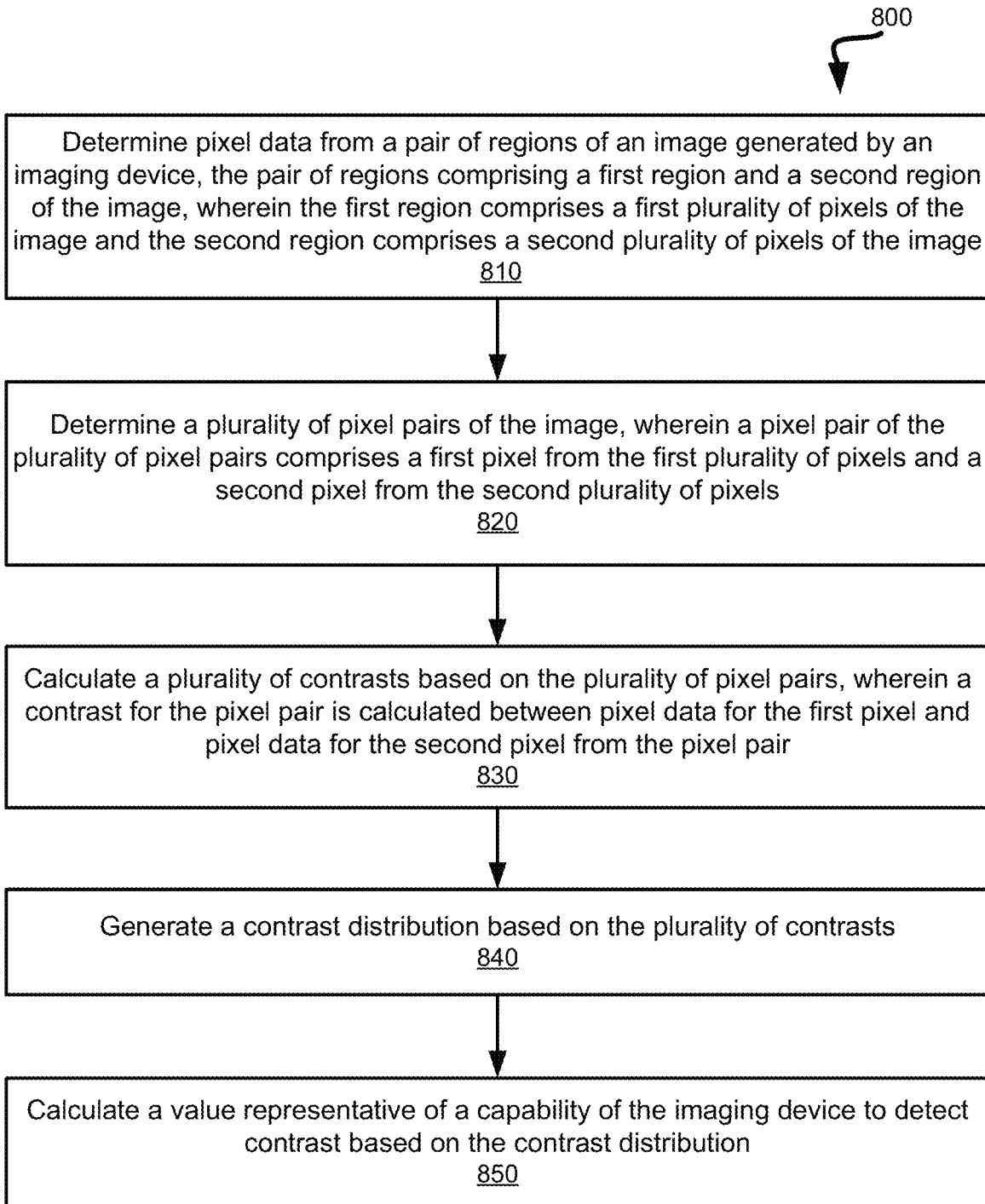
FIG. 8 illustrates a flow diagram of a method to calculate a CSNR according to one embodiment.

FIG. 8 illustrates a flow diagram of a method to calculate a CSNR according to one embodiment. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by imaging system 100 of FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 810, processing logic determines pixel data from a pair of regions of an image generated by an imaging device, where the pair of regions includes a first region and a second region of the image, where the first region includes a first plurality of pixels of the image and the second region includes a second plurality of pixels of the image. For example, processing logic can receive an image from an image sensor. If the image is tone mapped or companded, processing logic can pre-process (inverse tone map, linearize, etc.) the image. In some instances, absolute luminance values and/or absolute radiance values may have been computed for the image. In some instances, pre-processing the image can include computing absolute luminance values and/or absolute radiance values for each pixel in the image.

In one embodiment, processing logic applies an edge detection algorithm to the image to determine where the image brightness changes sharply or discontinues. These edges may be used to identify a plurality of regions/patches of a predetermined size, e.g., patches of 10×10 pixels. In an example, the patches/regions can be selected randomly from the image that do not cross the detected edges. Two patches among the plurality of patches can then be selected as a patch pair.

At operation 820, processing logic determines a plurality of pixel pairs of the image, where a pixel pair of the plurality of pixel pairs includes a first pixel from the first plurality of pixels and a second pixel from the second plurality of pixels. The plurality of pixel pairs are combinations of pixel pairs with one pixel from a first patch of the patch pair and another pixel from a second patch of the patch pair.

At operation 830, processing logic calculates a plurality of contrasts based on the plurality of pixel pairs, where a contrast for a pixel pair is calculated between pixel data for the first pixel and pixel data for the second pixel from the pixel pair. The contrast can be a Weber contrast, a Michelson contrast, or a difference contrast. The contrast can be calculated for a luminance channel, a color channel, or a radiance channel.

At operation 840, processing logic determines a contrast distribution based on the plurality of contrasts. The contrast distribution can represent a probability density function of the plurality of contrasts.

At operation 850, processing logic calculates a value (e.g., CSNR) representative of a capability of the imaging device to detect contrasts based on the contrast distribution. The CSNR is calculated by dividing a mean of the contrast distribution by a standard deviation of the contrast distribution.

For example, if the contrast calculations is applied to a color channel (e.g., red), processing logic can identify a plurality of patches in the image using the color channel. Processing logic can apply an edge detection algorithm to the image to identify edges within the image. In one embodiment, processing logic can identify the patches within the images as randomly selected regions that does not cross the identified edges. For a pair of patches, processing logic can determine an average value of the color from the color channel. Each of the pixels from a first patch and the pixels from a second patch can be paired to generate a plurality of contrast values from the color channel. Processing logic can generate a contrast distribution using the plurality of contrast values, where the contrast distribution can represent a probability density function of contrast values for the different pixel combinations in the patch pair. Processing logic can calculate a mean value and a standard deviation value from the contrast distribution. Processing logic can calculate the CSNR value from the mean value divided by the standard deviation value. The CSNR value can represent a measurement metric for a capability to detect contrast for a corresponding average color value. The average color value can be calculated as an average value from the color channel of the pixels in the patch pair. Additional CSNR values can be calculated for different combinations of patch pairs in the image, where the CSNR values are associated with a corresponding average of color values in the patch pairs. The CSNR values can be plotted against corresponding average color values to generate a measurement metric profile (CSNR profile) for the color channel.

The CSNR calculation can be repeated for different combinations of patch pairs in the image. The CSNR values may then be plotted against mean values of their corresponding patch pairs to generate a CSNR profile, where a mean value is calculated as an average value (e.g., luminance, color, or radiance) from the pixels within the corresponding patch pair. In one embodiment, processing logic can estimate the detectability index ($SNR_I$) by multiplying the CSNR by a multiplier as denoted in Equation (20). The CSNR values, CSNR profile, and/or estimated $SNR_I$ may be used to determine information about the ability of a camera that generated the image to detect contrasts and/or may be used to make other determinations. For example, CSNR values may be determined for images in a training dataset, and this information may be used to determine whether there are enough images of particular classes that have high and/or low CSNR values. If there are not a sufficient number of images with specific CSNR values in the training dataset, then a machine learning model trained with the training dataset may not be adequately trained to detect particular types of objects under certain lighting conditions. Accordingly, the training dataset may be augmented to improve the performance of the machine learning model trained using the training dataset. Additionally, or alternatively, CSNR values, CSNR profiles and/or estimated $SNR_I$ may be determined for images taken by cameras in the field under use, and such metrics may be used to assess the difficulty of performing machine vision tasks (e.g., object detection) of objects within the generated images. Different actions may be taken depending on the determined difficulty of performing the machine vision tasks.

Inference and Training Logic

Figure 9A:
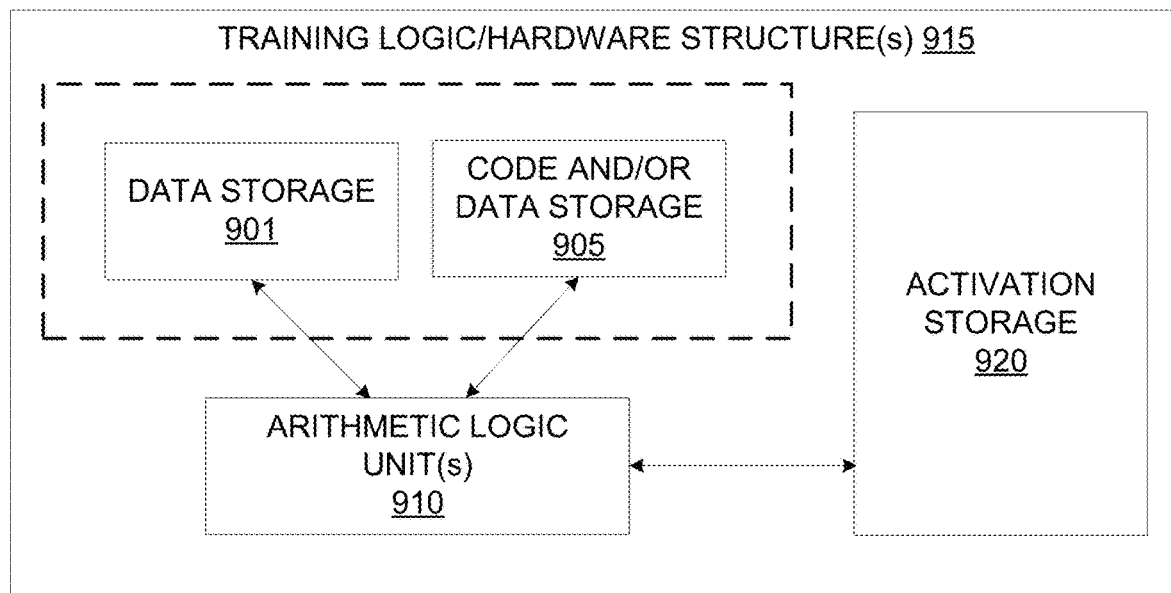
FIG. 9A illustrates inference and/or training logic, according to at least one embodiment.

FIG. 9A illustrates inference and/or training logic 915 used to perform inferencing and/or training operations associated with one or more embodiments. Details regarding inference and/or training logic 915 are provided below in conjunction with FIGS. 9A and/or 9B.

In at least one embodiment, inference and/or training logic 915 may include, without limitation, code and/or data storage 901 to store forward and/or output weight and/or input/output data, and/or other parameters to configure neurons or layers of a neural network trained and/or used for inferencing in aspects of one or more embodiments. In at least one embodiment, training logic 915 may include, or be coupled to code and/or data storage 901 to store graph code or other software to control timing and/or order, in which weight and/or other parameter information is to be loaded to configure logic, including integer and/or floating point units (collectively, arithmetic logic units (ALUs) or simply circuits). In at least one embodiment, code, such as graph code, loads weight or other parameter information into processor ALUs based on an architecture of a neural network to which such code corresponds. In at least one embodiment, code and/or data storage 901 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 901 may be included with other on-chip or off-chip data storage, including a processor's L1, L2, or L3 cache or system memory.

In at least one embodiment, any portion of code and/or data storage 901 may be internal or external to one or more processors or other hardware logic devices or circuits. In at least one embodiment, code and/or data storage 901 may be cache memory, dynamic randomly addressable memory ("DRAM"), static randomly addressable memory ("SRAM"), non-volatile memory (e.g., flash memory), or other storage. In at least one embodiment, a choice of whether code and/or data storage 901 is internal or external to a processor, for example, or comprising DRAM, SRAM, flash or some other storage type, may depend on available storage on-chip versus off-chip, latency requirements of training and/or inferencing functions being performed, batch size of data used in inferencing and/or training of a neural network, or some combination of these factors.

In at least one embodiment, inference and/or training logic 915 may include, without limitation, a code and/or data storage 905 to store backward and/or output weight and/or input/output data corresponding to neurons or layers of a neural network trained and/or used for inferencing in aspects of one or more embodiments. In at least one embodiment, code and/or data storage 905 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 915 may include, or be coupled to code and/or data storage 905 to store, graph code or other software to control timing and/or order, in which weight and/or other parameter information is to be loaded to configure, logic, including integer and/or floating point units (collectively, arithmetic logic units (ALUs).

In at least one embodiment, code, such as graph code, causes the loading of weight or other parameter information into processor ALUs based on an architecture of a neural network to which such code corresponds. In at least one embodiment, any portion of code and/or data storage 905 may be included with other on-chip or off-chip data storage, including a processor's L1, L2, or L3 cache or system memory. In at least one embodiment, any portion of code and/or data storage 905 may be internal or external to one or more processors or other hardware logic devices or circuits. In at least one embodiment, code and/or data storage 905 may be cache memory, DRAM, SRAM, non-volatile memory (e.g., flash memory), or other storage. In at least one embodiment, a choice of whether code and/or data storage 905 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 901 and code and/or data storage 905 may be separate storage structures. In at least one embodiment, code and/or data storage 901 and code and/or data storage 905 may be a combined storage structure. In at least one embodiment, code and/or data storage 901 and code and/or data storage 905 may be partially combined and partially separate. In at least one embodiment, any portion of code and/or data storage 901 and code and/or data storage 905 may be included with other on-chip or off-chip data storage, including a processor's L1, L2, or L3 cache or system memory.

In at least one embodiment, inference and/or training logic 915 may include, without limitation, one or more arithmetic logic unit(s) ("ALU(s)") 190, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 920 that are functions of input/output and/or weight parameter data stored in code and/or data storage 901 and/or code and/or data storage 905. In at least one embodiment, activations stored in activation storage 920 are generated according to linear algebraic and or matrix-based mathematics performed by ALU(s) 190 in response to performing instructions or other code, wherein weight values stored in code and/or data storage 905 and/or data storage 901 are used as operands along with other values, such as bias values, gradient information, momentum values, or other parameters or hyperparameters, any or all of which may be stored in code and/or data storage 905 or code and/or data storage 901 or another storage on or off-chip.

In at least one embodiment, ALU(s) 190 are included within one or more processors or other hardware logic devices or circuits, whereas in another embodiment, ALU(s) 190 may be external to a processor or other hardware logic device or circuit that uses them (e.g., a co-processor). In at least one embodiment, ALUs 190 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 901, code and/or data storage 905, and activation storage 920 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 920 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 920 may be cache memory, DRAM, SRAM, non-volatile memory (e.g., flash memory), or other storage. In at least one embodiment, activation storage 920 may be completely or partially within or external to one or more processors or other logical circuits. In at least one embodiment, a choice of whether activation storage 920 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 915 illustrated in FIG. 9A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 915 illustrated in FIG. 9A may be used in conjunction with central processing unit ("CPU") hardware, graphics processing unit ("GPU") hardware or other hardware, such as field programmable gate arrays ("FPGAs").

Figure 9B:
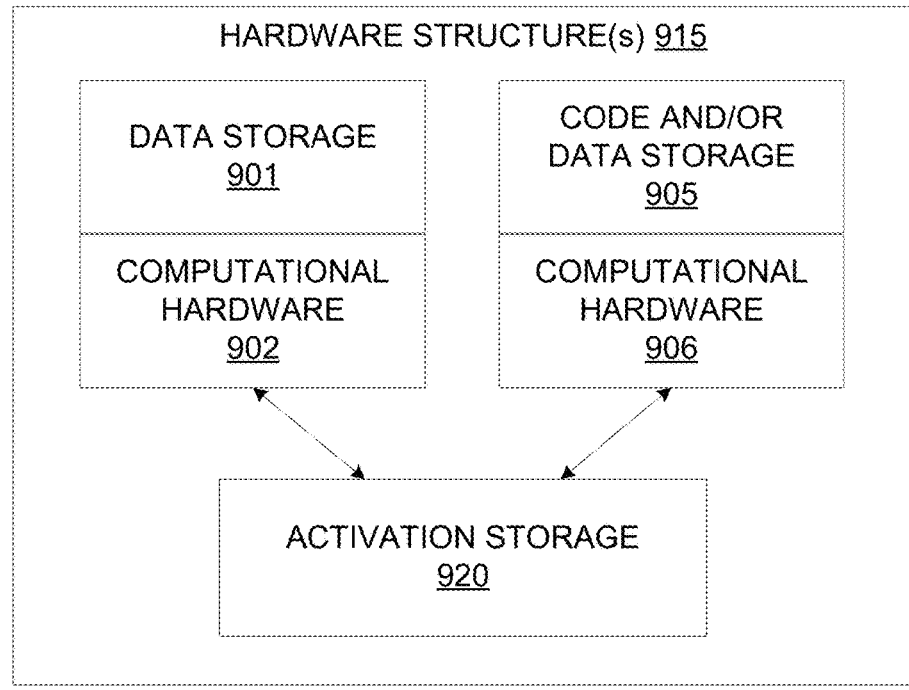
FIG. 9B illustrates inference and/or training logic, according to at least one embodiment.

FIG. 9B illustrates inference and/or training logic 915, according to at least one embodiment. In at least one embodiment, inference and/or training logic 915 may include, without limitation, hardware logic in which computational resources are dedicated or otherwise exclusively used in conjunction with weight values or other information corresponding to one or more layers of neurons within a neural network. In at least one embodiment, inference and/or training logic 915 illustrated in FIG. 9B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 915 illustrated in FIG. 9B may be used in conjunction with central processing unit (CPU) hardware, graphics processing unit (GPU) hardware or other hardware, such as field programmable gate arrays (FPGAs). In at least one embodiment, inference and/or training logic 915 includes, without limitation, code and/or data storage 901 and code and/or data storage 905, which may be used to store code (e.g., graph code), weight values and/or other information, including bias values, gradient information, momentum values, and/or other parameter or hyperparameter information. In at least one embodiment illustrated in FIG. 9B, each of code and/or data storage 901 and code and/or data storage 905 is associated with a dedicated computational resource, such as computational hardware 902 and computational hardware 906, respectively. In at least one embodiment, each of computational hardware 902 and computational hardware 906 comprises one or more ALUs that perform mathematical functions, such as linear algebraic functions, only on information stored in code and/or data storage 901 and code and/or data storage 905, respectively, result of which is stored in activation storage 920.

In at least one embodiment, each of code and/or data storage 901 and 905 and corresponding computational hardware 902 and 906, respectively, correspond to different layers of a neural network, such that resulting activation from one storage/computational pair 901/902 of code and/or data storage 901 and computational hardware 902 is provided as an input to a next storage/computational pair 905/906 of code and/or data storage 905 and computational hardware 906, in order to mirror a conceptual organization of a neural network. In at least one embodiment, each of storage/computational pairs 901/902 and 905/906 may correspond to more than one neural network layer. In at least one embodiment, additional storage/computation pairs (not shown) subsequent to or in parallel with storage/computation pairs 901/902 and 905/906 may be included in inference and/or training logic 915.

Neural Network Training and Deployment

Figure 10:
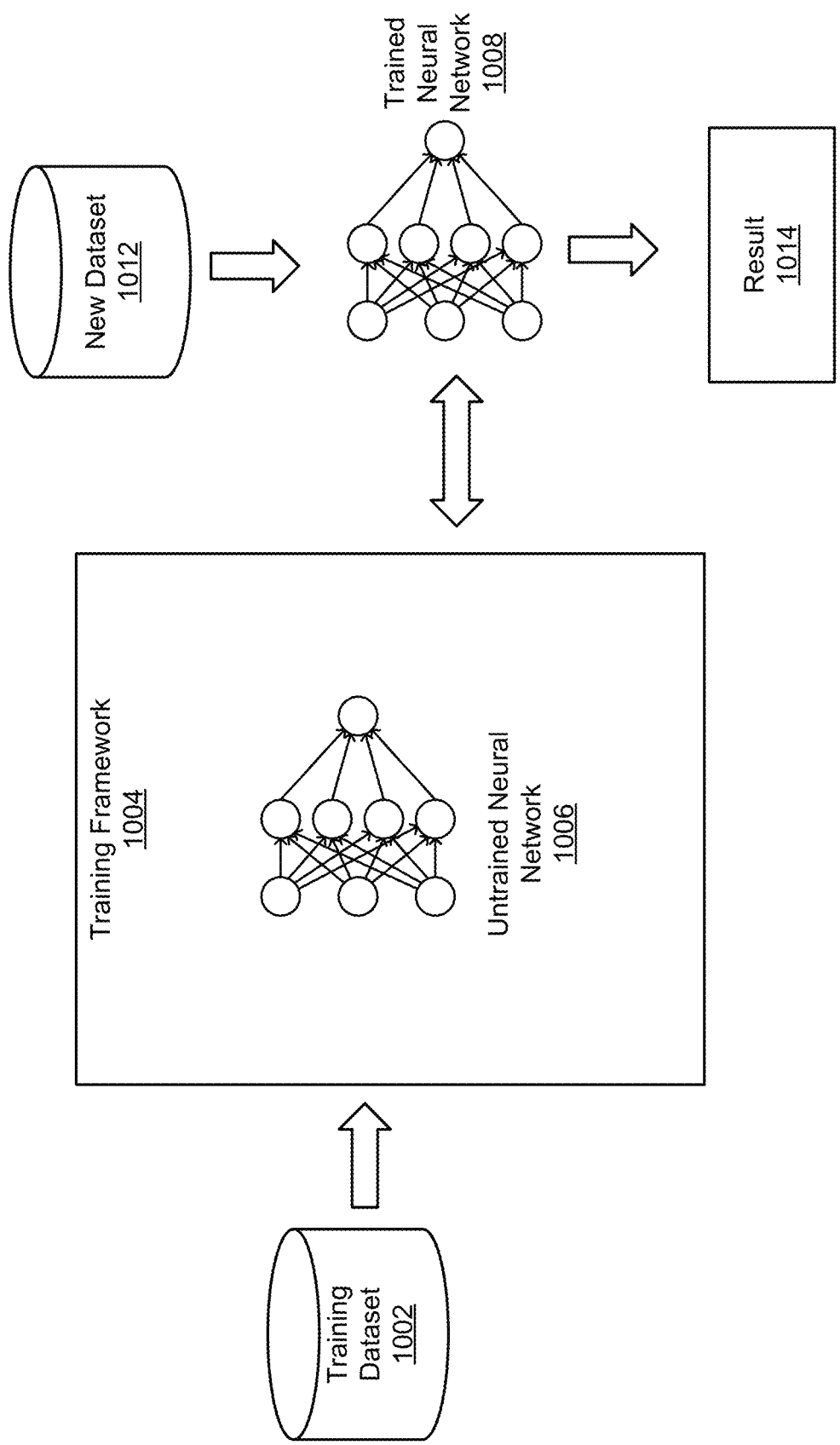
FIG. 10 illustrates training and deployment of a neural network, according to at least one embodiment.

FIG. 10 illustrates training and deployment of a deep neural network, according to at least one embodiment. In at least one embodiment, untrained neural network 1006 is trained using a training dataset 1002. In at least one embodiment, the training dataset 1002 is generated using the techniques set forth herein below. In one embodiment, the training dataset 1002 is generated using a generative adversarial network (GAN) that generates synthetic images and an associated trained neural network that generates labels for synthetic images generated by the GAN. In at least one embodiment, training framework 1004 is a PyTorch framework, whereas in other embodiments, training framework 1004 is a TensorFlow, Boost, Caffe, Microsoft Cognitive Toolkit/CNTK, MXNet, Chainer, Keras, Deeplearning4j, or other training framework. In at least one embodiment, training framework 1004 trains an untrained neural network 1006 and enables it to be trained using processing resources described herein to generate a trained neural network 1008. In at least one embodiment, weights may be chosen randomly or by pre-training using a deep belief network. In at least one embodiment, training may be performed in either a supervised, partially supervised, or unsupervised manner.

In at least one embodiment, untrained neural network 1006 is trained using supervised learning, wherein training dataset 1002 includes an input paired with a desired output for an input, or where training dataset 1002 includes input having a known output and an output of neural network 1006 is manually graded. In at least one embodiment, untrained neural network 1006 is trained in a supervised manner and processes inputs from training dataset 1002 and compares resulting outputs against a set of expected or desired outputs. In at least one embodiment, errors are then propagated back through untrained neural network 1006. In at least one embodiment, training framework 1004 adjusts weights that control untrained neural network 1006. In at least one embodiment, training framework 1004 includes tools to monitor how well untrained neural network 1006 is converging towards a model, such as trained neural network 1008, suitable to generating correct answers, such as in result 1014, based on input data such as a new dataset 1012. In at least one embodiment, training framework 1004 trains untrained neural network 1006 repeatedly while adjusting weights to refine an output of untrained neural network 1006 using a loss function and adjustment algorithm, such as stochastic gradient descent. In at least one embodiment, training framework 1004 trains untrained neural network 1006 until untrained neural network 1006 achieves a desired accuracy. In at least one embodiment, trained neural network 1008 can then be deployed to implement any number of machine learning operations.

In at least one embodiment, untrained neural network 1006 is trained using unsupervised learning, wherein untrained neural network 1006 attempts to train itself using unlabeled data. In at least one embodiment, unsupervised learning training dataset 1002 will include input data without any associated output data or "ground truth" data. In at least one embodiment, untrained neural network 1006 can learn groupings within training dataset 1002 and can determine how individual inputs are related to untrained dataset 1002. In at least one embodiment, unsupervised training can be used to generate a self-organizing map in trained neural network 1008 capable of performing operations useful in reducing dimensionality of new dataset 1012. In at least one embodiment, unsupervised training can also be used to perform anomaly detection, which allows identification of data points in new dataset 1012 that deviate from normal patterns of new dataset 1012.

In at least one embodiment, semi-supervised learning may be used, which is a technique in which in training dataset 1002 includes a mix of labeled and unlabeled data. In at least one embodiment, training framework 1004 may be used to perform incremental learning, such as through transferred learning techniques. In at least one embodiment, incremental learning enables trained neural network 1008 to adapt to new dataset 1012 without forgetting knowledge instilled within trained neural network 1008 during initial training.

Figure 11:
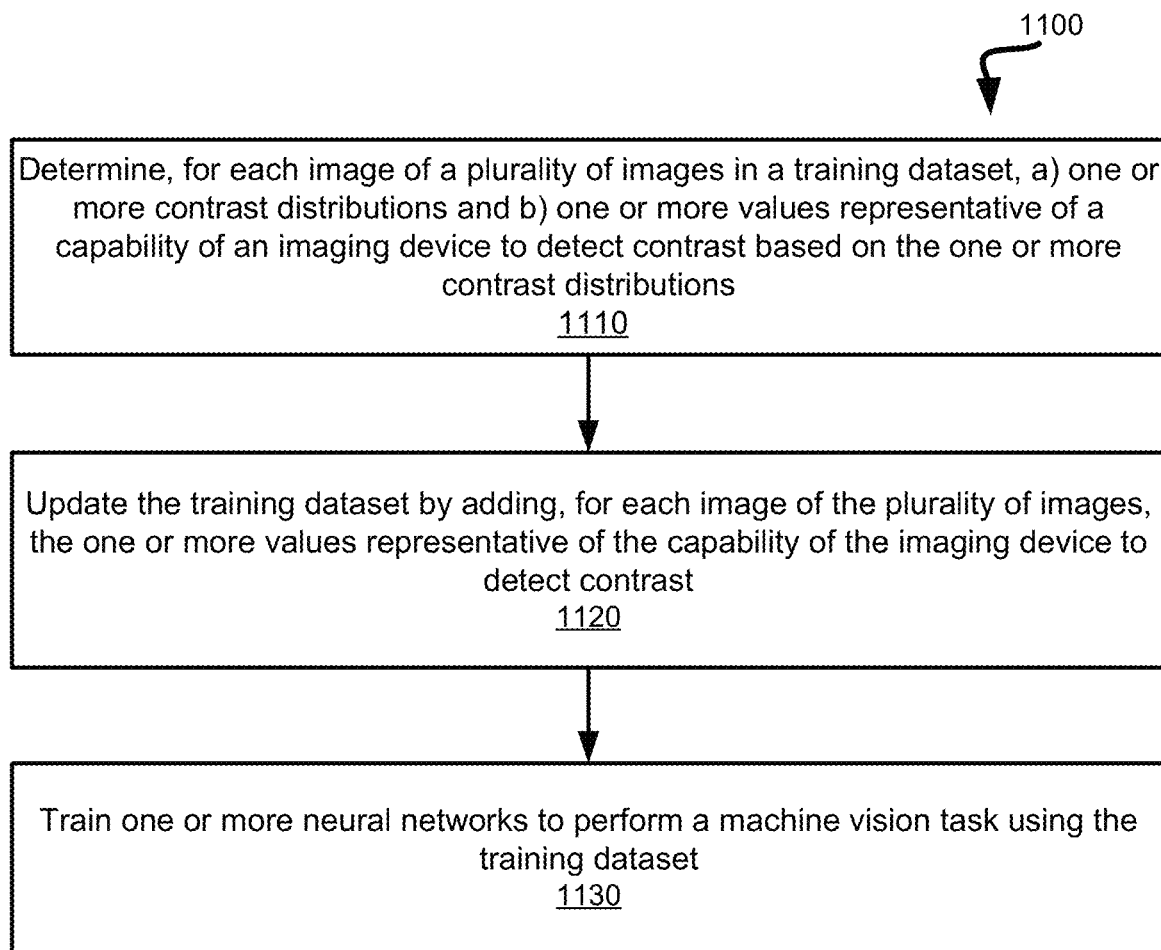
FIG. 11 is a flow diagram of a process to train a deep neural network (DNN) according to one embodiment.

FIG. 11 is a flow diagram of a process to train a deep neural network (DNN) according to embodiment. The method 1100 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1100 is performed by training logic 915 of FIG. 9A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1110, processing logic determines, for each image of a plurality of images in a training dataset, a) one or more contrast distributions and b) one or more values (CSNR) representative of a capability of an imaging device that captured the image to detect contrast based on the one or more contrast distributions.

For each image, processing logic can identify a plurality of patches in the image. For a pair of patches having a known surface luminance, each of the pixels from a first patch and the pixels from a second patch can be paired to generate a plurality of contrast values. Processing logic can generate a contrast distribution using the plurality of contrast values, where the contrast distribution can represent a probability density function of contrast values for the different pixel combinations in the patch pair. Processing logic can calculate a mean value and a standard deviation value of the contrast distribution. Processing logic can calculate the CSNR value from the mean value divided by the standard deviation value. The CSNR value can represent a measurement metric for a capability to detect contrast for the corresponding known luminance. The known luminance can be calculated as an average luminance from the pixels in the patch pair. Additional CSNR values can be calculated for different combinations of patch pairs in the image, where the CSNR values are associated with a corresponding surface luminance of the patch pairs. The CSNR values can be plotted against corresponding luminance to generate a measurement metric profile (CSNR profile).

At operation 1120, processing logic updates the training dataset by adding, for each image of the plurality of images, the one or more (CSNR) values representative of the capability of the imaging device to detect contrast. For example, training dataset 1002/new dataset 1012 of FIG. 10 can include input images and corresponding one or more CSNR values (CSNR profile) of the image. The CSNR profiles can be the additional features that are indicative of whether the neural network model can differentiate an object from its background within an image.

At operation 1130, processing logic trains one or more neural networks to perform a machine vision task using the training dataset. The training framework 1004 can train a neural network model to detect/classify objects within an image using the training dataset, e.g., training dataset 1002 or new dataset 1012 of FIG. 10.

In some embodiments, processing logic can generate neural network models to detect contrasts in luminance values, color values, or radiance values. E.g., the measurement process can be applied to any of the image channels (e.g., luminance, red, green, blue, Cr, Cb, radiance, etc.) of the image.

For example, if the measurement process is applied to a color channel (e.g., red), processing logic can identify a plurality of patches in the image using the color channel. Processing logic can apply an edge detection algorithm to the image to identify edges within the image. In one embodiment, processing logic can identify the patches within the images as randomly selected regions that does not cross the identified edges. For a pair of patches, processing logic can determine an average value of the color from the color channel. Each of the pixels from a first patch and each of the pixels from a second patch can be paired to generate a plurality of contrast values using the color values in the pixels. Processing logic can generate a contrast distribution using the plurality of contrast values, where the contrast distribution can represent a probability density function of contrast values for the different pixel combinations in the patch pair. Processing logic can calculate a mean value and a standard deviation value from the contrast distribution. Processing logic can calculate the CSNR value from the mean value divided by the standard deviation value. The CSNR value can represent a measurement metric for a capability to detect contrast for a corresponding average of color values. The average color value can be calculated as an average from the color channel of the pixels in the patch pair. Additional CSNR values can be calculated for different combinations of patch pairs in the image, where the CSNR values are associated with a corresponding average color value of the patch pairs. The CSNR values can be plotted against corresponding average color values to generate a measurement metric profile (CSNR profile) for the color channel.

In one embodiment, processing logic can determine a plurality of objects within an image. For example, the image may be previously prepared with labels identifying the objects in the images. Processing logic then determines, for each object of the plurality of objects, a value of the one or more values, wherein the value represents a capability of the imaging device to detect contrast between the object and a background in the image.

For example, for a luminance channel, processing logic can determine a luminance for the image with the object using the pixels in the image. The luminance can be calculated as an average luminance from the pixels in the image. Processing logic can retrieve, from a CSNR profile, a CSNR value corresponding to the average luminance. Based on the CSNR value, processing logic can determine if the object has sufficient contrast (above a CSNR threshold) between the object and the background in the image for detection. If the CSNR value is below the CSNR threshold for this object (or other objects), processing logic can identify the brightness contrast for the object in the image as below a threshold of training quality.

For an example of color (red) channel, processing logic can determine the contrasts of an object of that color using the pixels in the image. Processing logic can calculate an average value of the color channel from the pixels in the image. Processing logic can then retrieve, from a CSNR profile having the color channel information, a CSNR value corresponding to the average color value. Based on the CSNR value, processing logic can determine if the object has sufficient contrast (above a CSNR threshold) between the object and the background in the image for detection for the color channel. If the CSNR value is below the CSNR threshold for the object (or other objects), processing logic can identify the color value for the object in the image as below a threshold of training quality.

Among the plurality of images in the training dataset, processing logic can determine whether the training dataset having the plurality of images has a threshold number of images with objects that is below a threshold of training quality. In one embodiment, processing logic adds additional images to the training dataset responsive to determining that fewer than the threshold number of images have objects with values that are below the threshold. For example, images from an image database can be added to the training dataset. In another embodiment, processing logic can remove the images with objects below a threshold of training quality from the training dataset.

Figure 12:
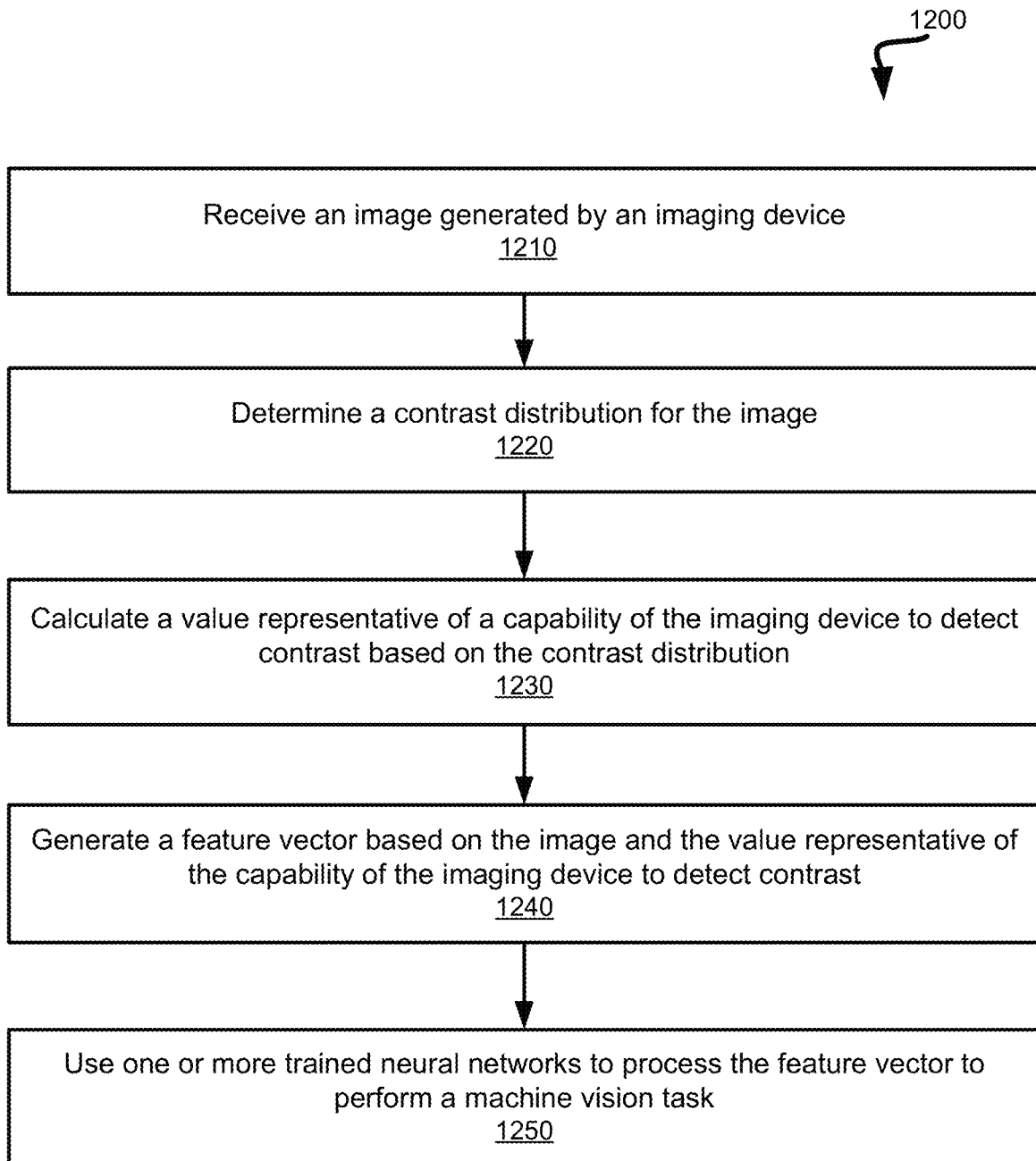
FIG. 12 is a flow diagram of a process to perform a machine vision task according to one embodiment.

FIG. 12 is a flow diagram of a process to perform a machine vision task according to one embodiment. The method 1200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1200 is performed by an imaging system 100 of FIG. 1A or autonomous vehicle 500 of FIG. 15A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1210, processing logic receives an image generated by an imaging device. The imaging device can be one or more camera devices of an imaging system, autonomous vehicle, etc. The image can be a still image or an image frame from a video stream. In at least one embodiment, the image is processed to determine absolute luminance values or radiance values of pixels in the image. The absolute luminance values or radiance values may be added to a luminance channel or radiance channel, respectively, for the image.

At operation 1220, processing logic determines a contrast distribution for the image, optionally based on data from the luminance channel and/or radiance channel. For each image, processing logic identifies a plurality of patches in the image. For a pair of patches, each of the pixels from a first patch and the pixels from a second patch are paired to generate a plurality of contrast values. The contrast value can be a Weber contrast, a Michelson contrast, or a difference contrast. Processing logic can generate a contrast distribution using the plurality of contrast values, where the contrast distribution represents a probability density function of contrast values for the different pixel combinations in the patch pair.

At operation 1230, processing logic calculates a value (CSNR) representative of a capability of the imaging device to detect contrast based on the contrast distribution. Processing logic calculates a mean value and a standard deviation value of the contrast distribution. Processing logic can calculate the CSNR value to equal to the mean value divided by the standard deviation value. The CSNR value can represent a measurement metric for a capability to detect contrast for the corresponding luminance of the patch pair. The corresponding luminance can be calculated as an average luminance from the pixels in the patch pair. Additional CSNR values can be calculated for different combinations of patch pairs in the image, where the CSNR values are associated with the average luminance of the patch pairs.

At operation 1240, processing logic generates a feature vector based on the image and the value representative of the capability of the imaging device to detect contrast. For example, processing logic can generate a measurement metric profile (CSNR profile) for the image using the (CSNR) value and additional CSNR value. Processing logic can combine one or more channels of the image (e.g., 3 color channels) and the corresponding CSNR value (a CSNR channel) from the CSNR profile as the feature vector.

At operation 1250, processing logic uses one or more trained neural networks to process the feature vector to perform a machine vision task. For example, processing logic can apply a trained deep neural network (DNN) model to the image/CSNR feature vector. The DNN model can subsequently perform a trained machine vision task (e.g., classification, object detection, etc.).

In one embodiment, at operation 1250 processing logic adjusts one or more properties or parameters of one or more cameras or sensors based on the determined CSNR value.

Figure 13:
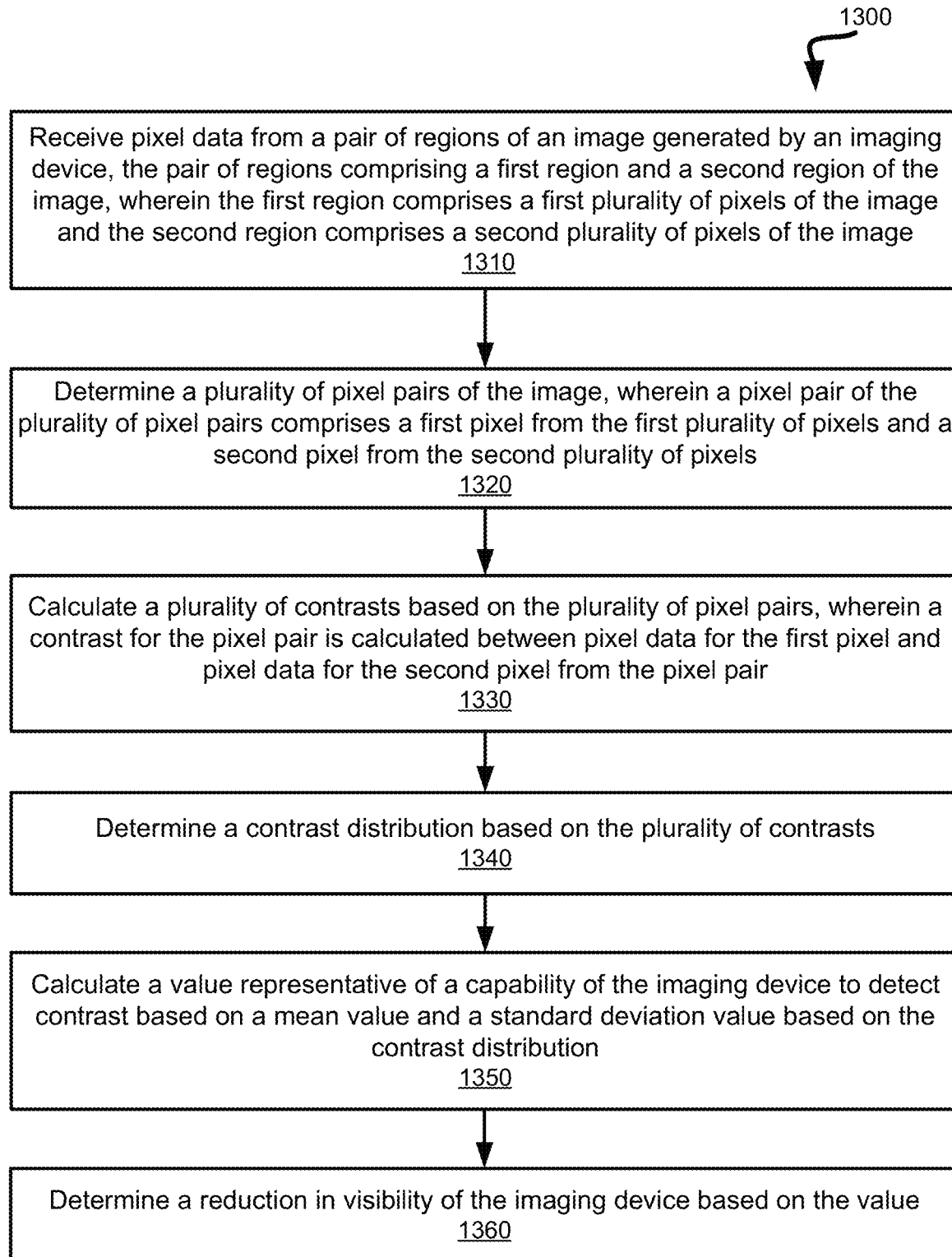
FIG. 13 is a flow diagram of a process to perform a machine vision task by an autonomous vehicle according to one embodiment.

FIG. 13 is a flow diagram of a process to perform a machine vision task according to one embodiment. The method 1300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1300 is performed by an autonomous vehicle 500 of FIG. 15A or imaging system 100 of FIG. 1A (such as a medical imaging system). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1310, processing logic receives pixel data from a pair of regions of an image generated by an imaging device, the pair of regions comprising a first region and a second region of the image, wherein the first region comprises a first plurality of pixels of the image and the second region comprises a second plurality of pixels of the image.

Figure 15A:
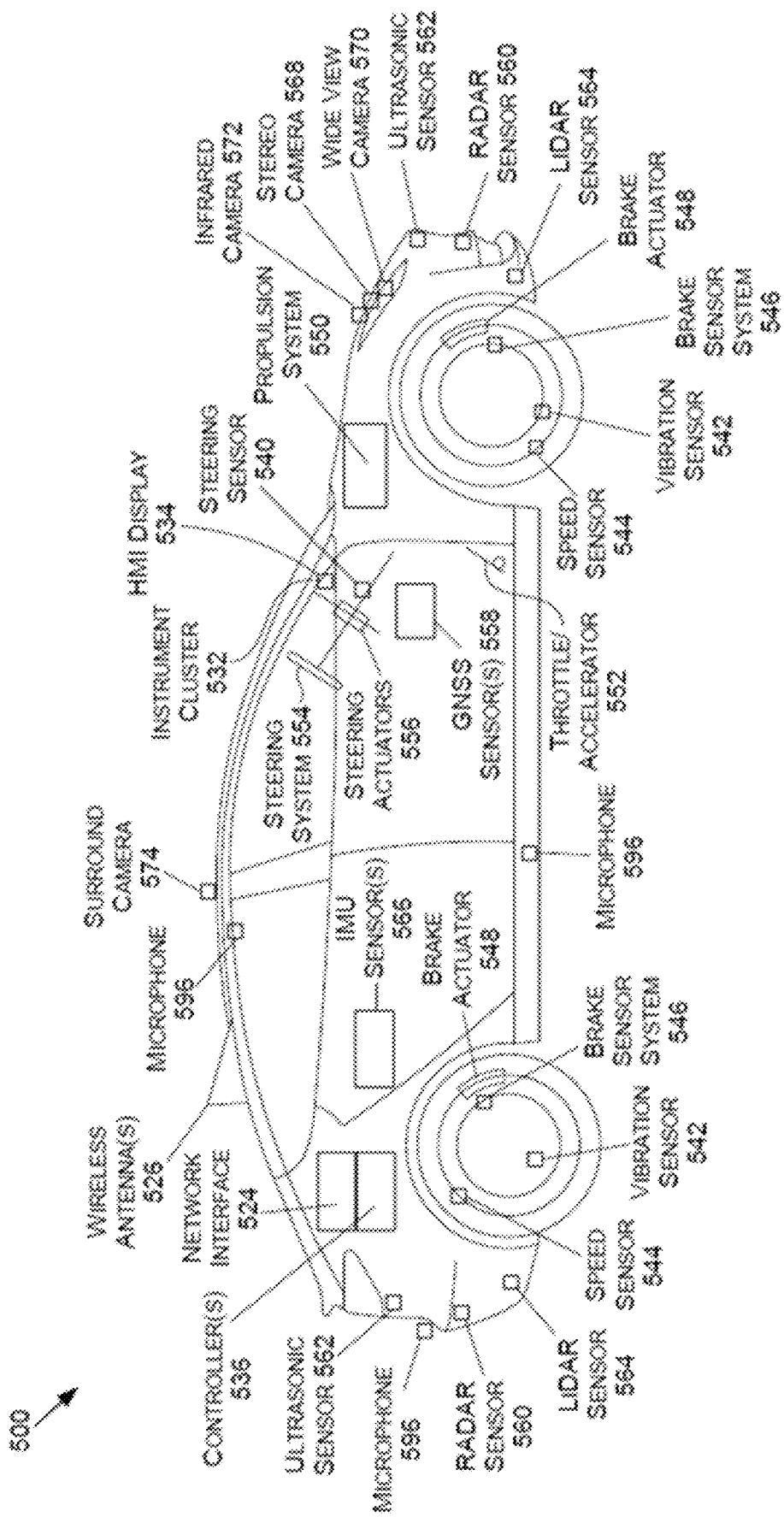
FIG. 15A illustrates an example of an autonomous vehicle, according to at least one embodiment.

For autonomous vehicle applications, imaging device can be any one of surround camera 574, infrared camera 572, stereo camera 568, or wide view camera 570 of vehicle 500 of FIG. 15A. The image can be a frame from a video stream capturing a surrounding of vehicle 500. Processing logic can apply an edge detection algorithm to the image to identify edges in the image. In one embodiment, processing logic can identify a plurality of regions, randomly or deterministically, where the regions do not overlap the edges.

For medical imaging applications, imaging device can be a medical imaging device that outputs an image. Processing logic can apply an edge detection algorithm to the image to identify the edges in the image. Processing logic can identify, randomly or deterministically, a plurality of regions of a uniform size in the image where the regions do not overlap the edges.

At operation 1320, processing logic determines a plurality of pixel pairs of the image, wherein a pixel pair of the plurality of pixel pairs comprises a first pixel from the first plurality of pixels and a second pixel from the second plurality of pixels. Processing logic can iterate through the plurality of regions to determine different region pairs.

At operation 1330, processing logic calculates a plurality of contrasts based on the plurality of pixel pairs, wherein a contrast for the pixel pair is calculated between pixel data for the first pixel and pixel data for the second pixel from the pixel pair. The contrast values can be a Weber contrast, a Michelson contrast, or a difference contrast.

At operation 1340, processing logic determines a contrast distribution based on the plurality of contrasts. The contrast distributions can represent a probability density function of from the plurality of contrasts.

At operation 1350, processing logic calculates a value (CSNR) representative of a capability of the imaging device to detect contrast based on a mean value and a standard deviation value based on the contrast distribution. Processing logic can calculate a mean value from the contrast distribution and a standard deviation value from the contrast distribution. Processing logic can calculate the CSNR value by dividing the mean value by the standard deviation value.

Additional CSNR values can be calculated using other patch pairs and the CSNR values can be used to generate a CSNR profile. The CSNR profile can represent the CSNR values, where each CSNR value correspond to a channel value that is used to calculate the CSNR value (e.g., a luminance value, a color value, or a radiance value).

At operation 1360, processing logic determines a reduction in contrast detectability of the imaging device based on the value (as further illustrated in method 1400 of FIG. 14). In at least one embodiment, responsive to determining a reduction in the contrast detectability, processing logic adjusts one or more parameters of the camera(s) or sensor(s) that generated the pixel data. This may include increasing exposure of the camera(s) or sensor(s), activating sensor binning for the camera(s) or sensor(s), changing HDR settings for the camera(s) or sensor(s), changing gain settings for the camera(s) or sensor(s), changing between a 'day' and 'night' mode that deploys a combination of techniques for the camera(s) or sensor(s), increasing headlamp or other active illumination sources, controlling software settings that process the pixel data, such as noise reduction, controlling an aperture of the camera(s), and so on.

Figure 14A:
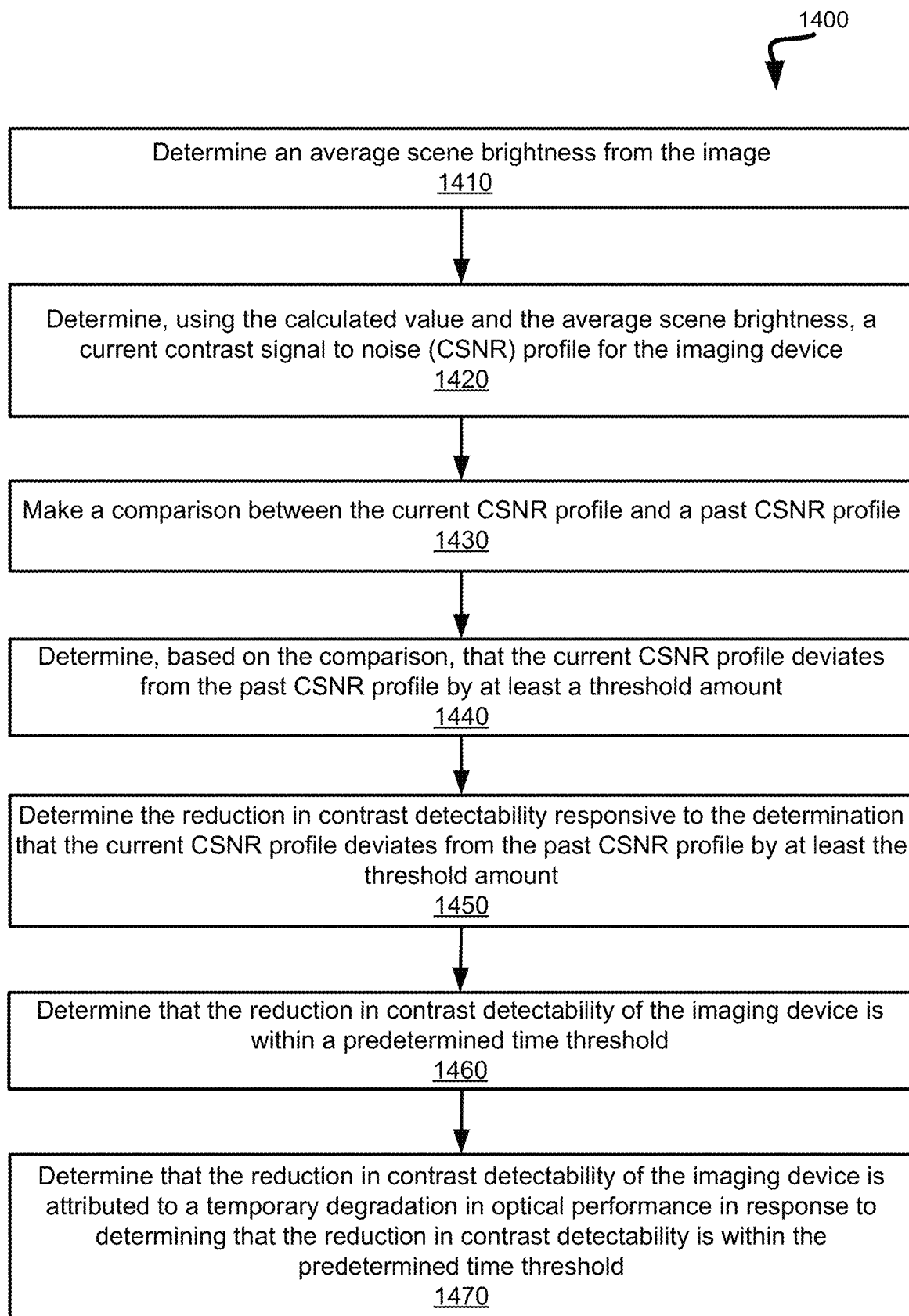
FIG. 14A is a flow diagram of a process to perform a machine vision task by an imaging system according to one embodiment.

FIG. 14A is a flow diagram of a process to perform a machine vision task according to one embodiment. The method 1400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1400 is performed by an autonomous vehicle 500 of FIG. 15A or an imaging system 100 of FIG. 1A (such as a medical imaging system). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1410, processing logic determines an average scene brightness (average luminance) from the image. For example, if the CSNR value is calculated from a luminance value of the image, the CSNR value can be used to discern an object in an image from an image background, where the image has the average scene brightness (e.g., luminance).

At operation 1420, processing logic determines, using the calculated value and the average scene brightness, a current contrast signal to noise (CSNR) profile for the imaging device. Additional CSNR values can be calculated using other patch pairs and the CSNR values can be used to generate a CSNR profile. The CSNR profile can represent the CSNR values plotted against average scene brightness values from the image used to calculate the CSNR values. In some embodiments, a color value or a radiance value can be used to calculate the CSNR values for different average scene color values or average scene radiance values to generate the current contrast signal to noise (CSNR) profile.

At operation 1430, processing logic makes a comparison between the current CSNR profile and a past CSNR profile. Processing logic can retrieve a reference CSNR profile that is previously captured for the imaging device and compare the currently calculated CSNR profile to the reference CSNR profile.

At operation 1440, processing logic determines, based on the comparison, that the current CSNR profile deviates from the past CSNR profile by at least a threshold amount. For example, for any reference CSNR value and scene brightness, processing logic determines if the current CSNR value with approximately the same scene brightness deviates from the reference CSNR value by a predetermined threshold, e.g., 200.

At operation 1450, processing logic determines the reduction in contrast detectability responsive to the determination that the current CSNR profile deviates from the past CSNR profile by at least the threshold amount. For another example, processing logic can determine that the current CSNR profile has shifted compared to the reference CSNR profile based on comparison of the currently generated CSNR profile to a reference CSNR profile for the camera. In one embodiment, if the shift is greater than a predetermined threshold, e.g., 200, processing logic determines that the imaging device contrast detectability is reduced.

For autonomous vehicle applications, if the contrast detectability is determined to be reduced, processing logic executes a self-driving operation of the autonomous vehicle in response to determining the reduction in the contrast detectability of the imaging device. For example, the self-driving operation can include one of: reducing a speed of the autonomous vehicle or transitioning from a first level autonomy to a second level autonomy for the self-driving operation of the autonomous vehicle.

At operation 1460, processing logic determines that the reduction in contrast detectability of the imaging device is within a predetermined time threshold (e.g., 1 month).

At operation 1470, processing logic determines that the reduction in contrast detectability of the imaging device is attributed to a temporary degradation in optical performance in response to determining that the reduction in contrast detectability is within the predetermined time threshold. If the reduction in contrast detectability occurred within a short time frame (e.g., <1 month), processing logic determines that the reduced contrast detectability is temporary, whereas if the reduction in contrast detectability occurred over a prolonged time frame (e.g., >1 months), processing logic determines that the imaging device requires maintenance.

For autonomous vehicle applications, if it is determined that the imaging device requires maintenance, processing logic can alert (via a visual display or an audible alert) the operator of the autonomous vehicle to perform a vehicle maintenance.

For medical imaging applications, if the contrast detectability is determined to be reduced temporary, processing logic can alert an operator of the medical imaging device to perform a manual analysis of the medical image under examination. If the contrast detectability is determined to be reduced over a prolonged period of time, processing logic alerts the operator of the medical imaging device to perform a maintenance operation for the imaging device.

Figure 14B:
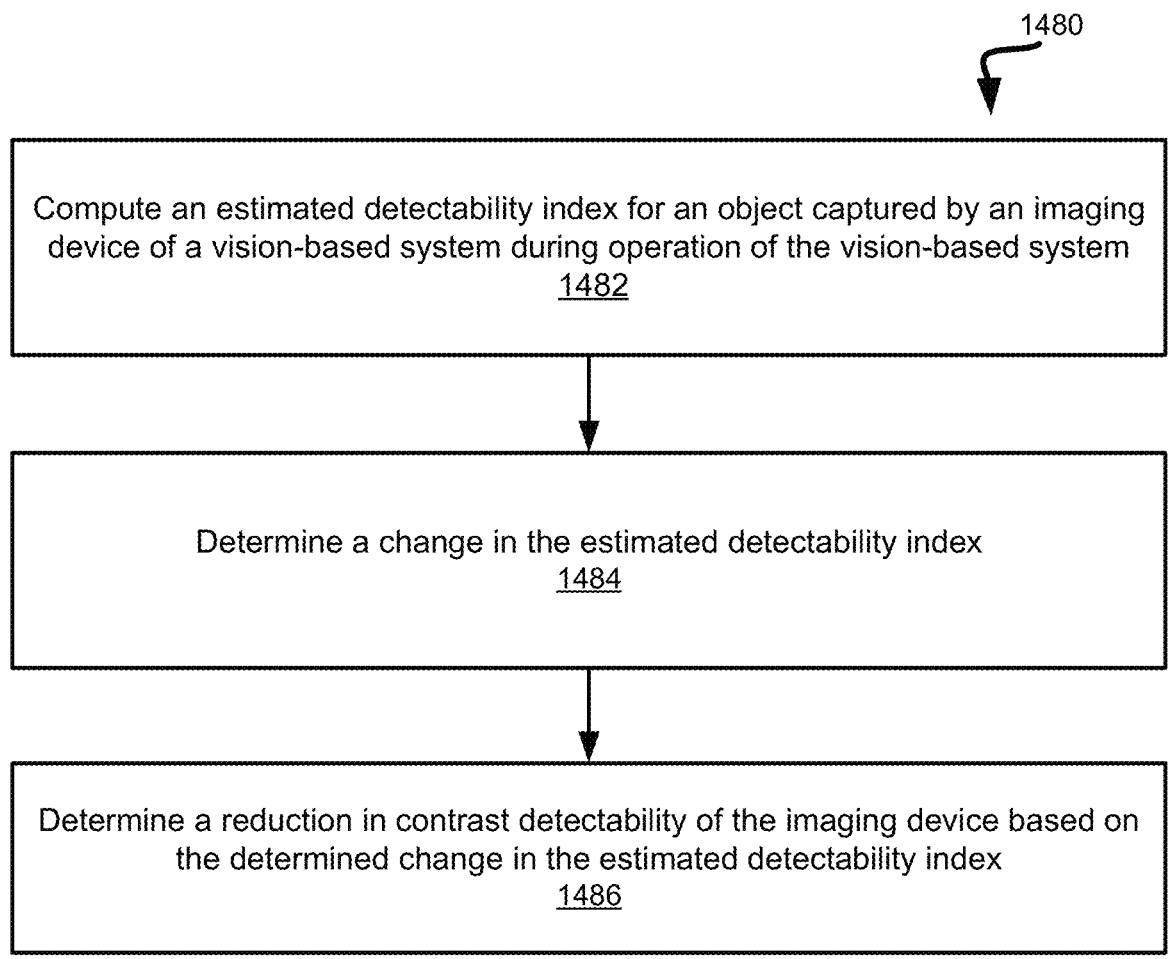
FIG. 14B is a flow diagram of a process to perform vision-based tasks by an autonomous vehicle according to one embodiment.

FIG. 14B is a flow diagram of a method 1480 to perform vision-based tasks such as by an autonomous vehicle according to one embodiment. The method 1480 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1480 is performed by an autonomous vehicle 500 of FIG. 15A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. Note that though FIG. 14B is discussed with reference to an autonomous vehicle, other types of devices that perform image-based processing may also perform method 1480. For example, robotics systems, medical imaging systems, airplane autopilot systems, and so on may perform method 1480.

At operation 1482, processing logic computes an estimated detectability index ($SNR_I$) for an object captured by an imaging device of a vision-based system during operation of the vision-based system. The vision-based system can be an autonomous vehicle 500 of FIG. 15A. For example, processing logic may compute a CSNR value from an image captured by the imaging device using the luminance values (or color channels) in the image. The CSNR value can be calculated by selecting pixel data from pair of regions in the image, where the pair of regions are randomly selected from the image. Each pair of regions generates a contrast distribution, where each contrast in the contrast distribution is determined from a pixel pair in the pair of regions. The CSNR value is then calculated by dividing a mean of the contrast distribution by a standard deviation of the contrast distribution.

Processing logic can determine a bounding box surrounding the captured object. In at least one embodiment, processing logic determines an area (A) of the bounding box, and a mean intensity (luminance value or color channel values) (C) in the image. Processing logic can determine if the imaging device is a single exposure or multi-exposure capturing device.

In at least one embodiment, processing logic estimates the $SNR_I$ based on equation (20) using area (A) and mean contrast (C) if the image is a single exposure image.

In at least one embodiment, if the image is a multiple exposure image, processing logic calculates a first exposure ratio utilized by a high dynamic range sensor of the imaging device, the first exposure ratio corresponding to the object in an image, and determines a second exposure ratio, the second exposure ratio corresponding to a background in the image. Processing logic may then estimate the $SNR_I$ based on equation (29) using area (A), mean contrast (C), and the first and second exposure ratios.

At operation 1484, processing logic may determine a change in the estimated detectability index ($SNR_I$). For example, if the vehicle moves away from the object, area (A) decreases and the may $SNR_I$ decrease correspondingly according to equations 20 or 29. For another example, if there are bird droppings that cover the imaging devices, the object is no longer detectable and area (A) is approximately zero, and $SNR_I$ would change proportionately.

At operation 1486, processing logic may determine a reduction in contrast detectability of the imaging device based on the determined change in the estimated detectability index. For example, the $SNR_I$ can be re-estimated using the updated area (A). Processing logic determines there is a reduction in contrast detectability if the $SNR_I$ is below a predetermined $SNR_I$ threshold.

If the reduction in contrast detectability of the imaging device is within a predetermined time threshold, processing logic may execute a self-driving operation of the autonomous vehicle in response to determining the reduction in the contrast detectability of the imaging device. If the reduction in contrast detectability of the imaging device is above the predetermined time threshold (e.g., prolonged deterioration), processing logic can alert an operator of an autonomous vehicle for maintenance.

In at least one embodiment, responsive to determining a reduction in the $SNR_I$, processing logic adjusts one or more parameters of the camera(s) or sensor(s) that generated the pixel data. This may include increasing exposure of the camera(s) or sensor(s), activating sensor binning for the camera(s) or sensor(s), changing HDR settings for the camera(s) or sensor(s), changing gain settings for the camera(s) or sensor(s), changing between a 'day' and 'night' mode that deploys a combination of techniques for the camera(s) or sensor(s), increasing headlamp or other active illumination sources, controlling software settings that process the pixel data, such as noise reduction, controlling an aperture of the camera(s), and so on.

Figure 14C:
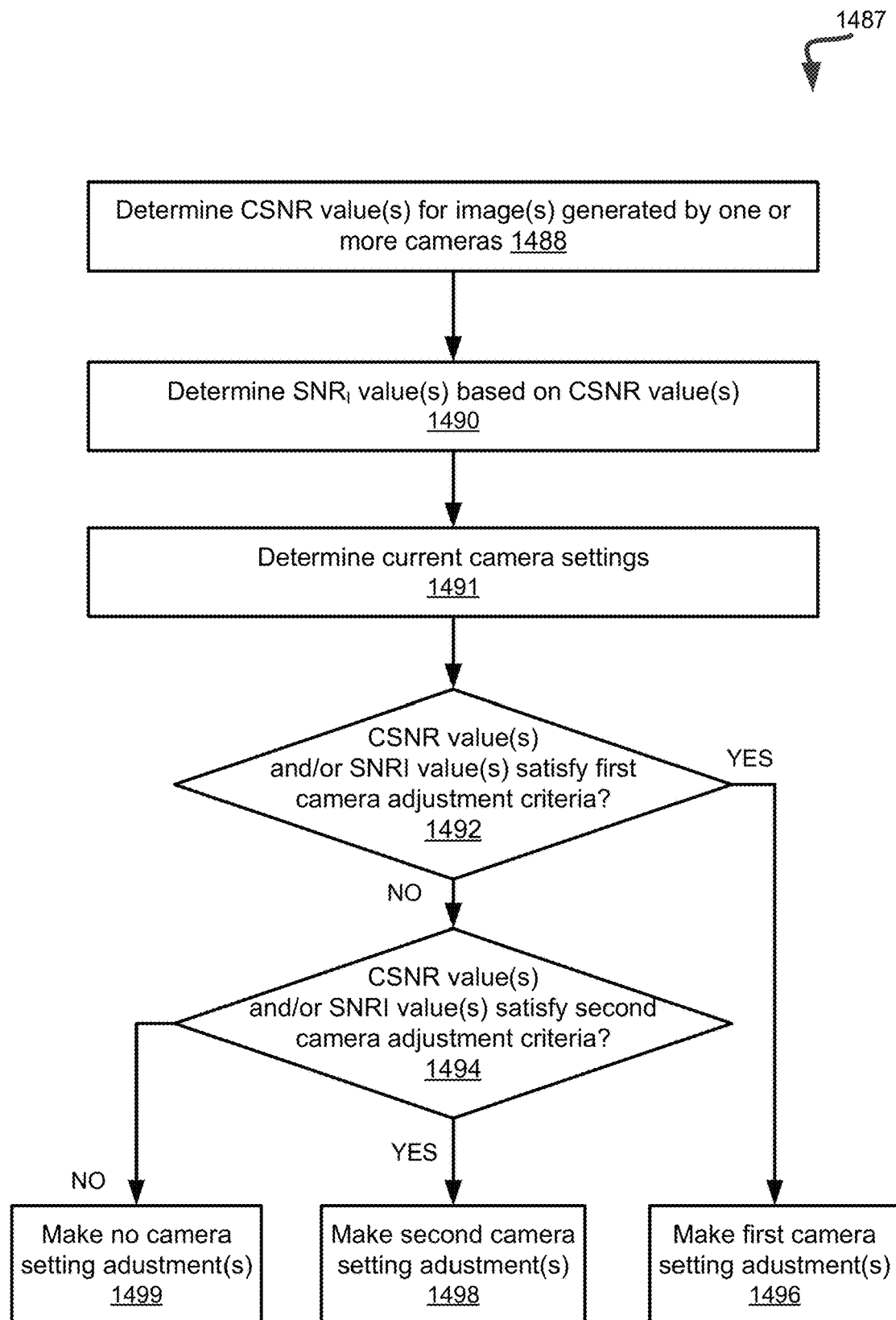
FIG. 14C is a flow diagram of a method to adjust properties, parameters or settings associated with one or more cameras, systems (e.g., an imaging system) and/or sensors (e.g., imaging devices) based on computed CSNR and/or $SNR_I$ values.

FIG. 14C is a flow diagram of a method 1487 to adjust properties, parameters or settings associated with one or more cameras, systems (e.g., an imaging system) and/or sensors (e.g., imaging devices) based on computed CSNR and/or $SNR_I$ values. The method 1487 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1487 is performed by autonomous vehicle 500 of FIG. 15A. In other embodiments, method 1487 may be performed by other devices or systems, such as robotic systems, medical imaging systems, airplane autopilot systems, and so on. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 1488 of method 1487, processing logic determines one or more CSNR values for one or more images generated by a camera or imaging device or multiple cameras or imaging devices, where the CSNR values are values representative of a capability of the imaging device to detect contrast. The CSNR value may be calculated by receiving an image, determining a contrast distribution for the image, and calculating the CSNR value based on the contrast distribution. The CSNR values may be calculated using the techniques set forth above. For example, a CSNR value may be computed according to method 800.

At block 1490, processing logic may determine $SNR_I$ values for each of the images. The $SNR_I$ values may be determined using the techniques set forth above. The $SNR_I$ value may be another type of value that represents a capability of the imaging device to detect contrast.

At block 1491, processing logic may determine one or more current settings of the camera/imaging device or cameras/imaging devices. The settings may include an exposure time setting, a sensor binning setting, an HDR setting, a gain setting, a day mode setting, a night mode setting, an illumination source (e.g., headlamp) setting, a software setting (e.g., an image processing setting such as a noise reduction setting and/or filter setting), an aperture setting, and so on.

At block 1492, processing logic determines whether the CSNR value(s) and/or the $SNR_I$ value(s) satisfy one or more first imaging system adjustment criteria (also referred to as camera adjustment criteria). The first imaging system adjustment criteria may include a first CSNR threshold and/or a first $SNR_I$ threshold. In at least one embodiment, the CSNR value(s) satisfy the first imaging system adjustment criteria if the CSNR value(s) is below the first CSNR threshold. CSNR and $SNR_I$ are proportional to detection performance of the camera(s). Accordingly, if the CSNR and/or $SNR_I$ values are low, this indicates a poor detection performance, and it may be beneficial to adjust one or more settings of the imaging system to increase the detection performance. In at least one embodiment, the $SNR_I$ value(s) satisfy the first imaging system adjustment criteria if the $SNR_I$ value(s) is below the first $SNR_I$ threshold. If the CSNR value(s) and/or $SNR_I$ value(s) satisfy the first imaging system adjustment criteria, the method proceeds to block 1496. Otherwise, the method continued to block 1494.

At block 1494, processing logic determines whether the CSNR value(s) and/or the $SNR_I$ value(s) satisfy one or more second imaging system adjustment criteria. The second imaging system adjustment criteria may include a second CSNR threshold and/or a second $SNR_I$ threshold. In at least one embodiment, the CSNR value(s) satisfy the second imaging system adjustment criteria if the CSNR value(s) is above the second CSNR threshold. This may indicate that detection capabilities are good or sufficient, and that imaging system settings (e.g., sensor and/or system settings) may be adjusted to improve performance. In at least one embodiment, the $SNR_I$ value(s) satisfy the second imaging system adjustment criteria if the $SNR_I$ value(s) is above the second $SNR_I$ threshold. If the CSNR value(s) and/or $SNR_I$ value(s) satisfy the second imaging system adjustment criteria, the method proceeds to block 1498. Otherwise, the method continued to block 1499.

At block 1496, processing logic makes one or more first setting adjustments to the one or more imaging system and/or to sensors and/or systems. The one or more first setting adjustments may be setting adjustments that will improve the detection capabilities of the camera(s). The first setting adjustments may include one or more of an increase in exposure time for a camera or imaging device, a decrease in a resolution of the camera, activating sensor binning for a camera or imaging device, changing an HDR setting for a camera or imaging device, increasing a gain setting of a camera or imaging device, changing from a day mode to a night mode, increasing an illumination (e.g., turning on headlights, or possibly adjusting headlights from a low beam to a high beam), controlling software settings to introduce noise reduction and/or filtering, increasing or decreasing an aperture of the camera or imaging device, and so on.

At block 1498, processing logic makes one or more second setting adjustments to the one or more cameras and/or to sensors and/or systems. The one or more second setting adjustments may be setting adjustments that might decrease detection capabilities under some circumstances, but that are appropriate in other circumstances. For example, if a high CSNR and/or $SNR_I$ value is determined and a night mode is on, then it may be appropriate to switch from the night mode to a day mode. The second setting adjustments may include one or more of a decrease in exposure time for a camera or imaging device, de-activating sensor binning for a camera or imaging device, changing an HDR setting for a camera or imaging device, increasing a resolution of a camera or imaging device, decreasing a gain setting of a camera or imaging device, changing from a night mode to a day mode, decreasing an illumination (e.g., turning off headlights, or possibly adjusting headlights from a high beam to a low beam), controlling software settings to remove noise reduction and/or filtering, increasing or decreasing an aperture of the camera or imaging device, and so on.

At block 1499, processing logic does not adjust the settings of the camera, system and/or sensor.

Example Autonomous Vehicle

FIG. 15A is an illustration of an example autonomous vehicle 500, in accordance with some embodiments of the present disclosure. The autonomous vehicle 500 (alternatively referred to herein as the "vehicle 500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 500 may be capable of functionality in accordance with one or more of Level 3-Level 5 of the autonomous driving levels. For example, the vehicle 500 may be capable of conditional automation (Level 3), high automation (Level 4), and/or full automation (Level 5), depending on the embodiment.

The vehicle 500 may include components such as a chassis, a vehicle body, wheels (e.g., 2, 4, 6, 8, 18, etc.), tires, axles, and other components of a vehicle. The vehicle 500 may include a propulsion system 550, such as an internal combustion engine, hybrid electric power plant, an all-electric engine, and/or another propulsion system type. The propulsion system 550 may be connected to a drive train of the vehicle 500, which may include a transmission, to enable the propulsion of the vehicle 500. The propulsion system 550 may be controlled in response to receiving signals from the throttle/accelerator 552.

A steering system 554, which may include a steering wheel, may be used to steer the vehicle 500 (e.g., along a desired path or route) when the propulsion system 550 is operating (e.g., when the vehicle is in motion). The steering system 554 may receive signals from a steering actuator 556. The steering wheel may be optional for full automation (Level 5) functionality. The brake sensor system 546 may be used to operate the vehicle brakes in response to receiving signals from the brake actuators 548 and/or brake sensors.

Controller(s) 536, which may include one or more system on chips (SoCs) 504 (FIG. 3C) and/or GPU(s), may provide signals (e.g., representative of commands) to one or more components and/or systems of the vehicle 500. For example, the controller(s) may send signals to operate the vehicle brakes via one or more brake actuators 548, to operate the steering system 554 via one or more steering actuators 556, to operate the propulsion system 550 via one or more throttle/accelerators 552. The controller(s) 536 may include one or more onboard (e.g., integrated) computing devices (e.g., supercomputers) that process sensor signals, and output operation commands (e.g., signals representing commands) to enable autonomous driving and/or to assist a human driver in driving the vehicle 500. The controller(s) 536 may include a first controller 536 for autonomous driving functions, a second controller 536 for functional safety functions, a third controller 536 for artificial intelligence functionality (e.g., computer vision), a fourth controller 536 for infotainment functionality, a fifth controller 536 for redundancy in emergency conditions, and/or other controllers. In some examples, a single controller 536 may handle two or more of the above functionalities, two or more controllers 536 may handle a single functionality, and/or any combination thereof.

The controller(s) 536 may provide the signals for controlling one or more components and/or systems of the vehicle 500 in response to sensor data received from one or more sensors (e.g., sensor inputs). The sensor data may be received from, for example and without limitation, global navigation satellite systems sensor(s) 558 (e.g., Global Positioning System sensor(s)), RADAR sensor(s) 560, ultrasonic sensor(s) 562, LiDAR sensor(s) 564, inertial measurement unit (IMU) sensor(s) 566 (e.g., accelerometer(s), gyroscope(s), magnetic compass(es), magnetometer(s), etc.), microphone(s) 596, stereo camera(s) 568, wide-view camera(s) 570 (e.g., fisheye cameras), infrared camera(s) 572, surround camera(s) 574 (e.g., 360 degree cameras), long-range and/or mid-range camera(s) 598, speed sensor(s) 544 (e.g., for measuring the speed of the vehicle 500), vibration sensor(s) 542, steering sensor(s) 540, brake sensor(s) (e.g., as part of the brake sensor system 546), and/or other sensor types.

One or more of the controller(s) 536 may receive inputs (e.g., represented by input data) from an instrument cluster 532 of the vehicle 500 and provide outputs (e.g., represented by output data, display data, etc.) via a human-machine interface (HMI) display 534, an audible annunciator, a loudspeaker, and/or via other components of the vehicle 500. The outputs may include information such as vehicle velocity, speed, time, map data (e.g., the HD map 522 of FIG. 3C), location data (e.g., the vehicle's 500 location, such as on a map), direction, location of other vehicles (e.g., an occupancy grid), information about objects and status of objects as perceived by the controller(s) 536, etc. For example, the HMI display 534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 500 further includes a network interface 524 which may use one or more wireless antenna(s) 526 and/or modem(s) to communicate over one or more networks. For example, the network interface 524 may be capable of communication over LTE, WCDMA, UMTS, GSM, CDMA2000, etc. The wireless antenna(s) 526 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 15B:
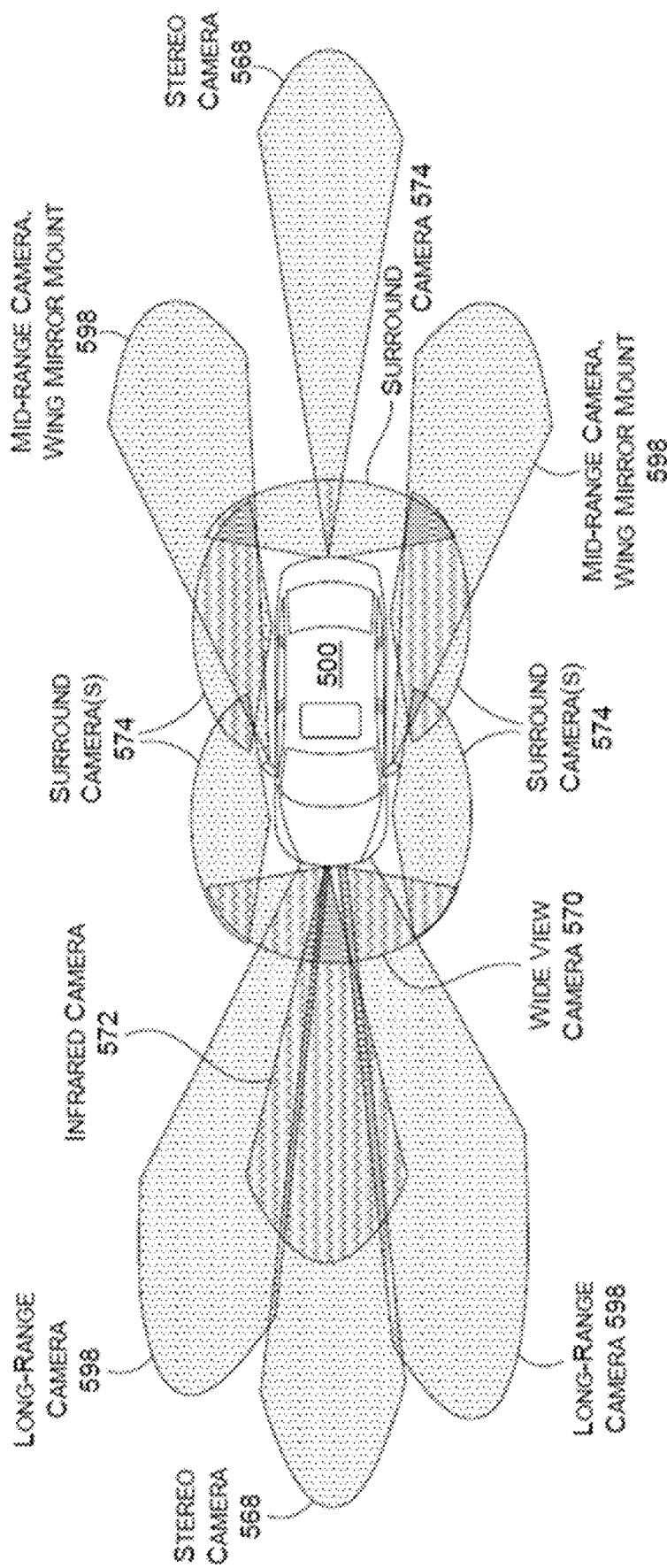
FIG. 15B illustrates an example of camera locations and fields of view for the autonomous vehicle of FIG. 15A, according to at least one embodiment.

FIG. 15B is an example of camera locations and fields of view for the example autonomous vehicle 500 of FIG. 15A, in accordance with some embodiments of the present disclosure. The cameras and respective fields of view are one example embodiment and are not intended to be limiting. For example, additional and/or alternative cameras may be included and/or the cameras may be located at different locations on the vehicle 500.

The camera types for the cameras may include, but are not limited to, digital cameras that may be adapted for use with the components and/or systems of the vehicle 500. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 500 (e.g., front-facing cameras) may be used for surround view, to help identify forward facing paths and obstacles, as well aid in, with the help of one or more controllers 536 and/or control SoCs, providing information critical to generating an occupancy grid and/or determining the preferred vehicle paths. Front-facing cameras may be used to perform many of the same ADAS functions as LiDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 570 that may be used to perceive objects coming into view from the periphery (e.g., pedestrians, crossing traffic or bicycles). Although only one wide-view camera is illustrated in FIG. 15B, there may any number of wide-view cameras 570 on the vehicle 500. In addition, long-range camera(s) 598 (e.g., a long-view stereo camera pair) may be used for depth-based object detection, especially for objects for which a neural network has not yet been trained. The long-range camera(s) 598 may also be used for object detection and classification, as well as basic object tracking.

One or more stereo cameras 568 may also be included in a front-facing configuration. The stereo camera(s) 568 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 568 may be used in addition to, or alternatively from, those described herein.

Cameras with a field of view that include portions of the environment to the side of the vehicle 500 (e.g., side-view cameras) may be used for surround view, providing information used to create and update the occupancy grid, as well as to generate side impact collision warnings. For example, surround camera(s) 574 (e.g., four surround cameras 574 as illustrated in FIG. 15B) may be positioned to on the vehicle 500. The surround camera(s) 574 may include wide-view camera(s) 570, fisheye camera(s), 360 degree camera(s), and/or the like. Four example, four fisheye cameras may be positioned on the vehicle's front, rear, and sides. In an alternative arrangement, the vehicle may use three surround camera(s) 574 (e.g., left, right, and rear), and may leverage one or more other camera(s) (e.g., a forward-facing camera) as a fourth surround view camera.

Cameras with a field of view that include portions of the environment to the rear of the vehicle 500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 598, stereo camera(s) 568), infrared camera(s) 572, etc.), as described herein.

Figure 15C:
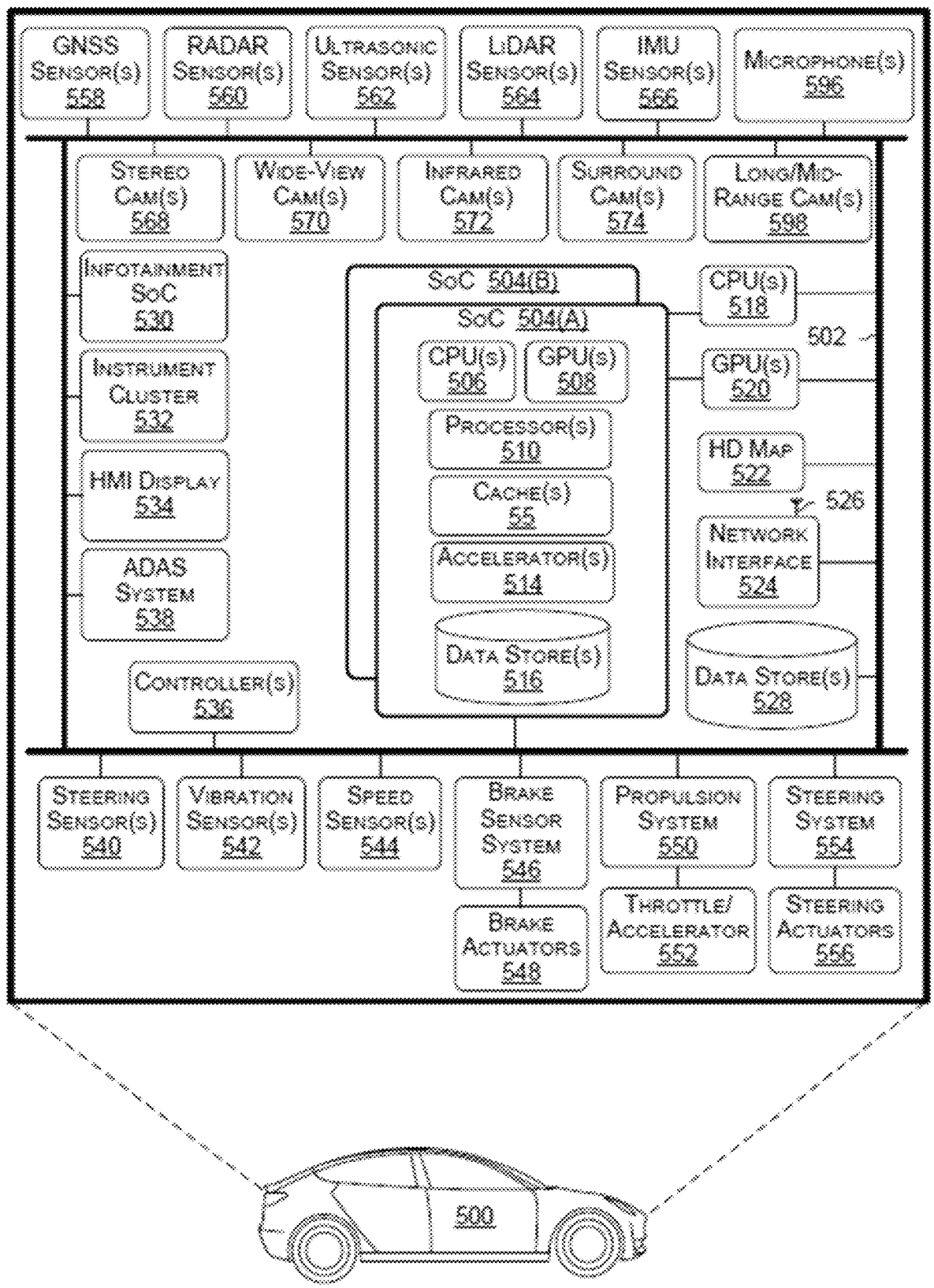
FIG. 15C is a block diagram illustrating an example system architecture for the autonomous vehicle of FIG. 15A, according to at least one embodiment.

FIG. 15C is a block diagram of an example system architecture for the example autonomous vehicle 500 of FIG. 15A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 500 in FIG. 15C are illustrated as being connected via bus 502. The bus 502 may include a Controller Area Network (CAN) data interface (alternatively referred to herein as a "CAN bus"). A CAN may be a network inside the vehicle 500 used to aid in control of various features and functionality of the vehicle 500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 502 is described herein as being a CAN bus, this is not intended to be limiting. For example, in addition to, or alternatively from, the CAN bus, FlexRay and/or Ethernet may be used. Additionally, although a single line is used to represent the bus 502, this is not intended to be limiting. For example, there may be any number of busses 502, which may include one or more CAN busses, one or more FlexRay busses, one or more Ethernet busses, and/or one or more other types of busses using a different protocol. In some examples, two or more busses 502 may be used to perform different functions, and/or may be used for redundancy. For example, a first bus 502 may be used for collision avoidance functionality and a second bus 502 may be used for actuation control. In any example, each bus 502 may communicate with any of the components of the vehicle 500, and two or more busses 502 may communicate with the same components. In some examples, each SoC 504, each controller 536, and/or each computer within the vehicle may have access to the same input data (e.g., inputs from sensors of the vehicle 500), and may be connected to a common bus, such the CAN bus.

The vehicle 500 may include one or more controller(s) 536, such as those described herein with respect to FIG. 15A. The controller(s) 536 may be used for a variety of functions. The controller(s) 536 may be coupled to any of the various other components and systems of the vehicle 500, and may be used for control of the vehicle 500, artificial intelligence of the vehicle 500, infotainment for the vehicle 500, and/or the like.

The vehicle 500 may include a system(s) on a chip (SoC) 504. The SoC 504 may include CPU(s) 506, GPU(s) 508, processor(s) 510, cache(s) 512, accelerator(s) 514, data store(s) 516, and/or other components and features not illustrated. The SoC(s) 504 may be used to control the vehicle 500 in a variety of platforms and systems. For example, the SoC(s) 504 may be combined in a system (e.g., the system of the vehicle 500) with an HD map 522 which may obtain map refreshes and/or updates via a network interface 524 from one or more servers (e.g., server(s) 578 of FIG. 15D).

The CPU(s) 506 may include a CPU cluster or CPU complex (alternatively referred to herein as a "CCPLEX"). The CPU(s) 506 may include multiple cores and/or L2 caches. For example, in some embodiments, the CPU(s) 506 may include eight cores in a coherent multi-processor configuration. In some embodiments, the CPU(s) 506 may include four dual-core clusters where each cluster has a dedicated L2 cache (e.g., a 2 MB L2 cache). The CPU(s) 506 (e.g., the CCPLEX) may be configured to support simultaneous cluster operation enabling any combination of the clusters of the CPU(s) 506 to be active at any given time.

The CPU(s) 506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 508 may include an integrated GPU (alternatively referred to herein as an "iGPU"). The GPU(s) 508 may be programmable and may be efficient for parallel workloads. The GPU(s) 508, in some examples, may use an enhanced tensor instruction set. The GPU(s) 508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 508 may include at least eight streaming microprocessors. The GPU(s) 508 may use compute application programming interface(s) (API(s)). In addition, the GPU(s) 508 may use one or more parallel computing platforms and/or programming models (e.g., NVIDIA's CUDA).

The GPU(s) 508 may be power-optimized for best performance in automotive and embedded use cases. For example, the GPU(s) 508 may be fabricated on a Fin field-effect transistor (FinFET). However, this is not intended to be limiting and the GPU(s) 508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 508 to access the CPU(s) 506 page tables directly. In such examples, when the GPU(s) 508 memory management unit (MMU) experiences a miss, an address translation request may be transmitted to the CPU(s) 506. In response, the CPU(s) 506 may look in its page tables for the virtual-to-physical mapping for the address and transmits the translation back to the GPU(s) 508. As such, unified memory technology may allow a single unified virtual address space for memory of both the CPU(s) 506 and the GPU(s) 508, thereby simplifying the GPU(s) 508 programming and porting of applications to the GPU(s) 508.

In addition, the GPU(s) 508 may include an access counter that may keep track of the frequency of access of the GPU(s) 508 to memory of other processors. The access counter may help ensure that memory pages are moved to the physical memory of the processor that is accessing the pages most frequently.

The SoC(s) 504 may include any number of cache(s) 512, including those described herein. For example, the cache(s) 512 may include an L3 cache that is available to both the CPU(s) 506 and the GPU(s) 508 (e.g., that is connected both the CPU(s) 506 and the GPU(s) 508). The cache(s) 512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 504 may include an arithmetic logic unit(s) (ALU(s)) which may be leveraged in performing processing with respect to any of the variety of tasks or operations of the vehicle 500—such as processing DNNs. In addition, the SoC(s) 504 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 506 and/or GPU(s) 508.

The SoC(s) 504 may include one or more accelerators 514 (e.g., hardware accelerators, software accelerators, or a combination thereof). For example, the SoC(s) 504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 508 and to off-load some of the tasks of the GPU(s) 508 (e.g., to free up more cycles of the GPU(s) 508 for performing other tasks). As an example, the accelerator(s) 514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 508, and by using an inference accelerator, for example, a designer may target either the DLA(s) or the GPU(s) 508 for any function. For example, the designer may focus processing of CNNs and floating point operations on the DLA(s) and leave other functions to the GPU(s) 508 and/or other accelerator(s) 514.

The accelerator(s) 514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 514 (e.g., the hardware acceleration cluster) may include a computer vision network on-chip and SRAM, for providing a high-bandwidth, low latency SRAM for the accelerator(s) 514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LiDAR data for purposes of localization and/or other functions, and/or for other uses. In some embodiments, one or more tree traversal units (TTUs) may be used for executing one or more ray-tracing related operations.

The accelerator(s) 514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 566 output that correlates with the vehicle 500 orientation, distance, 3D location estimates of the object obtained from the neural network and/or other sensors (e.g., LiDAR sensor(s) 564 or RADAR sensor(s) 560), among others.

The SoC(s) 504 may include data store(s) 516 (e.g., memory). The data store(s) 516 may be on-chip memory of the SoC(s) 504, which may store neural networks to be executed on the GPU and/or the DLA. In some examples, the data store(s) 516 may be large enough in capacity to store multiple instances of neural networks for redundancy and safety. The data store(s) 512 may comprise L2 or L3 cache(s) 512. Reference to the data store(s) 516 may include reference to the memory associated with the PVA, DLA, and/or other accelerator(s) 514, as described herein.

The SoC(s) 504 may include one or more processor(s) 510 (e.g., embedded processors). The processor(s) 510 may include a boot and power management processor that may be a dedicated processor and subsystem to handle boot power and management functions and related security enforcement. The boot and power management processor may be a part of the SoC(s) 504 boot sequence and may provide runtime power management services. The boot power and management processor may provide clock and voltage programming, assistance in system low power state transitions, management of SoC(s) 504 thermals and temperature sensors, and/or management of the SoC(s) 504 power states. Each temperature sensor may be implemented as a ring-oscillator whose output frequency is proportional to temperature, and the SoC(s) 504 may use the ring-oscillators to detect temperatures of the CPU(s) 506, GPU(s) 508, and/or accelerator(s) 514. If temperatures are determined to exceed a threshold, the boot and power management processor may enter a temperature fault routine and put the SoC(s) 504 into a lower power state and/or put the vehicle 500 into a chauffeur to safe stop mode (e.g., bring the vehicle 500 to a safe stop).

The processor(s) 510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 510 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations. The processor(s) 510 may further include a real-time camera engine that may include a dedicated processor subsystem for handling real-time camera management. The processor(s) 510 may further include a high-dynamic range signal processor that may include an image signal processor that is a hardware engine that is part of the camera processing pipeline.

The processor(s) 510 may include a video image compositor that may be a processing block (e.g., implemented on a microprocessor) that implements video post-processing functions needed by a video playback application to produce the final image for the player window. The video image compositor may perform lens distortion correction on wide-view camera(s) 570, surround camera(s) 574, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 508 is not required to continuously render new surfaces. Even when the GPU(s) 508 is powered on and active doing 3D rendering, the video image compositor may be used to offload the GPU(s) 508 to improve performance and responsiveness.

The SoC(s) 504 may further include a mobile industry processor interface (MIPI) camera serial interface for receiving video and input from cameras, a high-speed interface, and/or a video input block that may be used for camera and related pixel input functions. The SoC(s) 504 may further include an input/output controller(s) that may be controlled by software and may be used for receiving I/O signals that are uncommitted to a specific role.

The SoC(s) 504 may further include a broad range of peripheral interfaces to enable communication with peripherals, audio codecs, power management, and/or other devices. The SoC(s) 504 may be used to process data from cameras (e.g., connected over Gigabit Multimedia Serial Link and Ethernet), sensors (e.g., LiDAR sensor(s) 564, RADAR sensor(s) 560, etc. that may be connected over Ethernet), data from bus 502 (e.g., speed of vehicle 500, steering wheel position, etc.), data from GNSS sensor(s) 558 (e.g., connected over Ethernet or CAN bus). The SoC(s) 504 may further include dedicated high-performance mass storage controllers that may include their own DMA engines, and that may be used to free the CPU(s) 506 from routine data management tasks.

The SoC(s) 504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 504 may be faster, more reliable, and even more energy-efficient and space-efficient than conventional systems. For example, the accelerator(s) 514, when combined with the CPU(s) 506, the GPU(s) 508, and the data store(s) 516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 520) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 508.

In some examples, a CNN for facial recognition and vehicle owner identification may use data from camera sensors to identify the presence of an authorized driver and/or owner of the vehicle 500. The always on sensor processing engine may be used to unlock the vehicle when the owner approaches the driver door and turn on the lights, and, in security mode, to disable the vehicle when the owner leaves the vehicle. In this way, the SoC(s) 504 provide for security against theft and/or carjacking.

In another example, a CNN for emergency vehicle detection and identification may use data from microphones 596 to detect and identify emergency vehicle sirens. In contrast to conventional systems, that use general classifiers to detect sirens and manually extract features, the SoC(s) 504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 562, until the emergency vehicle(s) passes.

The vehicle may include a CPU(s) 518 (e.g., discrete CPU(s), or dCPU(s)), that may be coupled to the SoC(s) 504 via a high-speed interconnect (e.g., PCIe). The CPU(s) 518 may include an X86 processor, for example. The CPU(s) 518 may be used to perform any of a variety of functions, including arbitrating potentially inconsistent results between ADAS sensors and the SoC(s) 504, and/or monitoring the status and health of the controller(s) 536 and/or infotainment SoC 530, for example.

The vehicle 500 may include a GPU(s) 520 (e.g., discrete GPU(s), or dGPU(s)), that may be coupled to the SoC(s) 504 via a high-speed interconnect (e.g., NVIDIA's NVLINK). The GPU(s) 520 may provide additional artificial intelligence functionality, such as by executing redundant and/or different neural networks, and may be used to train and/or update neural networks based on input (e.g., sensor data) from sensors of the vehicle 500.

The vehicle 500 may further include the network interface 524 which may include one or more wireless antennas 526 (e.g., one or more wireless antennas for different communication protocols, such as a cellular antenna, a Bluetooth antenna, etc.). The network interface 524 may be used to enable wireless connectivity over the Internet with the cloud (e.g., with the server(s) 578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 500 information about vehicles in proximity to the vehicle 500 (e.g., vehicles in front of, on the side of, and/or behind the vehicle 500). This functionality may be part of a cooperative adaptive cruise control functionality of the vehicle 500.

The network interface 524 may include a SoC that provides modulation and demodulation functionality and enables the controller(s) 536 to communicate over wireless networks. The network interface 524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 500 may further include data store(s) 528 which may include off-chip (e.g., off the SoC(s) 504) storage. The data store(s) 528 may include one or more storage elements including RAM, SRAM, DRAM, VRAM, Flash, hard disks, and/or other components and/or devices that may store at least one bit of data.

The vehicle 500 may further include GNSS sensor(s) 558. The GNSS sensor(s) 558 (e.g., GPS, assisted GPS sensors, differential GPS (DGPS) sensors, etc.), to assist in mapping, perception, occupancy grid generation, and/or path planning functions. Any number of GNSS sensor(s) 558 may be used, including, for example and without limitation, a GPS using a USB connector with an Ethernet to Serial (RS-232) bridge.

The vehicle 500 may further include RADAR sensor(s) 560. The RADAR sensor(s) 560 may be used by the vehicle 500 for long-range vehicle detection, even in darkness and/or severe weather conditions. RADAR functional safety levels may be ASIL B. The RADAR sensor(s) 560 may use the CAN and/or the bus 502 (e.g., to transmit data generated by the RADAR sensor(s) 560) for control and to access object tracking data, with access to Ethernet to access raw data in some examples. A wide variety of RADAR sensor types may be used. For example, and without limitation, the RADAR sensor(s) 560 may be suitable for front, rear, and side RADAR use. In some example, Pulse Doppler RADAR sensor(s) are used.

The RADAR sensor(s) 560 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 500 surroundings at higher speeds with minimal interference from traffic in adjacent lanes. The other two antennae may expand the field of view, making it possible to quickly detect vehicles entering or leaving the vehicle's 500 lane.

Mid-range RADAR systems may include, as an example, a range of up to 560 m (front) or 80 m (rear), and a field of view of up to 42 degrees (front) or 550 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 500 may further include ultrasonic sensor(s) 562. The ultrasonic sensor(s) 562, which may be positioned at the front, back, and/or the sides of the vehicle 500, may be used for park assist and/or to create and update an occupancy grid. A wide variety of ultrasonic sensor(s) 562 may be used, and different ultrasonic sensor(s) 562 may be used for different ranges of detection (e.g., 2.5 m, 4 m). The ultrasonic sensor(s) 562 may operate at functional safety levels of ASIL B.

The vehicle 500 may include LiDAR sensor(s) 564. The LiDAR sensor(s) 564 may be used for object and pedestrian detection, emergency braking, collision avoidance, and/or other functions. The LiDAR sensor(s) 564 may be functional safety level ASIL B. In some examples, the vehicle 500 may include multiple LiDAR sensors 564 (e.g., two, four, six, etc.) that may use Ethernet (e.g., to provide data to a Gigabit Ethernet switch).

In some examples, the LiDAR sensor(s) 564 may be capable of providing a list of objects and their distances for a 360-degree field of view. Commercially available LiDAR sensor(s) 564 may have an advertised range of approximately 500 m, with an accuracy of 2 cm-3 cm, and with support for a 500 Mbps Ethernet connection, for example. In some examples, one or more non-protruding LiDAR sensors 564 may be used. In such examples, the LiDAR sensor(s) 564 may be implemented as a small device that may be embedded into the front, rear, sides, and/or corners of the vehicle 500. The LiDAR sensor(s) 564, in such examples, may provide up to a 120-degree horizontal and 35-degree vertical field-of-view, with a 200 m range even for low-reflectivity objects. Front-mounted LiDAR sensor(s) 564 may be configured for a horizontal field of view between 45 degrees and 135 degrees.

In some examples, LiDAR technologies, such as 3D flash LiDAR, may also be used. 3D Flash LiDAR uses a flash of a laser as a transmission source, to illuminate vehicle surroundings up to approximately 200 m. A flash LiDAR unit includes a receptor, which records the laser pulse transit time and the reflected light on each pixel, which in turn corresponds to the range from the vehicle to the objects. Flash LiDAR may allow for highly accurate and distortion-free images of the surroundings to be generated with every laser flash. In some examples, four flash LiDAR sensors may be deployed, one at each side of the vehicle 500. Available 3D flash LiDAR systems include a solid-state 3D staring array LiDAR camera with no moving parts other than a fan (e.g., a non-scanning LiDAR device). The flash LiDAR device may use a 5 nanosecond class I (eye-safe) laser pulse per frame and may capture the reflected laser light in the form of 3D range point clouds and co-registered intensity data. By using flash LiDAR, and because flash LiDAR is a solid-state device with no moving parts, the LiDAR sensor(s) 564 may be less susceptible to motion blur, vibration, and/or shock.

The vehicle may further include IMU sensor(s) 566. The IMU sensor(s) 566 may be located at a center of the rear axle of the vehicle 500, in some examples. The IMU sensor(s) 566 may include, for example and without limitation, an accelerometer(s), a magnetometer(s), a gyroscope(s), a magnetic compass(es), and/or other sensor types. In some examples, such as in six-axis applications, the IMU sensor(s) 566 may include accelerometers and gyroscopes, while in nine-axis applications, the IMU sensor(s) 566 may include accelerometers, gyroscopes, and magnetometers.

In some embodiments, the IMU sensor(s) 566 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 566 may enable the vehicle 500 to estimate heading without requiring input from a magnetic sensor by directly observing and correlating the changes in velocity from GPS to the IMU sensor(s) 566. In some examples, the IMU sensor(s) 566 and the GNSS sensor(s) 558 may be combined in a single integrated unit.

The vehicle may include microphone(s) 596 placed in and/or around the vehicle 500. The microphone(s) 596 may be used for emergency vehicle detection and identification, among other things.

The vehicle may further include any number of camera types, including stereo camera(s) 568, wide-view camera(s) 570, infrared camera(s) 572, surround camera(s) 574, long-range and/or mid-range camera(s) 598, and/or other camera types. The cameras may be used to capture image data around an entire periphery of the vehicle 500. The types of cameras used depends on the embodiments and requirements for the vehicle 500, and any combination of camera types may be used to provide the necessary coverage around the vehicle 500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 15A and FIG. 15B.

The vehicle 500 may further include vibration sensor(s) 542. The vibration sensor(s) 542 may measure vibrations of components of the vehicle, such as the axle(s). For example, changes in vibrations may indicate a change in road surfaces. In another example, when two or more vibration sensors 542 are used, the differences between the vibrations may be used to determine friction or slippage of the road surface (e.g., when the difference in vibration is between a power-driven axle and a freely rotating axle).

The vehicle 500 may include an ADAS system 538. The ADAS system 538 may include a SoC, in some examples. The ADAS system 538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 560, LiDAR sensor(s) 564, and/or a camera(s). The ACC systems may include longitudinal ACC and/or lateral ACC. Longitudinal ACC monitors and controls the distance to the vehicle immediately ahead of the vehicle 500 and automatically adjust the vehicle speed to maintain a safe distance from vehicles ahead. Lateral ACC performs distance keeping, and advises the vehicle 500 to change lanes when necessary. Lateral ACC is related to other ADAS applications such as LCA and CWS.

CACC uses information from other vehicles that may be received via the network interface 524 and/or the wireless antenna(s) 526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 500), while the I2V communication concept provides information about traffic further ahead. CACC systems may include either or both I2V and V2V information sources. Given the information of the vehicles ahead of the vehicle 500, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 500 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component. LKA systems are a variation of LDW systems. LKA systems provide steering input or braking to correct the vehicle 500 if the vehicle 500 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 500 is backing up. Some RCTW systems include AEB to ensure that the vehicle brakes are applied to avoid a crash. RCTW systems may use one or more rear-facing RADAR sensor(s) 560, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 500, the vehicle 500 itself must, in the case of conflicting results, decide whether to heed the result from a primary computer or a secondary computer (e.g., a first controller 536 or a second controller 536). For example, in some embodiments, the ADAS system 538 may be a backup and/or secondary computer for providing perception information to a backup computer rationality module. The backup computer rationality monitor may run a redundant diverse software on hardware components to detect faults in perception and dynamic driving tasks. Outputs from the ADAS system 538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 504.

In other examples, ADAS system 538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 538 may be fed into the primary computer's perception block and/or the primary computer's dynamic driving task block. For example, if the ADAS system 538 indicates a forward crash warning due to an object immediately ahead, the perception block may use this information when identifying objects. In other examples, the secondary computer may have its own neural network which is trained and thus reduces the risk of false positives, as described herein.

The vehicle 500 may further include the infotainment SoC 530 (e.g., an in-vehicle infotainment system (IVI)). Although illustrated and described as a SoC, the infotainment system may not be a SoC, and may include two or more discrete components. The infotainment SoC 530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 500. For example, the infotainment SoC 530 may radios, disk players, navigation systems, video players, USB and Bluetooth connectivity, carputers, in-car entertainment, Wi-Fi, steering wheel audio controls, hands free voice control, a heads-up display (HUD), an HMI display 534, a telematics device, a control panel (e.g., for controlling and/or interacting with various components, features, and/or systems), and/or other components. The infotainment SoC 530 may further be used to provide information (e.g., visual and/or audible) to a user(s) of the vehicle, such as information from the ADAS system 538, autonomous driving information such as planned vehicle maneuvers, trajectories, surrounding environment information (e.g., intersection information, vehicle information, road information, etc.), and/or other information.

The infotainment SoC 530 may include GPU functionality. The infotainment SoC 530 may communicate over the bus 502 (e.g., CAN bus, Ethernet, etc.) with other devices, systems, and/or components of the vehicle 500. In some examples, the infotainment SoC 530 may be coupled to a supervisory MCU such that the GPU of the infotainment system may perform some self-driving functions in the event that the primary controller(s) 536 (e.g., the primary and/or backup computers of the vehicle 500) fail. In such an example, the infotainment SoC 530 may put the vehicle 500 into a chauffeur to safe stop mode, as described herein.

The vehicle 500 may further include an instrument cluster 532 (e.g., a digital dash, an electronic instrument cluster, a digital instrument panel, etc.). The instrument cluster 532 may include a controller and/or supercomputer (e.g., a discrete controller or supercomputer). The instrument cluster 532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 530 and the instrument cluster 532. In other words, the instrument cluster 532 may be included as part of the infotainment SoC 530, or vice versa.

Figure 15D:
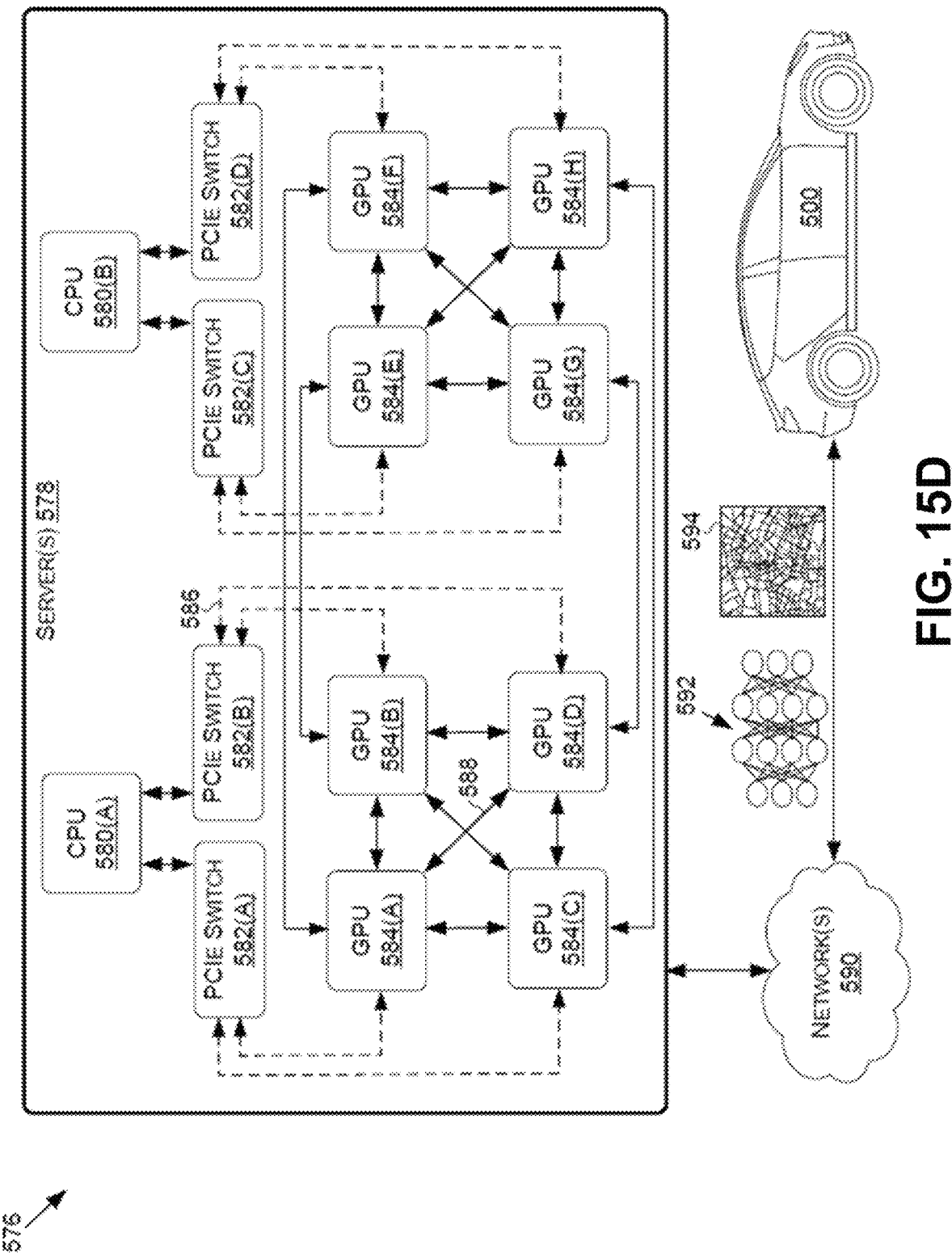
FIG. 15D is a diagram illustrating a system for communication between cloud-based server(s) and the autonomous vehicle of FIG. 15A, according to at least one embodiment.

FIG. 15D is a system diagram for communication between cloud-based server(s) and the example autonomous vehicle 500 of FIG. 15A, in accordance with some embodiments of the present disclosure. The system 576 may include server(s) 578, network(s) 590, and vehicles, including the vehicle 500. The server(s) 578 may include a plurality of GPUs 584(A)-584(H) (collectively referred to herein as GPUs 584), PCIe switches 582(A)-582(H) (collectively referred to herein as PCIe switches 582), and/or CPUs 580(A)-580(B) (collectively referred to herein as CPUs 580). The GPUs 584, the CPUs 580, and the PCIe switches may be interconnected with high-speed interconnects such as, for example and without limitation, NVLink interfaces 588 developed by NVIDIA and/or PCIe connections 586. In some examples, the GPUs 584 are connected via NVLink and/or NVSwitch SoC and the GPUs 584 and the PCIe switches 582 are connected via PCIe interconnects. Although eight GPUs 584, two CPUs 580, and two PCIe switches are illustrated, this is not intended to be limiting. Depending on the embodiment, each of the server(s) 578 may include any number of GPUs 584, CPUs 580, and/or PCIe switches. For example, the server(s) 578 may each include eight, sixteen, thirty-two, and/or more GPUs 584.

The server(s) 578 may receive, over the network(s) 590 and from the vehicles, image data representative of images showing unexpected or changed road conditions, such as recently commenced road-work. The server(s) 578 may transmit, over the network(s) 590 and to the vehicles, neural networks 592, updated neural networks 592, and/or map information 594, including information regarding traffic and road conditions. The updates to the map information 594 may include updates for the HD map 522, such as information regarding construction sites, potholes, detours, flooding, and/or other obstructions. In some examples, the neural networks 592, the updated neural networks 592, and/or the map information 594 may have resulted from new training and/or experiences represented in data received from any number of vehicles in the environment, and/or based on training performed at a datacenter (e.g., using the server(s) 578 and/or other servers).

The server(s) 578 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 590, and/or the machine learning models may be used by the server(s) 578 to remotely monitor the vehicles.

In some examples, the server(s) 578 may receive data from the vehicles and apply the data to up-to-date real-time neural networks for real-time intelligent inferencing. The server(s) 578 may include deep-learning supercomputers and/or dedicated AI computers powered by GPU(s) 584, such as a DGX and DGX Station machines developed by NVIDIA. However, in some examples, the server(s) 578 may include deep learning infrastructure that use only CPU-powered datacenters.

The deep-learning infrastructure of the server(s) 578 may be capable of fast, real-time inferencing, and may use that capability to evaluate and verify the health of the processors, software, and/or associated hardware in the vehicle 500. For example, the deep-learning infrastructure may receive periodic updates from the vehicle 500, such as a sequence of images and/or objects that the vehicle 500 has located in that sequence of images (e.g., via computer vision and/or other machine learning object classification techniques). The deep-learning infrastructure may run its own neural network to identify the objects and compare them with the objects identified by the vehicle 500 and, if the results do not match and the infrastructure concludes that the AI in the vehicle 500 is malfunctioning, the server(s) 578 may transmit a signal to the vehicle 500 instructing a fail-safe computer of the vehicle 500 to assume control, notify the passengers, and complete a safe parking maneuver.

For inferencing, the server(s) 578 may include the GPU(s) 584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Figure 16:
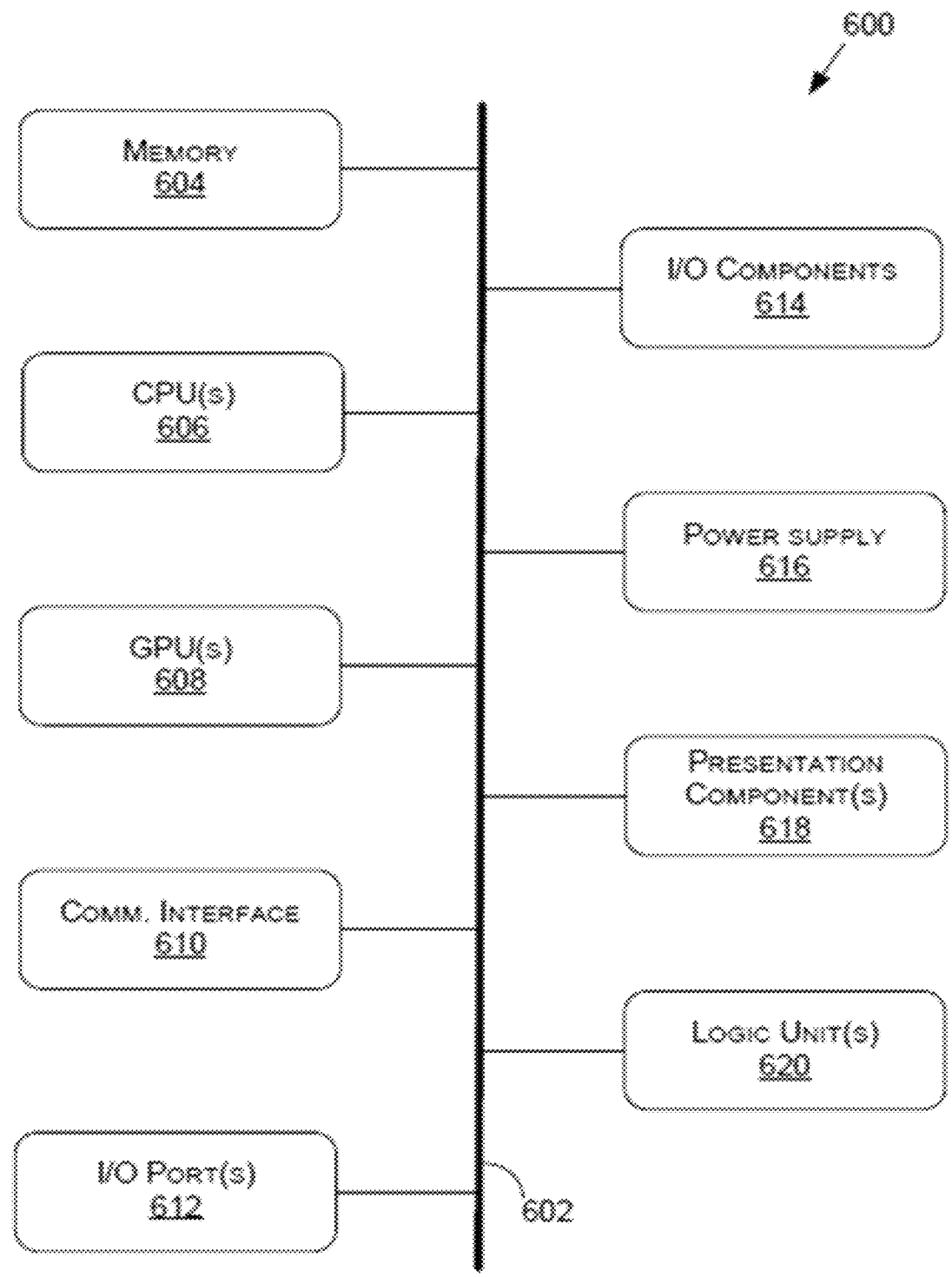
FIG. 16 is a block diagram of an example computing device(s) 600 suitable for use in implementing some embodiments of the present disclosure.

FIG. 16 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 16 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 16 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 16.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

Figure 17:
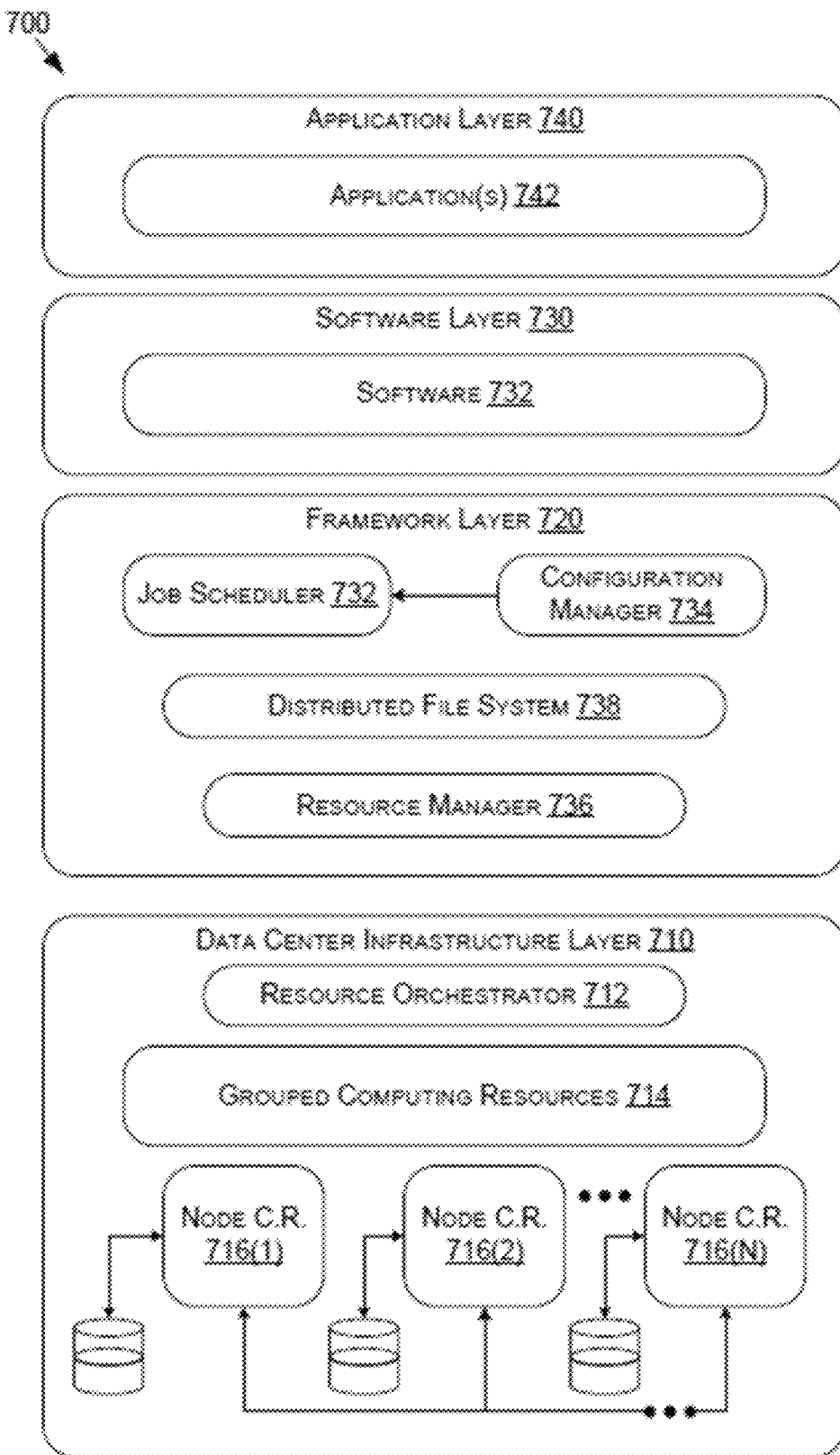
FIG. 17 illustrates an example data center 700 that may be used in at least one embodiments of the present disclosure.

FIG. 17 illustrates an example data center 700 that may be used in at least one embodiments of the present disclosure. The data center 700 may include a data center infrastructure layer 710, a framework layer 720, a software layer 730, and/or an application layer 740.

As shown in FIG. 17, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-7161(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, and/or other processors may be grouped within one or more racks to provide compute resources to support one or more workloads. The one or more racks may also include any number of power modules, cooling modules, and/or network switches, in any combination.

The resource orchestrator 722 may configure or otherwise control one or more node C.R.s 716(1)-716(N) and/or grouped computing resources 714. In at least one embodiment, resource orchestrator 722 may include a software design infrastructure ("SDI") management entity for the data center 700. The resource orchestrator 722 may include hardware, software, or some combination thereof.

In at least one embodiment, as shown in FIG. 17, framework layer 720 may include a job scheduler 732, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 732 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 732. In at least one embodiment, clustered or grouped computing resources may include grouped computing resource 714 at data center infrastructure layer 710. The resource manager 1036 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

EXAMPLE NETWORK ENVIRONMENTS

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 16—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 17.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 16. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-usable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

At least one embodiment of the disclosure can be described in view of the following examples:

Example 1 is a method comprising:
determining pixel data from a pair of regions of an image generated by an imaging device, the pair of regions comprising a first region and a second region of the image, wherein the first region comprises a first plurality of pixels of the image and the second region comprises a second plurality of pixels of the image;
determining a plurality of pixel pairs of the image, wherein a pixel pair of the plurality of pixel pairs comprises a first pixel from the first plurality of pixels and a second pixel from the second plurality of pixels;
calculating a plurality of contrasts based on the plurality of pixel pairs, wherein a contrast for the pixel pair is calculated between pixel data for the first pixel and pixel data for the second pixel from the pixel pair;
determining a contrast distribution based on the plurality of contrasts; and
calculating a value representative of a capability of the imaging device to detect contrast based on the contrast distribution.

Example 2 is a method of example 1, wherein calculating the value representative of the capability of the imaging device to detect contrast comprises:
calculating a mean value of the contrast distribution;
calculating a standard deviation value of the contrast distribution; and
calculating the value based on the mean value of the contrast distribution and the standard deviation of the contrast distribution.

Example 3 is a method of example 2, wherein calculating the value based on the mean value of the contrast distribution and the standard deviation of the contrast distribution comprises dividing the mean value of the contrast distribution by the standard deviation of the contrast distribution.

Example 4 is a method of example 1, further comprising: selecting the first region and the second region for the pair of regions.

Example 5 is a method of example 4, further comprising:
selecting a plurality of additional pairs of regions;
determining a plurality of additional contrast distributions for the plurality of additional pairs of regions; and
calculating the value representative of the capability of the imaging device to detect contrast based on the plurality of additional contrast distributions.

Example 6 is a method of example 1, wherein the pixel data comprises at least one of luminance values, color values, or radiance values, the method further comprising at least one of:
determining the luminance values;
determining the color values; or
determining the radiance values.

Example 7 is a method of example 1, wherein the pixel data comprises linearized pixel data.

Example 8 is a method of example 1, wherein the pixel data comprises at least one of tone mapped data or companded data, and wherein the pixel data is linearized using a tone curve of the imaging device.

Example 9 is a method of example 1, wherein objects in the image have at least one of an unknown reflectance or an unknown color.

Example 10 is a method of example 1, further comprising calculating an estimated detectability index for the imaging device using the calculated value.

Example 11 is a system comprising:
a memory device; and
a processing device, operatively coupled with the plurality of memory devices, to perform operations comprising:
determining pixel data from a pair of regions of an image generated by an imaging device, the pair of regions comprising a first region and a second region of the image, wherein the first region comprises a first plurality of pixels of the image and the second region comprises a second plurality of pixels of the image;
determining a plurality of pixel pairs of the image, wherein a pixel pair of the plurality of pixel pairs comprises a first pixel from the first plurality of pixels and a second pixel from the second plurality of pixels;
calculating a plurality of contrasts based on the plurality of pixel pairs, wherein a contrast for the pixel pair is calculated between pixel data for the first pixel and pixel data for the second pixel from the pixel pair;
determining a contrast distribution based on the plurality of contrasts; and
calculating a value representative of a capability of the imaging device to detect contrast based on the contrast distribution.

Example 12 is a system of example 11, wherein calculating the value representative of the capability of the imaging device to detect contrast comprises:
calculating a mean value of the contrast distribution;
calculating a standard deviation value of the contrast distribution; and
calculating the value based on the mean value of the contrast distribution and the standard deviation of the contrast distribution.

Example 13 is a system of example 12, wherein calculating the value based on the mean value of the contrast distribution and the standard deviation of the contrast distribution comprises dividing the mean value of the contrast distribution by the standard deviation of the contrast distribution.

Example 14 is a system of example 11, wherein the operations further comprise: selecting the first region and the second region for the pair of regions.

Example 15 is a system of example 14, wherein the operations further comprise:

selecting a plurality of additional pairs of regions;

determining a plurality of additional contrast distributions for the plurality of additional pairs of regions; and calculating the value representative of the capability of the imaging device to detect contrast based on the plurality of additional contrast distributions.

Example 16 is a non-transitory computer-readable storage medium comprising instructions that, when executed by a processing device, cause the processing device to perform operations comprising:

determining pixel data from a pair of regions of an image generated by an imaging device, the pair of regions comprising a first region and a second region of the image, wherein the first region comprises a first plurality of pixels of the image and the second region comprises a second plurality of pixels of the image;

determining a plurality of pixel pairs of the image, wherein a pixel pair of the plurality of pixel pairs comprises a first pixel from the first plurality of pixels and a second pixel from the second plurality of pixels;

calculating a plurality of contrasts based on the plurality of pixel pairs, wherein a contrast for the pixel pair is calculated between pixel data for the first pixel and pixel data for the second pixel from the pixel pair;

determining a contrast distribution based on the plurality of contrasts; and calculating a value representative of a capability of the imaging device to detect contrast based on the contrast distribution.

Example 17 is a non-transitory computer-readable storage medium of example 16, wherein calculating the value representative of the capability of the imaging device to detect contrast comprises:

calculating a mean value of the contrast distribution;

calculating a standard deviation value of the contrast distribution; and calculating the value based on the mean value of the contrast distribution and the standard deviation of the contrast distribution.

Example 18 is a non-transitory computer-readable storage medium of example 17, wherein calculating the value based on the mean value of the contrast distribution and the standard deviation of the contrast distribution comprises dividing the mean value of the contrast distribution by the standard deviation of the contrast distribution.

Example 19 is a non-transitory computer-readable storage medium of example 16, wherein the operations further comprise: selecting the first region and the second region for the pair of regions.

Example 20 is a non-transitory computer-readable storage medium of example 19, wherein the operations further comprise:

selecting a plurality of additional pairs of regions;

determining a plurality of additional contrast distributions for the plurality of additional pairs of regions; and calculating the value representative of the capability of the imaging device to detect contrast based on the plurality of additional contrast distributions.

Example 21 is an autonomous vehicle comprising:

an imaging device; and one or more processors operatively coupled to the imaging device, the one or more processors to:

receive pixel data from a pair of regions of an image generated by an imaging device, the pair of regions comprising a first region and a second region of the image, wherein the first region comprises a first plurality of pixels of the image and the second region comprises a second plurality of pixels of the image;

determine a plurality of pixel pairs of the image, wherein a pixel pair of the plurality of pixel pairs comprises a first pixel from the first plurality of pixels and a second pixel from the second plurality of pixels;

calculate a plurality of contrasts based on the plurality of pixel pairs, wherein a contrast for the pixel pair is calculated between pixel data for the first pixel and pixel data for the second pixel from the pixel pair;

determine a contrast distribution based on the plurality of contrasts;

calculate a value representative of a capability of the imaging device to detect contrast based on a mean value and a standard deviation value based on the contrast distribution; and determine a reduction in contrast detectability of the imaging device based on the value.

Example 22 is an autonomous vehicle of example 21, wherein to determine the reduction in contrast detectability, the one or more processors are to:

determine an average scene brightness from the image;

determine, using the calculated value and the average scene brightness, a current contrast signal to noise (CSNR) profile for the imaging device;

make a comparison between the current CSNR profile and a past CSNR profile;

make a determination, based on the comparison, that the current CSNR profile deviates from the past CSNR profile by at least a threshold amount; and determine the reduction in contrast detectability responsive to the determination that the current CSNR profile deviates from the past CSNR profile by at least the threshold amount.

Example 23 is an autonomous vehicle of example 21, wherein the one or more processors are further to: execute a self-driving operation of the autonomous vehicle in response to determining the reduction in the contrast detectability of the imaging device.

Example 24 is an autonomous vehicle of example 23, wherein the self-driving operation of the autonomous vehicle comprise one of: reducing a speed of the autonomous vehicle or transitioning from a first level autonomy to a second level autonomy for the self-driving operation of the autonomous vehicle.

Example 25 is an autonomous vehicle of example 21, wherein the one or more processors are further to:

determine whether the reduction in contrast detectability of the imaging device is attributed to a temporary degradation in optical performance of the imaging device or a prolonged deterioration of components in the imaging device.

Example 26 is an autonomous vehicle of example 25, wherein the one or more processors are further to:

determine that the reduction in contrast detectability of the imaging device is within a predetermined time threshold; and determine that the reduction in contrast detectability of the imaging device is attributed to a temporary degradation in optical performance in response to determining that the reduction in contrast detectability is within the predetermined time threshold.

Example 27 is an autonomous vehicle of example 25, wherein the one or more processors are further to:

alert an operator of the autonomous vehicle for maintenance responsive to a determination that the reduction in contrast detectability is attributed to a prolonged deterioration of optics in the imaging device.

Example 28 is an imaging system comprising:

an imaging device; and one or more processors operatively coupled to the imaging device, the one or more processors to:

receive pixel data from a pair of regions of an image generated by an imaging device, the pair of regions comprising a first region and a second region of the image, wherein the first region comprises a first plurality of pixels of the image and the second region comprises a second plurality of pixels of the image;

determine a plurality of pixel pairs of the image, wherein a pixel pair of the plurality of pixel pairs comprises a first pixel from the first plurality of pixels and a second pixel from the second plurality of pixels;

calculate a plurality of contrasts based on the plurality of pixel pairs, wherein a contrast for the pixel pair is calculated between pixel data for the first pixel and pixel data for the second pixel from the pixel pair;

determine a contrast distribution based on the plurality of contrasts;

calculate a value representative of a capability of the imaging device to detect contrast based on a mean value and a standard deviation value based on the contrast distribution; and determine a reduction in contrast detectability of the imaging device based on the value.

Example 29 is an imaging system of example 28, wherein to determine the reduction in contrast detectability, the one or more processors are to:

determine an average scene brightness from the image;

determine, using the calculated value and the average scene brightness, a current contrast signal to noise (CSNR) profile for the imaging device;

make a comparison between the current CSNR profile and a past CSNR profile;

make a determination, based on the comparison, that the current CSNR profile deviates from the past CSNR profile by at least a threshold amount; and determine the reduction in contrast detectability responsive to the determination that the current CSNR profile deviates from the past CSNR profile by at least the threshold amount.

Example 30 is an imaging system of example 28, wherein the one or more processors are further to alert an operator of the imaging system for a manual inspection of the image in response to determining the reduction in contrast detectability of the imaging device.

Example 31 is an imaging system of example 28, wherein the one or more processors are further to: determine the reduction in contrast detectability of the imaging device is attributed to a temporary degradation in optical performance of the imaging device or a prolonged deterioration of components in the imaging device.

Example 32 is an imaging system of example 31, wherein the one or more processors are further to:

determine that the reduction in contrast detectability of the imaging device is within a predetermined time threshold; and determine that the reduction in contrast detectability of the imaging device is attributed to a temporary degradation in optical performance in response to determining that the reduction in contrast detectability is within the predetermined time threshold.

Example 33 is an imaging system of example 31, wherein the one or more processors are further to: alert an operator of the imaging system for maintenance if the reduction in contrast detectability of the imaging device is attributed to a prolonged deterioration of optics in the imaging device.

Example 34 is a processor comprising one or more circuits to:

determine, for each image of a plurality of images in a training dataset, a) one or more contrast distributions and b) one or more values representative of a capability of an imaging device to detect contrast based on the one or more contrast distributions;

update the training dataset by adding, for each image of the plurality of images, the one or more values representative of the capability of the imaging device to detect contrast; and train one or more neural networks to perform a machine vision task using the training dataset.

Example 35 is a processor of example 34, wherein to determine a contrast distribution for an image the one or more circuits are further to:

determine pixel data from a pair of regions of the image, the pair of regions comprising a first region and a second region of the image, wherein the first region comprises a first plurality of pixels of the image and the second region comprises a second plurality of pixels of the image;

determine a plurality of pixel pairs of the image, wherein a pixel pair of the plurality of pixel pairs comprises a first pixel from the first plurality of pixels and a second pixel from the second plurality of pixels;

calculate a plurality of contrasts based on the plurality of pixel pairs, wherein a contrast for the pixel pair is calculated between pixel data for the first pixel and pixel data for the second pixel from the pixel pair; and determine the contrast distribution based on the plurality of contrasts.

Example 36 is a processor of example 35, wherein calculating a value representative of the capability of the imaging device to detect contrast for the image comprises:

calculating a mean value of the contrast distribution;

calculating a standard deviation value of the contrast distribution; and calculating the value based on the mean value of the contrast distribution and the standard deviation of the contrast distribution.

Example 37 is a processor of example 35, wherein the pixel data comprises at least one of luminance values, color values, or radiance values.

Example 38 is a processor of example 34, wherein the one or more circuits are further to:

determine a plurality of objects within an image of the plurality of images; and determine, for each object of the plurality of objects, a value of the one or more values, wherein the value represents a capability of the imaging device to detect contrast between the object and a background in the image.

Example 39 is a processor of example 36, wherein the one or more circuits are further to:

determine whether the training dataset comprising the plurality of images comprises at least a threshold number of images having objects with values that are below a threshold; and add additional images to the training dataset responsive to determining that fewer than the threshold number of images have objects with values that are below the threshold.

Example 40 is a processor comprising one or more circuits to:

receive an image generated by an imaging device;

determine a contrast distribution for the image;

calculate a value representative of a capability of the imaging device to detect contrast based on the contrast distribution;

generate a feature vector based on the image and the value representative of the capability of the imaging device to detect contrast; and use one or more trained neural networks to process the feature vector to perform a machine vision task.

Example 41 is a processor of example 40, wherein to determine a contrast distribution for the image the one or more circuits are further to:

determine pixel data from a pair of regions of the image, the pair of regions comprising a first region and a second region of the image, wherein the first region comprises a first plurality of pixels of the image and the second region comprises a second plurality of pixels of the image;

determine a plurality of pixel pairs of the image, wherein a pixel pair of the plurality of pixel pairs comprises a first pixel from the first plurality of pixels and a second pixel from the second plurality of pixels;

calculate a plurality of contrasts based on the plurality of pixel pairs, wherein a contrast for the pixel pair is calculated between pixel data for the first pixel and pixel data for the second pixel from the pixel pair; and determine the contrast distribution based on the plurality of contrasts.

Example 42 is a processor of example 41, wherein calculating a value representative of the capability of the imaging device to detect contrast for the image comprises:

calculating a mean value of the contrast distribution;

calculating a standard deviation value of the contrast distribution; and calculating the value based on the mean value of the contrast distribution and the standard deviation of the contrast distribution.

Example 43 is a processor of example 41, wherein the pixel data comprises at least one of luminance values, color values, or radiance values.

Example 44 is a processor of example 40, wherein the one or more circuits are further to:

determine a plurality of objects within an image of the plurality of images; and determine, for each object of the plurality of objects, a value of the one or more values, wherein the value represents a capability of the imaging device to detect contrast between the object and a background in the image.

Example 45 is a processor of example 40, wherein the machine vision task comprises an automated vision task for an automobile.

Example 46 is a processor of example 40, wherein the machine vision task comprises an automated vision task for a medical imaging system.

Example 47 is a method comprising:

computing an estimated detectability index for an object captured by an imaging device of a vision-based system during operation of the vision-based system;

predicting a change in the estimated detectability index; and determining a reduction in contrast detectability of the imaging device based on the predicted change in the estimated detectability index.

Example 48 is a method of example 47, wherein the vision-based system comprises an autonomous vehicle or a semi-autonomous vehicle.

Example 49 is a method of example 48, further comprising executing a self-driving operation of the autonomous vehicle in response to determining the reduction in the contrast detectability of the imaging device.

Example 50 is a method of example 48, further comprising:

determining that the reduction in contrast detectability of the imaging device is within a predetermined time threshold;

determining that the reduction in contrast detectability of the imaging device is attributed to a temporary degradation in optical performance in response to determining that the reduction in contrast detectability is within the predetermined time threshold.

Example 51 is a method of example 50, further comprising:

alerting an operator of the autonomous vehicle for maintenance responsive to a determination that the reduction in contrast detectability is attributed to a prolonged deterioration of optics in the imaging device.

Example 52 is a method of example 47, wherein predicting a change in the estimated detectability index further comprises:

determining a change in a distance from the imaging device to the object;

determining a change in an area of an image capturing the object based on the change in the distance; and determining the change in the estimated detectability based on the change in the image area capturing the object;

Example 53 is a method of example 47, further comprising:

receiving pixel data from a pair of regions of an image generated by the imaging device, the pair of regions comprising a first region and a second region of the image, wherein the first region comprises a first plurality of pixels of the image and the second region comprises a second plurality of pixels of the image;

determining a plurality of pixel pairs of the image, wherein a pixel pair of the plurality of pixel pairs comprises a first pixel from the first plurality of pixels and a second pixel from the second plurality of pixels;

calculating a plurality of contrasts based on the plurality of pixel pairs, wherein a contrast for the pixel pair is calculated between pixel data for the first pixel and pixel data for the second pixel from the pixel pair;

determining a contrast distribution based on the plurality of contrasts;

calculating a value representative of a capability of the imaging device to detect contrast based on a mean value and a standard deviation value of the contrast distribution; and computing the estimated detectability index using the calculated value.

Example 54 is a method of example 47, further comprising:
determining a first exposure ratio for a sequential exposure scheme utilized by a high dynamic range sensor of the imaging device, the first exposure ratio corresponding to the object in an image;
determining a second exposure ratio, the second exposure ratio corresponding to a background in the image; and
calculating the estimated detectability index for the high dynamic range sensor based on the first and second exposure ratio.

Example 55 is an imaging system comprising:
an imaging device; and
one or more processors operatively coupled to the imaging device, the one or more processors to:
receive an image generated by the imaging device;
determine a contrast distribution for the image;
calculate a value representative of a capability of the imaging device to detect contrast based on the contrast distribution;
determine whether the value satisfies an adjustment criterion; and
adjust one or more settings of the imaging system responsive to determining that the value satisfies the adjustment criterion.

Example 56 is an imaging system that further extends the imaging system of claim 55, in which the adjustment criterion comprises a threshold, wherein the adjustment criterion is satisfied by the value being below the threshold, and wherein adjustment to the one or more settings of the imaging system comprises at least one of:
an increase in exposure time for the imaging device;
a decrease in a resolution of the imaging device;
activation of sensor binning for the imaging device;
an increase in a gain setting of the imaging device;
a change from a day mode to a night mode;
an increase in an illumination of the imaging system;
an activation of noise reduction; or
a decrease in an aperture for the imaging device.

Example 57 is an imaging system that further extends the imaging system of claim 55, in which the adjustment criterion is satisfied by the value being above the threshold, and wherein adjustment to the one or more settings of the imaging system comprises at least one of:
a decrease in exposure time for the imaging device;
an increase in a resolution of the imaging device;
de-activation of sensor binning for the imaging device;
a decrease in a gain setting of the imaging device;
a change from a night mode to a day mode;
a decrease in an illumination of the imaging system;
de-activation of noise reduction; or
an increase in an aperture for the imaging device.

Example 58 is an imaging system that further extends the imaging system of claim 55, in which the one or more processors are further to:
receive pixel data from a pair of regions of the image, the pair of regions comprising a first region and a second region of the image, wherein the first region comprises a first plurality of pixels of the image and the second region comprises a second plurality of pixels of the image;
determine a plurality of pixel pairs of the image, wherein a pixel pair of the plurality of pixel pairs comprises a first pixel from the first region and a second pixel from the second region; and
calculate a plurality of contrasts based on the plurality of pixel pairs, wherein a contrast for the pixel pair is calculated between pixel data corresponding to the first pixel and pixel data corresponding to the second pixel from the pixel pair;
wherein the contrast distribution is determined based on the plurality of contrasts.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. An autonomous vehicle comprising:

an imaging device; and one or more processors operatively coupled to the imaging device, the one or more processors to:

receive pixel data from a pair of regions of an image generated using an imaging device, the pair of regions comprising a first region and a second region of the image, wherein the first region comprises a first plurality of pixels of the image and the second region comprises a second plurality of pixels of the image;

determine a plurality of pixel pairs of the image, wherein a pixel pair of the plurality of pixel pairs comprises a first pixel from the first region and a second pixel from the second region;

calculate a plurality of contrasts based on the plurality of pixel pairs, wherein a contrast for the pixel pair is calculated between pixel data corresponding to the first pixel and pixel data corresponding to the second pixel from the pixel pair;

determine a contrast distribution based on the plurality of contrasts;

calculate a value representative of a capability of the imaging device to detect contrast based on a mean value and a standard deviation value of the contrast distribution; and determine a reduction in contrast detectability of the imaging device of the autonomous vehicle based on the value.

2. The autonomous vehicle of claim 1, wherein to determine the reduction in contrast detectability, the one or more processors are to:

determine an average scene brightness from the image;

determine, using the calculated value and the average scene brightness, a current contrast signal to noise (CSNR) profile for the imaging device;

make a comparison between the current CSNR profile and a past CSNR profile;

make a determination, based on the comparison, that the current CSNR profile deviates from the past CSNR profile by at least a threshold amount; and determine the reduction in contrast detectability responsive to the determination that the current CSNR profile deviates from the past CSNR profile by at least the threshold amount.

3. The autonomous vehicle of claim 1, wherein the one or more processors are further to: execute a self-driving operation of the autonomous vehicle in response to determining the reduction in the contrast detectability of the imaging device.

4. The autonomous vehicle of claim 3, wherein the self-driving operation of the autonomous vehicle comprise one of: reducing a speed of the autonomous vehicle or transitioning from a first level autonomy to a second level autonomy for the self-driving operation of the autonomous vehicle.

5. The autonomous vehicle of claim 1, wherein the one or more processors are further to: determine whether the reduction in contrast detectability of the imaging device is attributed to a temporary degradation in optical performance of the imaging device or a prolonged deterioration of components in the imaging device.

6. The autonomous vehicle of claim 5, wherein the one or more processors are further to:

determine that the reduction in contrast detectability of the imaging device is within a predetermined time threshold; and determine that the reduction in contrast detectability of the imaging device is attributed to a temporary degradation in optical performance in response to determining that the reduction in contrast detectability is within the predetermined time threshold.

7. The autonomous vehicle of claim 5, wherein the one or more processors are further to:

alert an operator of the autonomous vehicle for maintenance responsive to a determination that the reduction in contrast detectability is attributed to a prolonged deterioration of optics in the imaging device.

8. An imaging system comprising:

an imaging device; and one or more processors operatively coupled to the imaging device, the one or more processors to:

receive pixel data from a pair of regions of an image generated using an imaging device, the pair of regions comprising a first region and a second region of the image, wherein the first region comprises a first plurality of pixels of the image and the second region comprises a second plurality of pixels of the image;

determine a plurality of pixel pairs of the image, wherein a pixel pair of the plurality of pixel pairs comprises a first pixel from the first region and a second pixel from the second region;

calculate a plurality of contrasts based on the plurality of pixel pairs, wherein a contrast for the pixel pair is calculated between pixel data corresponding to the first pixel and pixel data corresponding to the second pixel from the pixel pair;

determine a contrast distribution based on the plurality of contrasts;

calculate a value representative of a capability of the imaging device to detect contrast based on a mean value and a standard deviation value of the contrast distribution; and determine a reduction in contrast detectability of the imaging device based on the value.

9. The imaging system of claim 8, wherein to determine the reduction in contrast detectability, the one or more processors are to:

determine an average scene brightness from the image;

determine, using the calculated value and the average scene brightness, a current contrast signal to noise (CSNR) profile for the imaging device;

make a comparison between the current CSNR profile and a past CSNR profile;

make a determination, based on the comparison, that the current CSNR profile deviates from the past CSNR profile by at least a threshold amount; and determine the reduction in contrast detectability responsive to the determination that the current CSNR profile deviates from the past CSNR profile by at least the threshold amount.

10. The imaging system of claim 8, wherein the one or more processors are further to alert an operator of the imaging system for a manual inspection of the image in response to determining the reduction in contrast detectability of the imaging device.

11. The imaging system of claim 8, wherein the one or more processors are further to: determine the reduction in contrast detectability of the imaging device is attributed to a temporary degradation in optical performance of the imaging device or a prolonged deterioration of components in the imaging device.

12. The imaging system of claim 11, wherein the one or more processors are further to:
   determine that the reduction in contrast detectability of the imaging device is within a predetermined time threshold; and
   determine that the reduction in contrast detectability of the imaging device is attributed to a temporary degradation in optical performance in response to determining that the reduction in contrast detectability is within the predetermined time threshold.

13. The imaging system of claim 11, wherein the one or more processors are further to: alert an operator of the imaging system for maintenance if the reduction in contrast detectability of the imaging device is attributed to a prolonged deterioration of optics in the imaging device.

* * * * *